United States Patent
Kwak et al.

(10) Patent No.: US 10,721,538 B2
(45) Date of Patent: Jul. 21, 2020

(54) APPARATUS AND METHOD FOR TRANSMITTING AND RECEIVING BROADCAST SIGNAL

(71) Applicant: LG ELECTRONICS INC., Seoul (KR)

(72) Inventors: Minsung Kwak, Seoul (KR); Kyoungsoo Moon, Seoul (KR); Sungryong Hong, Seoul (KR); Woosuk Ko, Seoul (KR); Jangwon Lee, Seoul (KR); Woosuk Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 39 days.

(21) Appl. No.: 15/556,283

(22) PCT Filed: Mar. 7, 2016

(86) PCT No.: PCT/KR2016/002255
§ 371 (c)(1),
(2) Date: Sep. 6, 2017

(87) PCT Pub. No.: WO2016/144072
PCT Pub. Date: Sep. 15, 2016

(65) Prior Publication Data
US 2018/0063598 A1 Mar. 1, 2018

Related U.S. Application Data

(60) Provisional application No. 62/151,374, filed on Apr. 22, 2015, provisional application No. 62/133,963, (Continued)

(51) Int. Cl.
*H04N 21/6437* (2011.01)
*H04N 21/235* (2011.01)
(Continued)

(52) U.S. Cl.
CPC .......... *H04N 21/6437* (2013.01); *H04L 1/00* (2013.01); *H04L 1/0071* (2013.01); *H04L 29/06* (2013.01);
(Continued)

(58) Field of Classification Search
CPC ............ H04N 21/6437; H04N 21/462; H04N 21/4345; H04N 21/236; H04N 21/235;
(Continued)

(56) References Cited

U.S. PATENT DOCUMENTS

2006/0165173 A1* 7/2006 Kim ................... H04N 21/2343
375/240.12
2006/0221178 A1* 10/2006 Yun .................... H04N 7/17318
348/42

(Continued)

FOREIGN PATENT DOCUMENTS

EP 2200210 4/2012
EP 2707974 3/2014
(Continued)

OTHER PUBLICATIONS

PCT International Application No. PCT/KR2016/002255, International Search Report dated Jul. 27, 2016, 2 pages.
(Continued)

*Primary Examiner* — David R Lazaro
*Assistant Examiner* — Berhanu Shitayewoldetadik
(74) *Attorney, Agent, or Firm* — Lee, Hong, Degerman, Kang & Waimey

(57) ABSTRACT

A method for transmitting a broadcast signal according to an embodiment of the present invention includes generating service layer signaling information for discovering and obtaining a broadcast service and a content component of the broadcast service; generating service list information including information for service list building and discovery
(Continued)

of the service layer signaling information; and physical layer processing of the service list information, the service layer signaling information, and the content component.

14 Claims, 66 Drawing Sheets

Related U.S. Application Data filed on Mar. 16, 2015, provisional application No. 62/130,612, filed on Mar. 10, 2015, provisional application No. 62/129,933, filed on Mar. 8, 2015.

(51) Int. Cl.

| | | |
|---|---|---|
| *H04N 21/236* | (2011.01) | |
| *H04L 1/00* | (2006.01) | |
| *H04L 29/08* | (2006.01) | |
| *H04L 29/06* | (2006.01) | |
| *H04N 21/858* | (2011.01) | |
| *H04N 21/434* | (2011.01) | |
| *H04N 21/2362* | (2011.01) | |
| *H04N 21/242* | (2011.01) | |
| *H04N 21/462* | (2011.01) | |
| *H04H 60/07* | (2008.01) | |
| *H04N 21/43* | (2011.01) | |
| *H04N 21/27* | (2011.01) | |

(52) U.S. Cl.
CPC .......... *H04L 29/08* (2013.01); *H04L 29/0809* (2013.01); *H04L 67/02* (2013.01); *H04N 21/235* (2013.01); *H04N 21/236* (2013.01); *H04N 21/2362* (2013.01); *H04N 21/242* (2013.01); *H04N 21/4345* (2013.01); *H04N 21/462* (2013.01); *H04N 21/858* (2013.01); *H04H 60/07* (2013.01); *H04L 29/08018* (2013.01); *H04L 69/323* (2013.01); *H04N 21/27* (2013.01); *H04N 21/4302* (2013.01)

(58) Field of Classification Search
CPC ............. H04N 21/2362; H04N 21/242; H04N 21/858; H04N 21/27; H04N 21/4302; H04L 1/0071; H04L 67/02; H04L 29/0809; H04L 29/08; H04L 29/06; H04L 1/00; H04L 29/08018; H04H 60/07
USPC .......................................................... 709/231
See application file for complete search history.

(56) References Cited

U.S. PATENT DOCUMENTS

| | | | | |
|---|---|---|---|---|
| 2008/0305757 | A1* | 12/2008 | Jang | ........................ H04H 60/43 455/150.1 |
| 2009/0178082 | A1* | 7/2009 | Zhang | .................... H04H 20/38 725/51 |
| 2009/0219918 | A1* | 9/2009 | Lee | ........................... H04J 3/12 370/350 |
| 2009/0292767 | A1* | 11/2009 | Wen | ....................... G06Q 30/02 709/203 |
| 2010/0131823 | A1 | 5/2010 | Song et al. | |
| 2011/0103300 | A1 | 5/2011 | Vare et al. | |
| 2011/0165865 | A1 | 7/2011 | Gao et al. | |
| 2012/0117160 | A1* | 5/2012 | Bickson | .................. H04L 67/02 709/206 |
| 2012/0288031 | A1* | 11/2012 | Vare | ....................... H04H 60/72 375/316 |
| 2012/0324521 | A1* | 12/2012 | Rhyu | ...................... H04N 21/84 725/109 |
| 2013/0081088 | A1* | 3/2013 | Hwang | .............. H04N 21/2362 725/59 |
| 2013/0097470 | A1* | 4/2013 | Hwang | ................. H04L 1/0041 714/758 |
| 2013/0205344 | A1 | 8/2013 | Lee et al. | |
| 2013/0290814 | A1 | 10/2013 | Hwang et al. | |
| 2014/0036917 | A1* | 2/2014 | Schrum, Jr. | ........... H04L 61/103 370/392 |
| 2014/0129859 | A1 | 5/2014 | O'Malley et al. | |
| 2014/0195879 | A1* | 7/2014 | Hong | ..................... H04H 20/42 714/776 |
| 2014/0317674 | A1* | 10/2014 | Hwang | .............. H04N 21/2362 725/118 |
| 2015/0032845 | A1 | 1/2015 | Bouazizi et al. | |
| 2016/0205017 | A1* | 7/2016 | Hwang | ................. H04N 21/236 370/392 |
| 2016/0205158 | A1* | 7/2016 | Lo | ....................... H04L 65/4076 709/219 |
| 2017/0019431 | A1 | 1/2017 | Kitahara et al. | |
| 2017/0134764 | A1* | 5/2017 | Yamagishi | ....... H04N 21/64322 |
| 2017/0347134 | A1 | 11/2017 | Bae et al. | |

FOREIGN PATENT DOCUMENTS

| | | | | |
|---|---|---|---|---|
| JP | WO 2012036429 | A2 * | 3/2012 | ............. H04N 7/015 |
| WO | 2012036429 | | 3/2012 | |
| WO | WO -2012036429 | A2 * | 3/2012 | ............. H04H 20/42 |
| WO | 2012077987 | | 6/2012 | |

OTHER PUBLICATIONS

Sohn, et al., Design of MMT-based Broadcasting System for UHD Video Streaming over Heterogeneous Networks, Journal of Broadcast Engineering, vol. 20, No. 1, Jan. 2015, 10 pages.
United States Patent and Trademark Office U.S. Appl. No. 15/119,315, Office Action dated Jul. 6, 2018, 17 pages.
United States Patent and Trademark Office U.S. Appl. No. 15/119,315, Office Action dated Jun. 27, 2019, 20 pages.

\* cited by examiner

[FIG. 1]
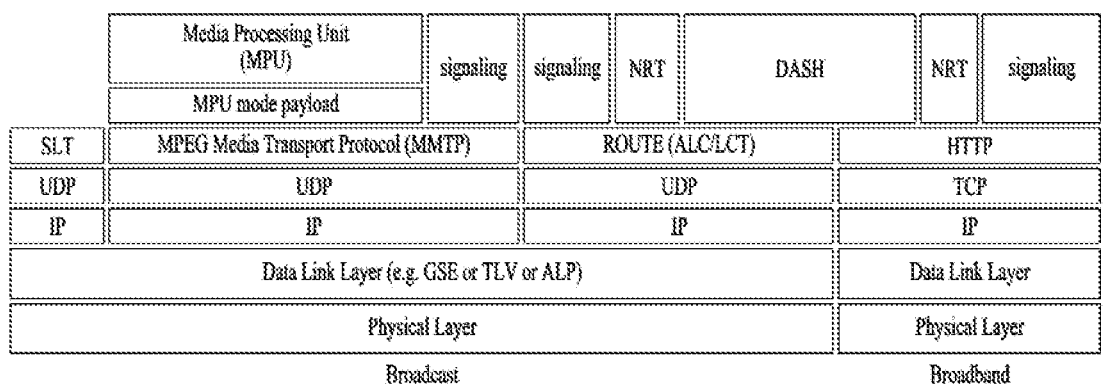
[FIG. 2]
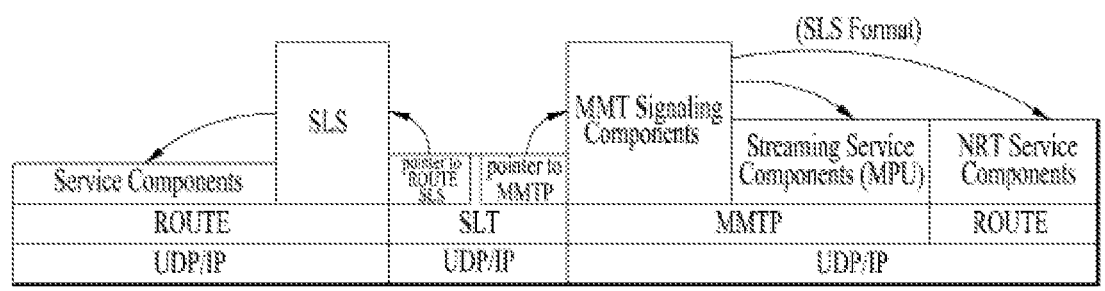

[FIG. 3]

| Element or Attribute Name | Use |
|---|---|
| SLT | |
| @bsid | 1 |
| @slSectionVersion | 1 |
| @slSectionNumber | 0..1 |
| @totalSlSectionNumbers | 0..1 |
| @language | 0..1 |
| @capabilities | 0..1 |
| InetSigLoc | 0..1 |
| Service | 1..N |
|    @serviceId | 1 |
|    @SLT_serviceSeqNumber | 1 |
|    @protected | 0..1 |
|    @majorChannelNo | 1 |
|    @minorChannelNo | 1 |
|    @serviceCategory | 1 |
|    @shortServiceName | 1 |
|    @hidden | 0..1 |
|    @slsProtocolType | 1 |
|    BroadcastSignaling | 0..1 |
|    @slsPlpId | 0..1 |
|    @slsDestinationIpAddress | 0..1 |
|    @slsDestinationUdpPort | 0..1 |
|    @slsSourceIpAddress | 0..1 |
|    @slsMajorProtocolVersion | 0..1 |
|    @SlsMinorProtocolVersion | 0..1 |
|    @serviceLanguage | 0..1 |
|    @broadbandAccessRequired | 0..1 |
|    @capabilities | 0..1 |
|    InetSigLoc | 0..1 |

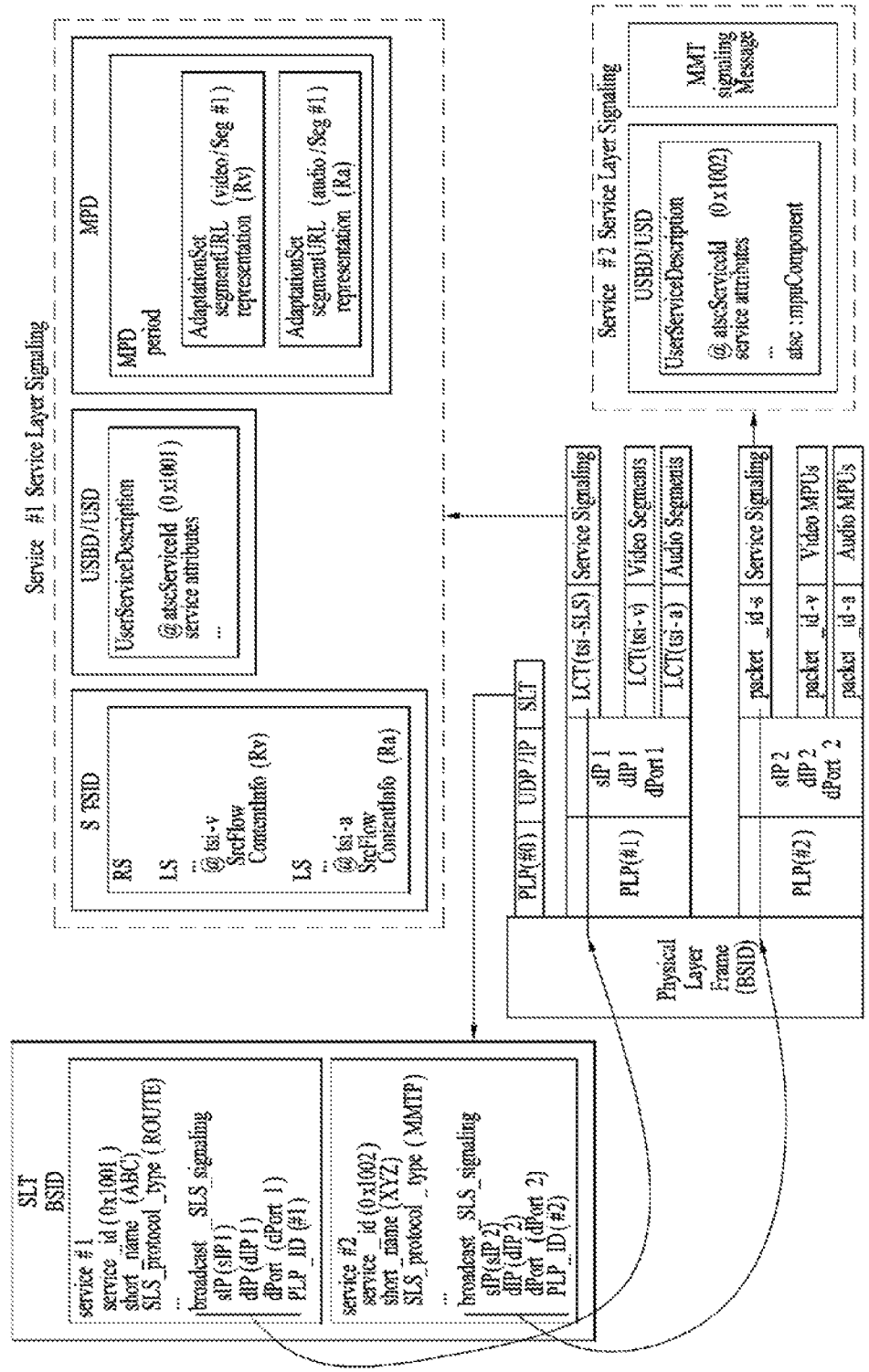
[FIG. 4]

[FIG. 5]

| Element or Attribute Name | | | | Use |
|---|---|---|---|---|
| bundleDescription | | | | |
| | userServiceDescription | | | |
| | | @serviceId | | M |
| | | @atsc: serviceId | | M |
| | | @atsc: serviceStatus | | OD |
| | | @atsc: fullMPDUri | | M |
| | | @atsc: sTSIDUri | | M |
| | | name | | 0..N |
| | | | lang | CM |
| | | serviceLanguage | | 0..N |
| | | atsc: capabilityCode | | 0..1 |
| | | deliveryMethod | | 1..N |
| | | | r12: broadcastAppService | 1..N |
| | | | | basePattern | 1..N |
| | | | r12: unicastAppService | 0..N |
| | | | | basePattern | 1..N |

[FIG. 6]

| Element and Attribute Names | | | | Use |
|---|---|---|---|---|
| S - TSID | | | | |
| | @serviceId | | | O |
| | RS | | | 1..N |
| | | @bsid | | OD |
| | | @sIpAddr | | OD |
| | | @dIpAddr | | OD |
| | | @dport | | OD |
| | | @PLPID | | OD |
| | | LS | | 1..N |
| | | | @tsi | M |
| | | | @PLPID | OD |
| | | | @bw | O |
| | | | @startTime | O |
| | | | @endTime | O |
| | | | SrcFlow | 0..1 |
| | | | RprFlow | 0..1 |

[FIG. 7]

| Element or Attribute Name | | | | | | Use |
|---|---|---|---|---|---|---|
| bundleDescription | | | | | | |
| | userServiceDescription | | | | | |
| | | @serviceId | | | | M |
| | | @atsc: serviceId | | | | M |
| | | Name | | | | 0..N |
| | | | Lang | | | CM |
| | | serviceLanguage | | | | 0..N |
| | | atsc: capabilityCode | | | | 0..1 |
| | | atsc: Channel | | | | 1 |
| | | | @atsc: majorChannelNo | | | M |
| | | | @atsc: minorChannelNo | | | M |
| | | | @atsc: serviceLang | | | O |
| | | | @atsc: serviceGenre | | | O |
| | | | @atsc: serviceIcon | | | M |
| | | | atsc: ServiceDescription | | | 0..N |
| | | | | @atsc: serviceDescrText | | M |
| | | | | @atsc: serviceDescrLang | | O |
| | | atsc:mpuComponent | | | | 0..1 |
| | | | @atsc: mmtPackageId | | | M |
| | | | @atsc: next_MmtPackageId | | | O |
| | | atsc: routeComponent | | | | 0..1 |
| | | | @atsc: sTSIDUri | | | M |
| | | | @slsPlpId | | | OD |
| | | | @slsDestinationIpAddress | | | OD |
| | | | @slsDestinationUdpPort | | | M |
| | | | @slsSourceIpAddress | | | M |
| | | | @slsMajorProtocolVersion | | | OD |
| | | | @SlsMinorProtocolVersion | | | OD |
| | | atsc: broadbandComponent | | | | 0..1 |
| | | | @atsc: fullMPDUri | | | M |
| | | atsc: ComponentInfo | | | | 1..N |
| | | | @atsc: component_Type | | | M |
| | | | @atsc: component_Role | | | M |
| | | | @atsc: component_ProtectedFlag | | | OD |
| | | | @atsc: component_Id | | | M |
| | | | @atsc: component_Name | | | O |

【FIG. 8】
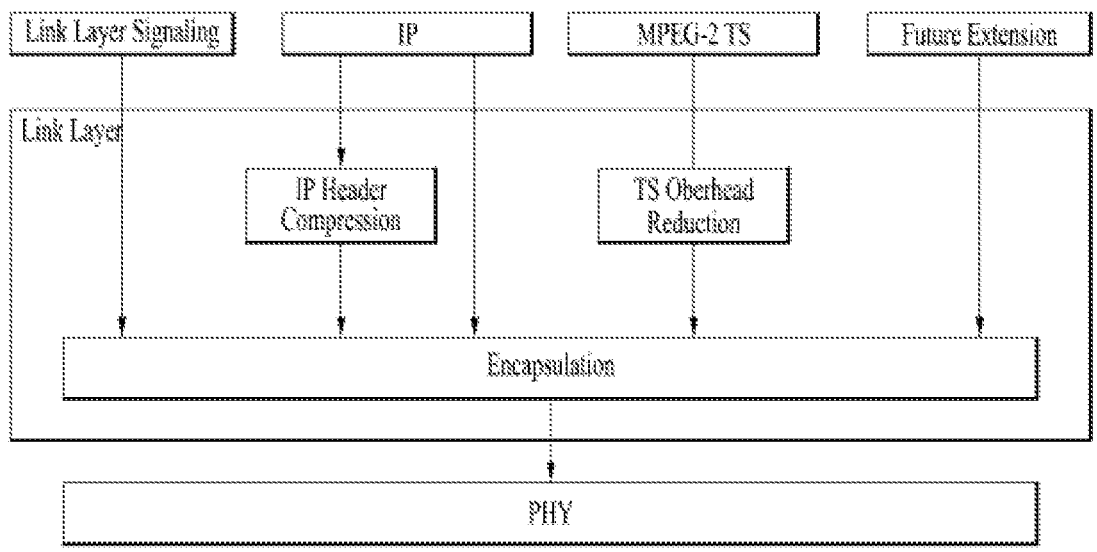
【FIG. 9】
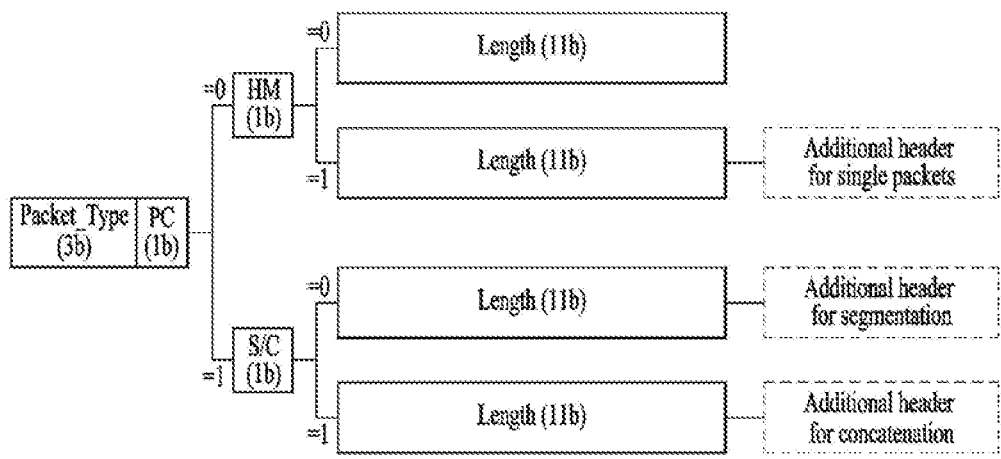

[FIG. 10]
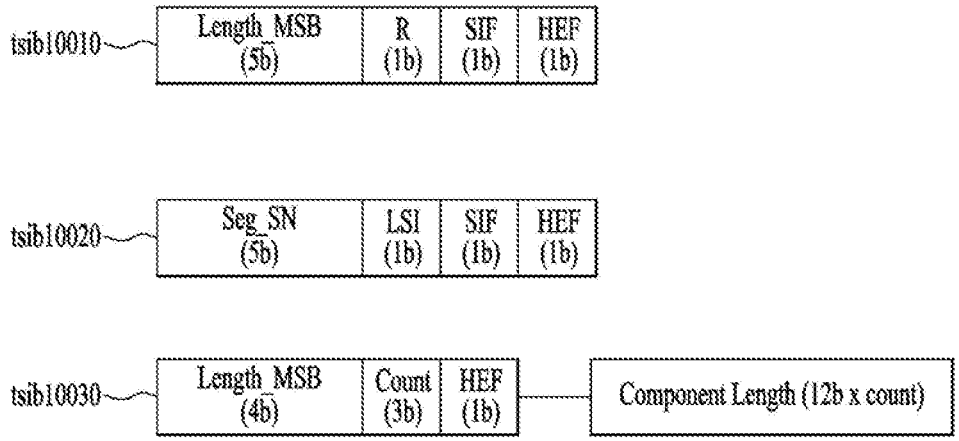
[FIG. 11]
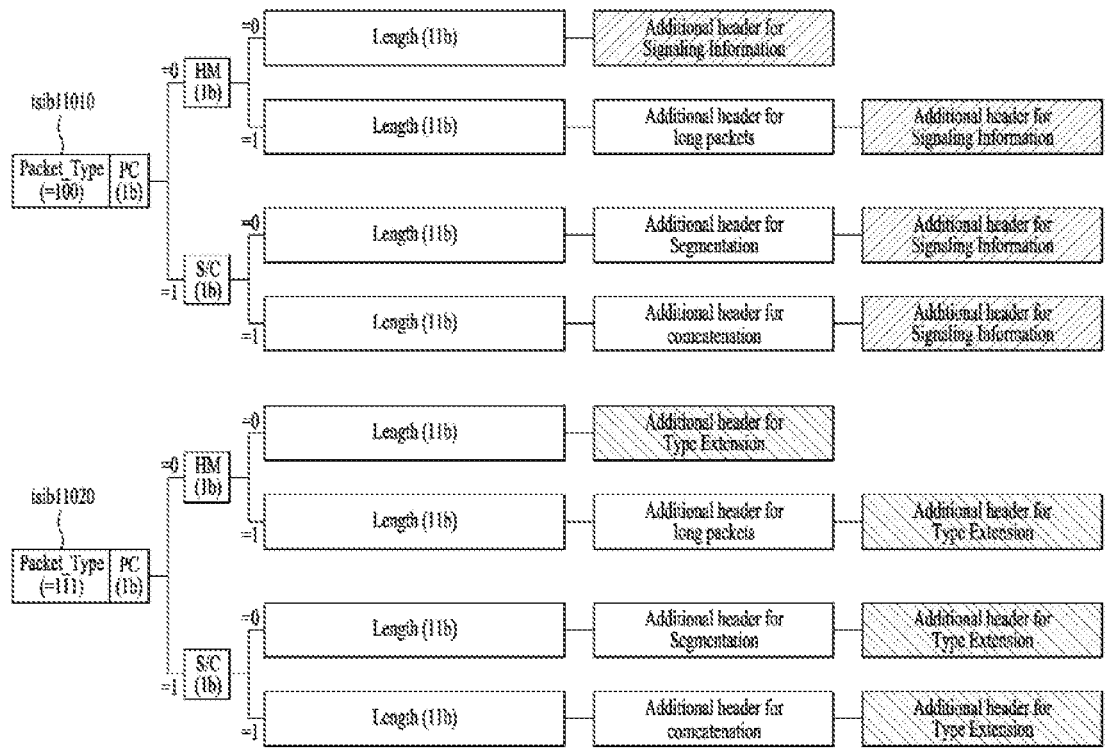

[FIG. 12]
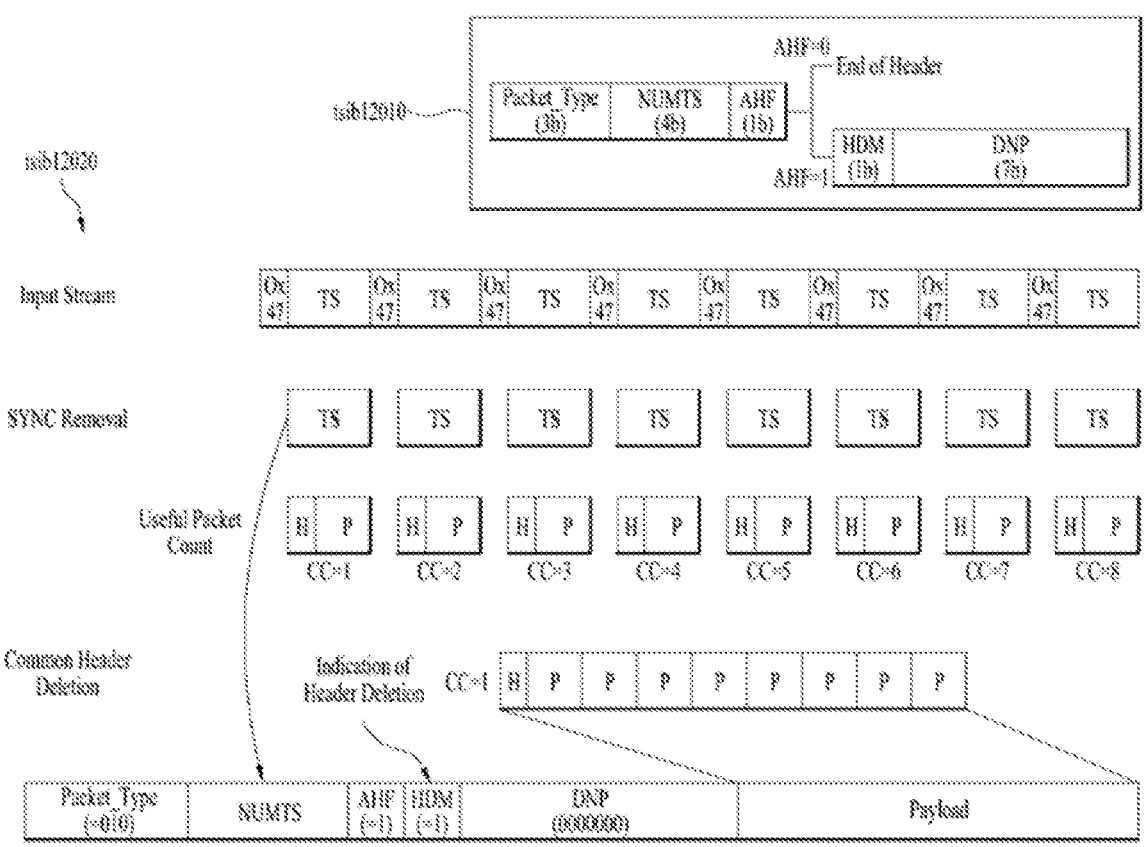

【FIG. 13】
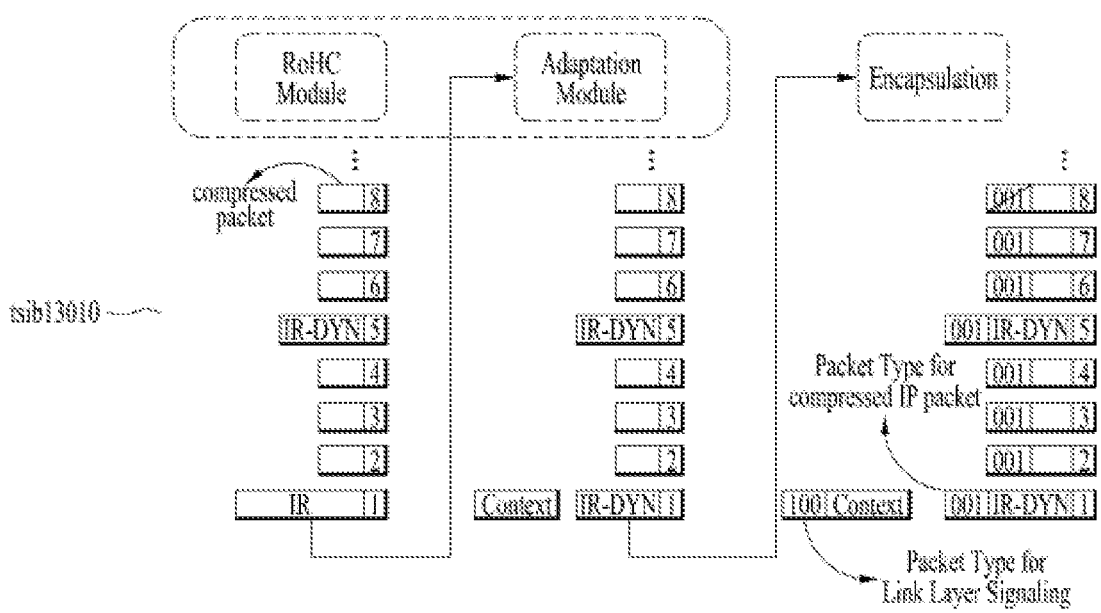
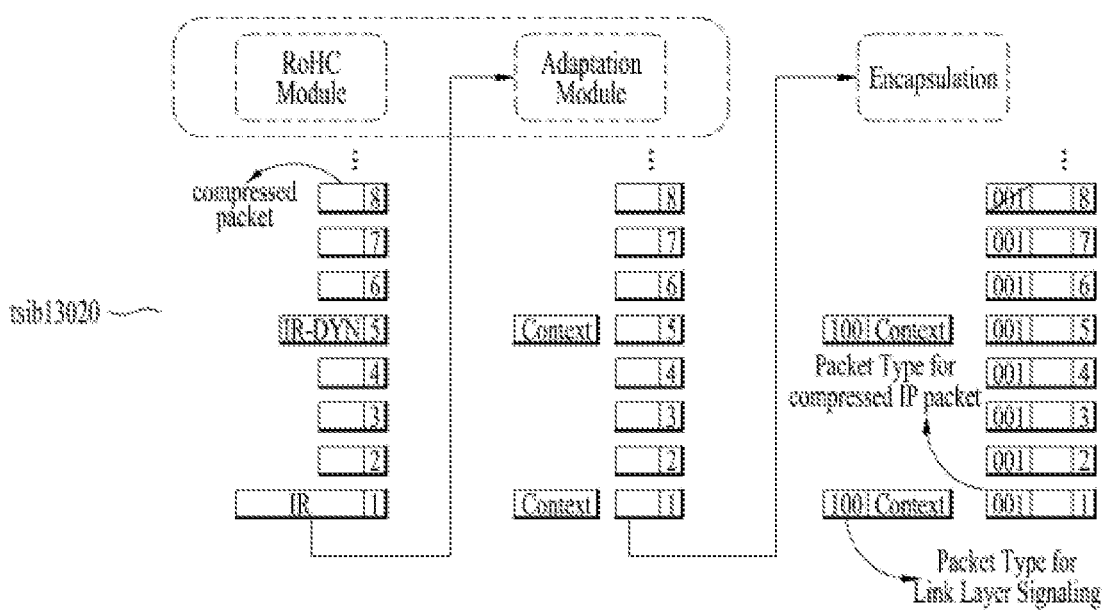

[FIG. 14]

| Syntax | Number of bits | Mnemonic |
|---|---|---|
| Link Mapping Table ( ) { | | |
| signaling_type | 8 | "0x01" |
| PLP_ID | 6 | uimsbf |
| Reserved | 2 | uimsbf |
| num_session | 8 | uimsbf |
| for( i = 0 ; i < num_session ; i++ ) { | | |
| src_IP_add | 32 | uimsbf |
| dst_IP_add | 32 | uimsbf |
| src_UDP_port | 16 | uimsbf |
| dst_UDP_port | 16 | uimsbf |
| SID_flag | 1 | bslbf |
| compressed_flag | 1 | bslbf |
| reserved | 6 | '000000' |
| if(SID_flag == '1') { | | |
| SID | 8 | uimsbf |
| } | | |
| if(compressed_flag == '1') { | | |
| context_id | 8 | uimsbf |
| } | | |
| } | | |
| } | | | tab14010
tab14020

| Syntax | Number of bits | Mnemonic |
|---|---|---|
| ROHC-U description table { | | |
| signaling_type | 8 | "0x02" |
| PLP_ID | 6 | uimsbf |
| adaptation_mode | 2 | uimsbf |
| context_config | 2 | bslbf |
| reserved | 6 | bslbf |
| context_id | 8 | uimsbf |
| context_profile | 8 | uimsbf |
| if (context_config = 0x01) { | | |
| context_length | 8 | uimsbf |
| static_chain_byte () | var | uimsbf |
| } | | |
| else if (context_config = 0x02) { | | |
| context_length | 8 | uimsbf |
| dynamic_chain_byte () | var | uimsbf |
| } | | |
| else if (context_config = 0x03) { | | |
| context_length | 8 | uimsbf |
| static_chain_byte () | var | uimsbf |
| dynamic_chain_byte () | var | uimsbf |
| } | | |
| } | | |

[FIG. 15]
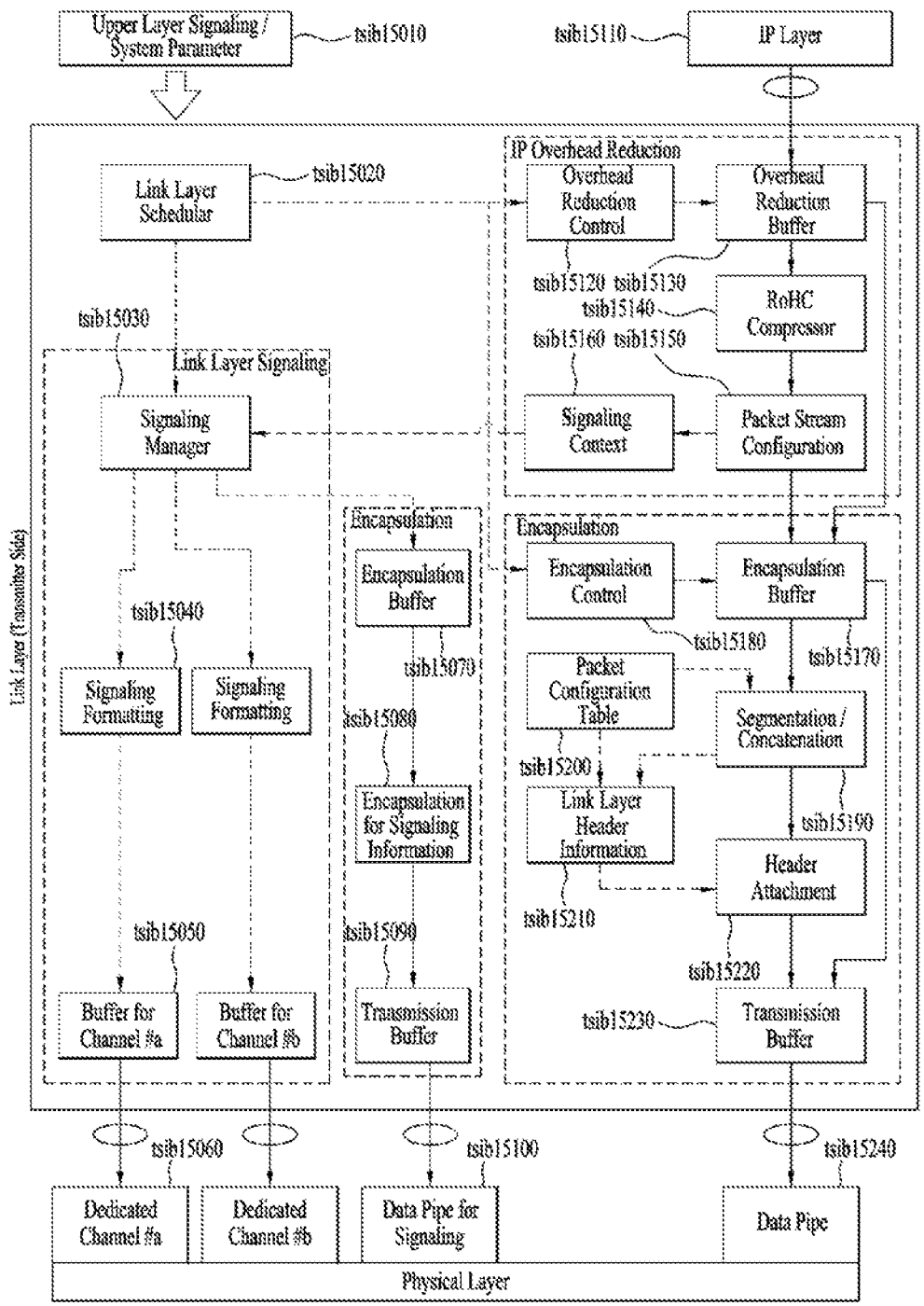

【FIG. 16】
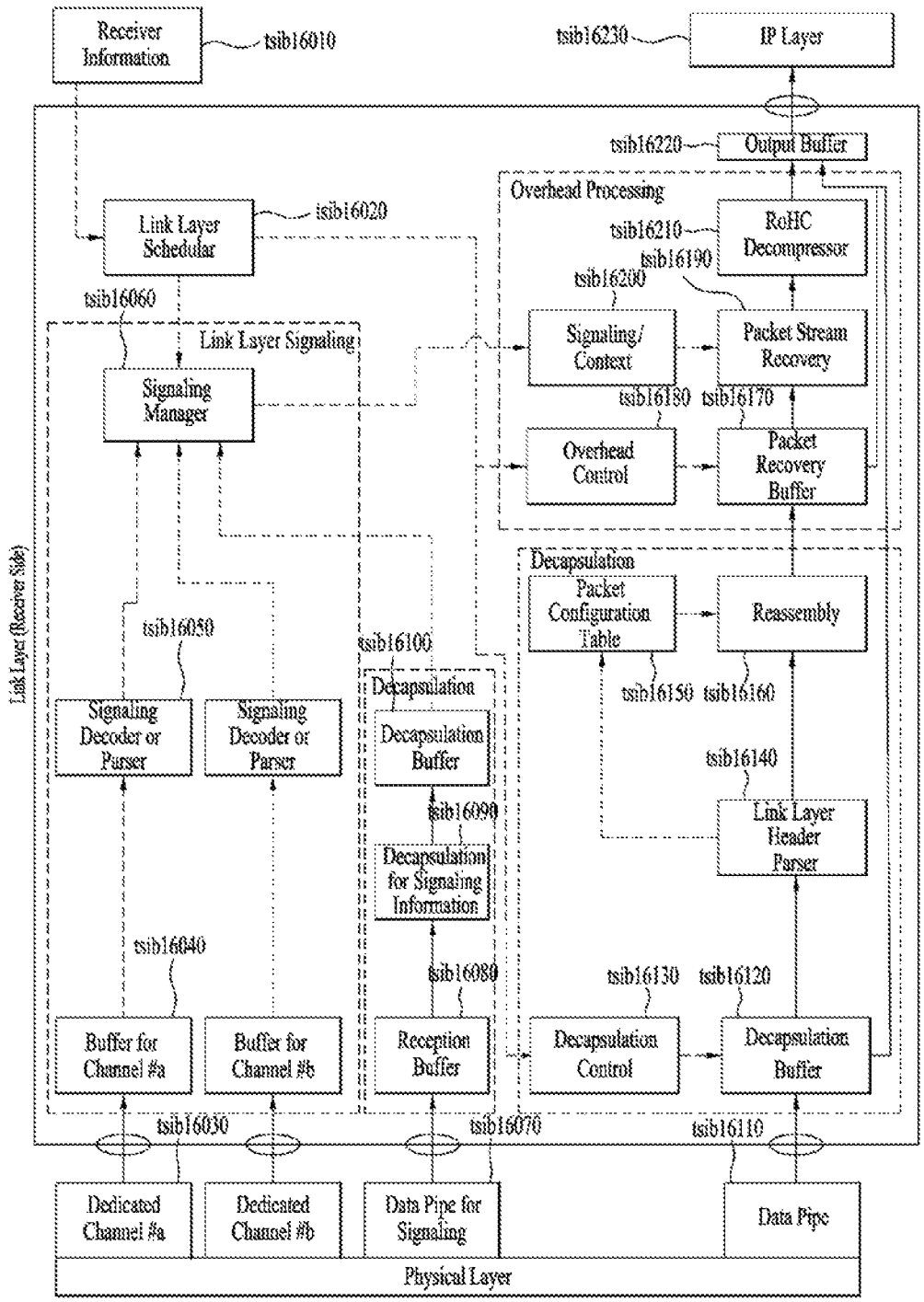

[FIG. 17]
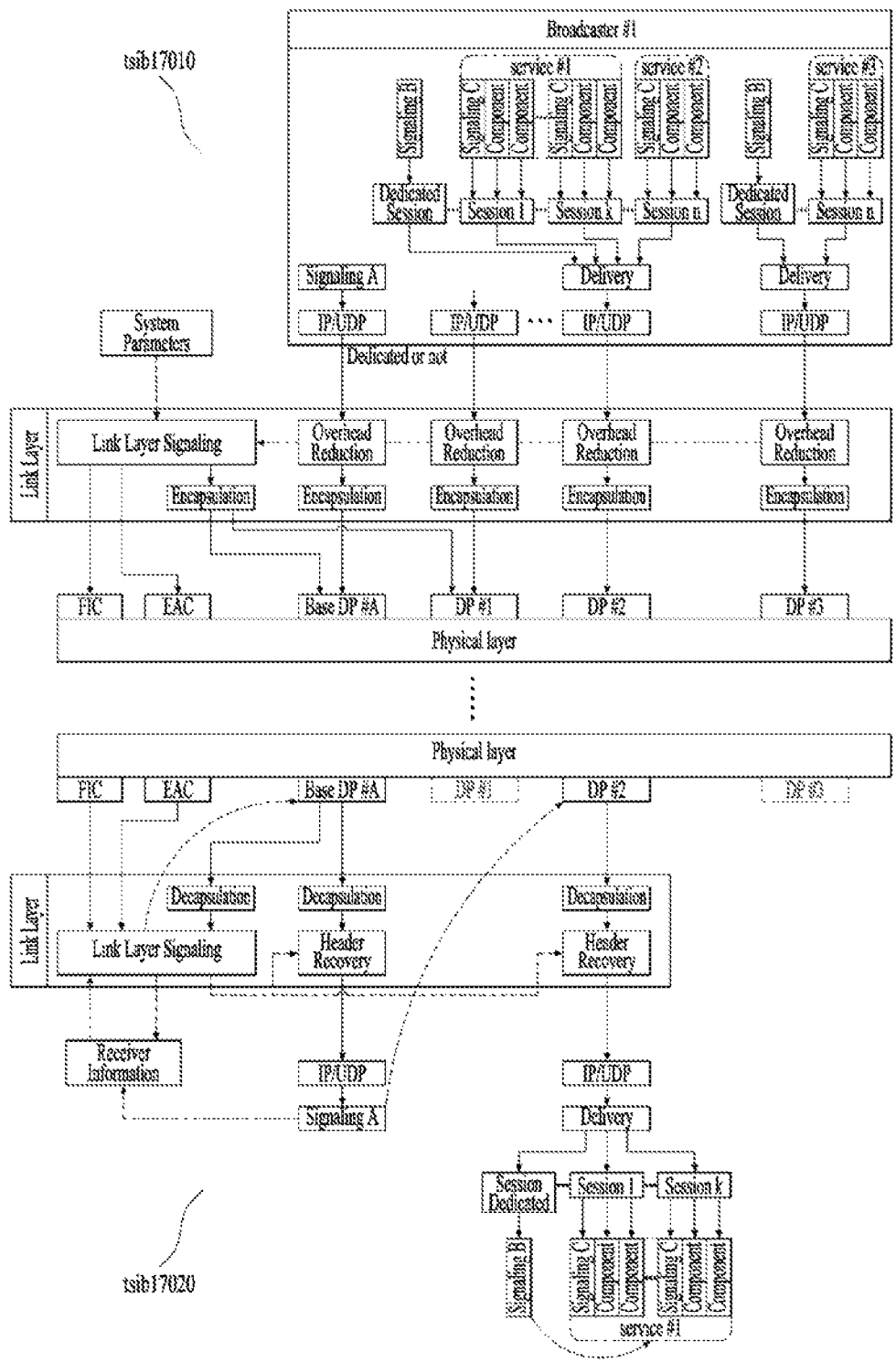

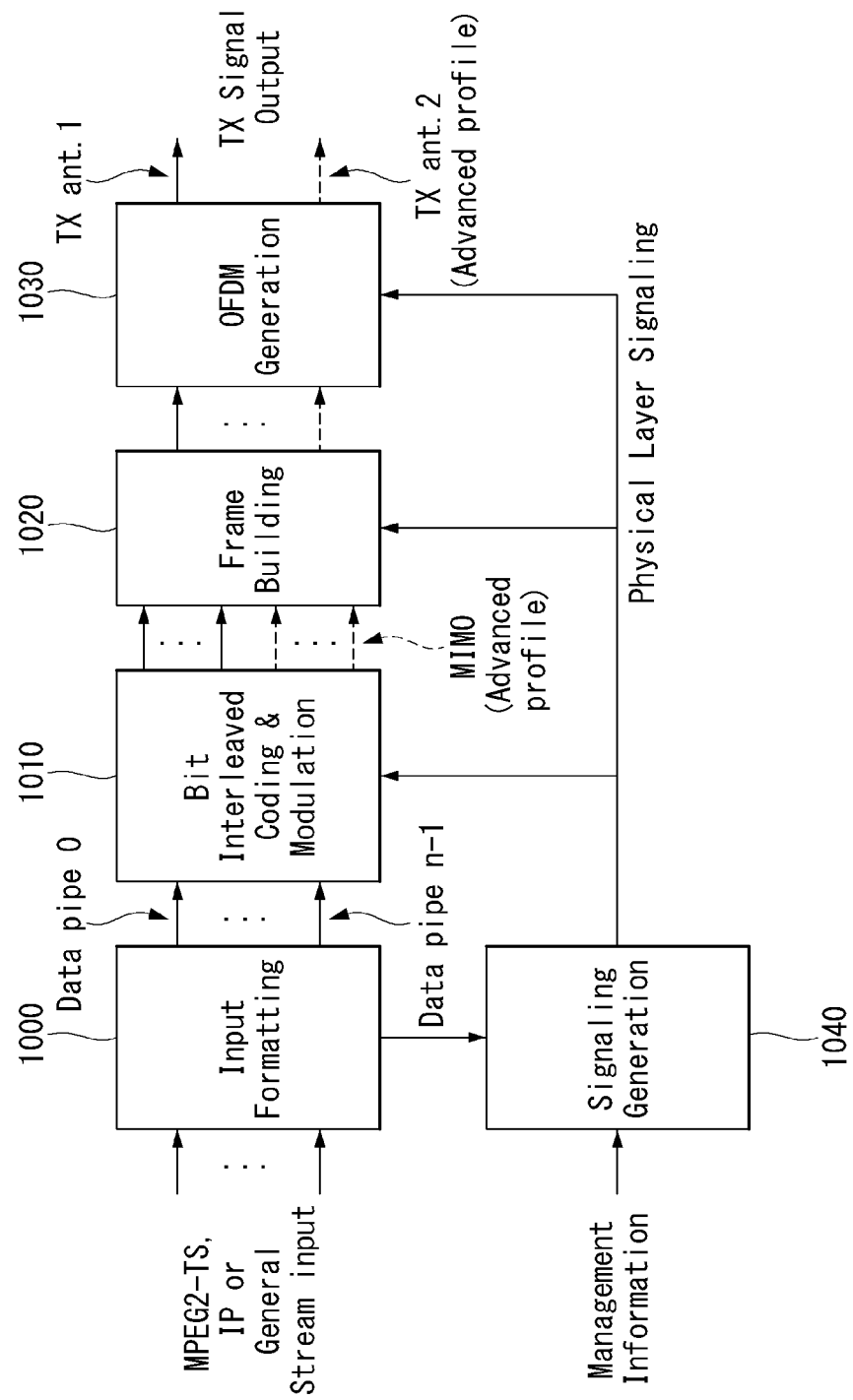
[FIG. 18]

[FIG. 19]
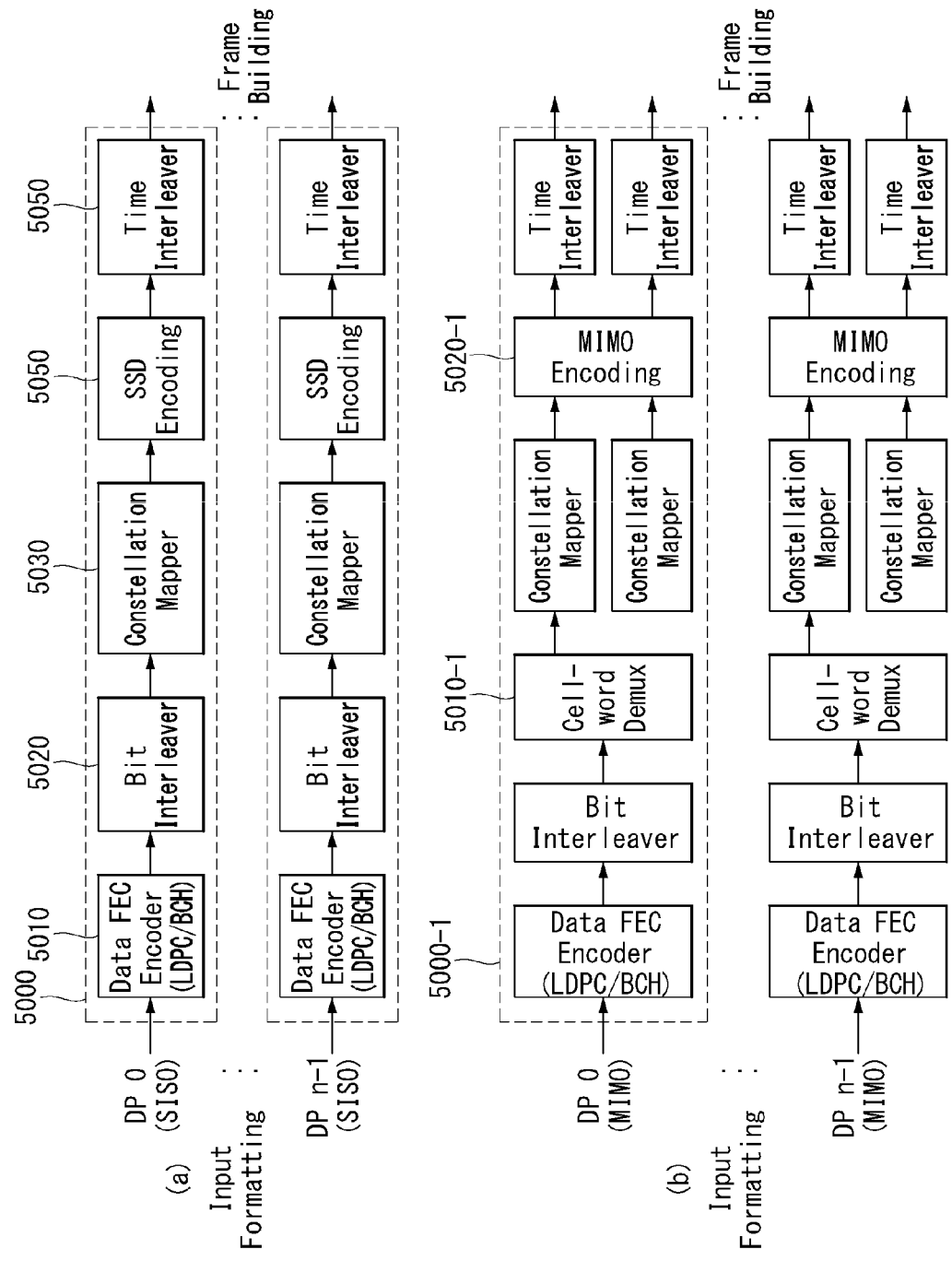

[FIG. 20]
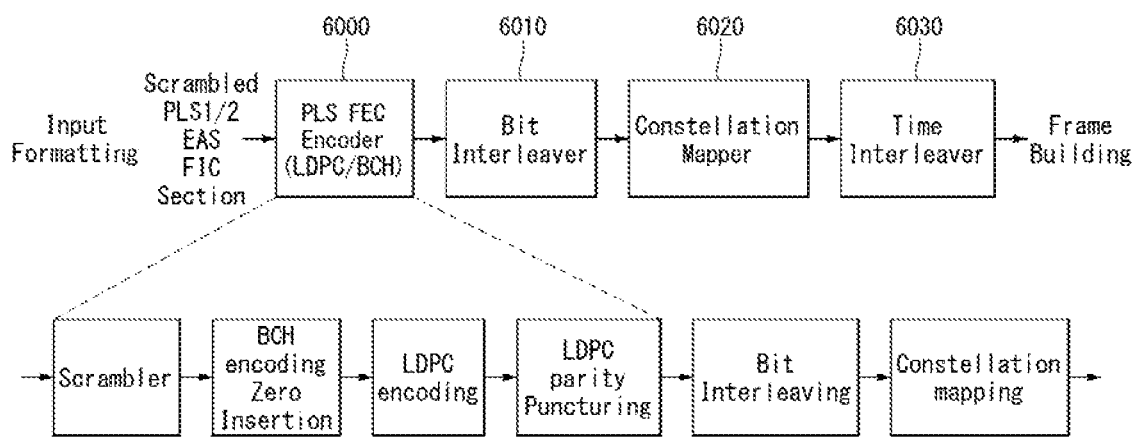

[FIG. 21]
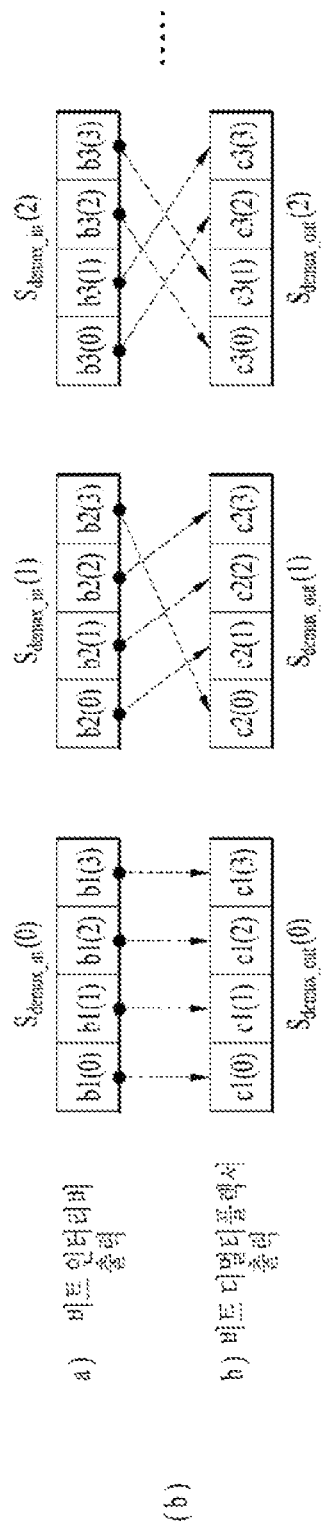

[FIG. 22]
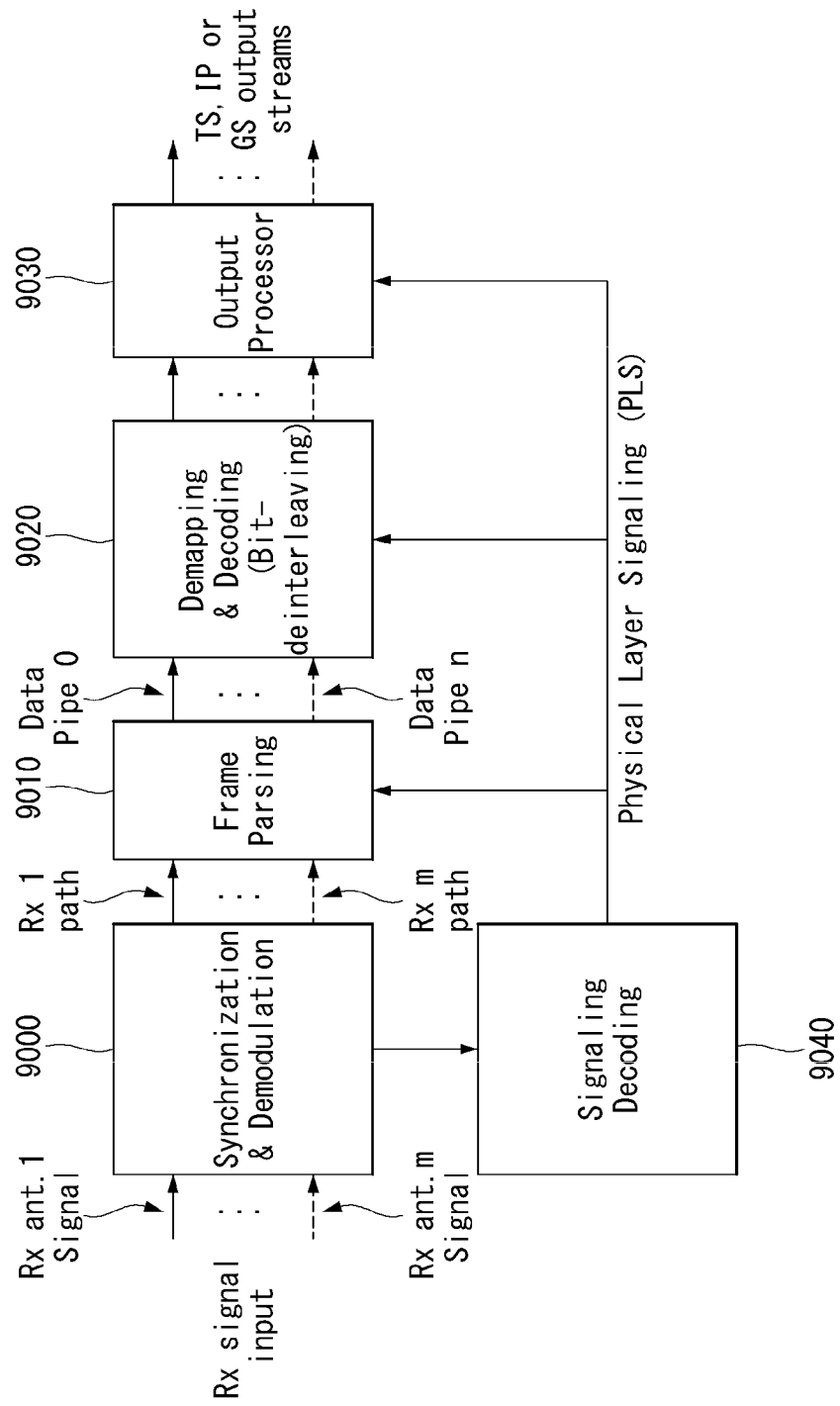

[FIG. 23]
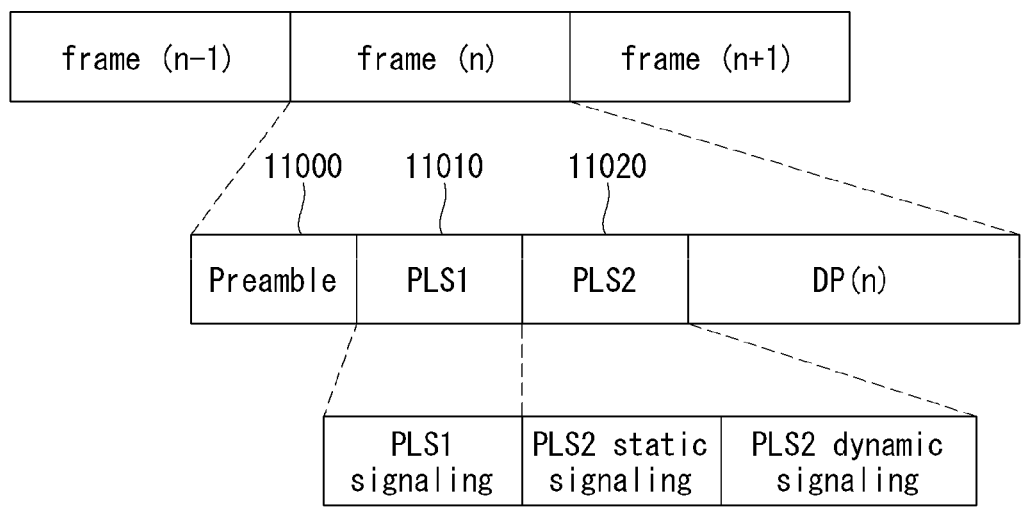

[FIG. 24]

| Content | Bits |
|---|---|
| PREAMBLE_DATA | 20 |
| NUM_FRAME_FRU | 2 |
| PAYLOAD_TYPE | 3 |
| NUM_FSS | 2 |
| SYSTEM_VERSION | 8 |
| CELL_ID | 16 |
| NETWORK_ID | 16 |
| SYSTEM_ID | 16 |
| for i = 0:3 | |
|     FRU_PHY_PROFILE | 3 |
|     FRU_FRAME_LENGTH | 2 |
|     FRU_GI_FRACTION | 3 |
|     RESERVED | 4 |
| end | |
| PLS2_FEC_TYPE | 2 |
| PLS2_MOD | 3 |
| PLS2_SIZE_CELL | 15 |
| PLS2_STAT_SIZE_BIT | 14 |
| PLS2_DYN_SIZE_BIT | 14 |
| PLS2_REP_FLAG | 1 |
| PLS2_REP_SIZE_CELL | 15 |
| PLS2_NEXT_FEC_TYPE | 2 |
| PLS2_NEXT_MODE | 3 |
| PLS2_NEXT_REP_FLAG | 1 |
| PLS2_NEXT_REP_SIZE_CELL | 15 |
| PLS2_NEXT_REP_STAT_SIZE_BIT | 14 |
| PLS2_NEXT_REP_DYN_SIZE_BIT | 14 |
| PLS2_AP_MODE | 2 |
| PLS2_AP_SIZE_CELL | 15 |
| PLS2_NEXT_AP_MODE | 2 |
| PLS2_NEXT_AP_SIZE_CELL | 15 |
| RESERVED | 32 |
| CRC 32 | 32 |

[FIG. 25]

| Content | Bits |
|---|---|
| FIC_FLAG | 1 |
| AUX_FLAG | 1 |
| NUM_DP | 6 |
| for i = 1: NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE == '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for i = 1: NUM_AUX | |
|         AUX_STREAM_TYPE | 4 |
|         AUX_PRIVATE_CONF | 28 |
|     end | |
| end | |

[FIG. 26]

| Content | Bit |
|---|---|
| FRAME_INDEX | 5 |
| PLS_CHANGE_COUNTER | 4 |
| FIC_CHANGE_COUNTER | 4 |
| RESERVED | 16 |
| for i = 1:NUM_DP | |
|     DP_ID | 6 |
|     DP_START | 15 (or 13) |
|     DP_NUM_BLOCK | 10 |
|     RESERVED | 8 |
| end | |
| EAC_FLAG | 1 |
| EAS_WAKE_UP_VERSION_NUM | 8 |
| if EAC_FLAG == 1 | |
|     EAC_LENGTH_BYTE | 12 |
| else | |
|     EAC_COUNTER | 12 |
| end | |
| for i=1:NUM_AUX | |
|     AUX_PRIVATE_DYN | 48 |
| end | |
| CRC_32 | 32 |

[FIG. 27]

| Preamble | PLS1 | PLS2 | EAC | FIC | DPs | Auxiliary streams | Dummy |
|---|---|---|---|---|---|---|---|

[FIG. 28]
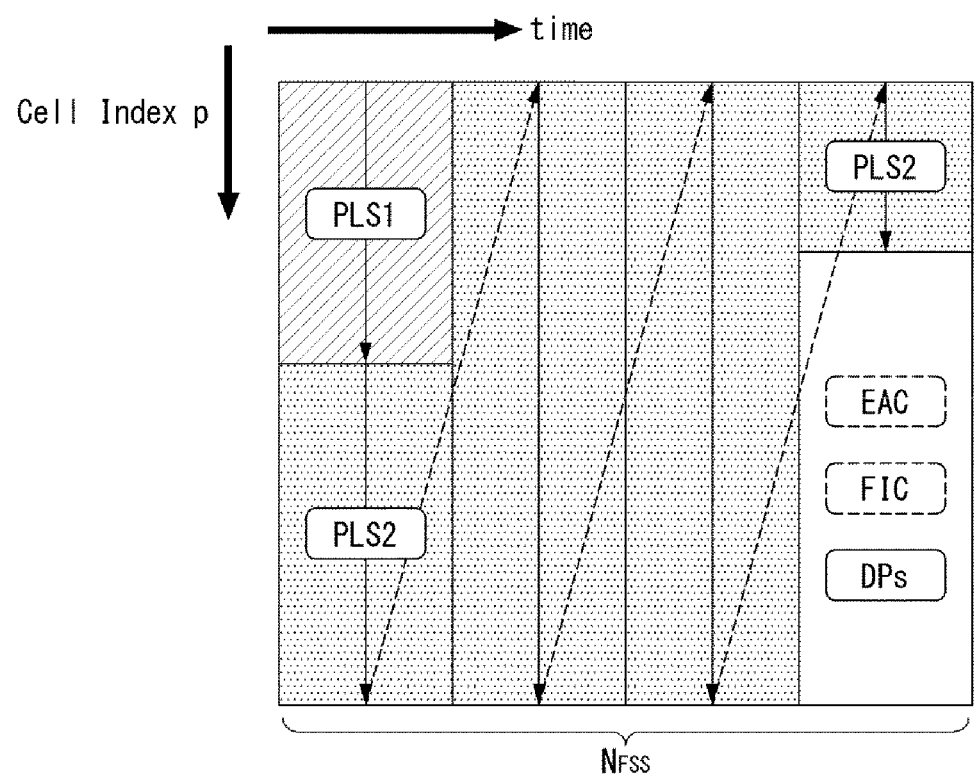

[FIG. 29]
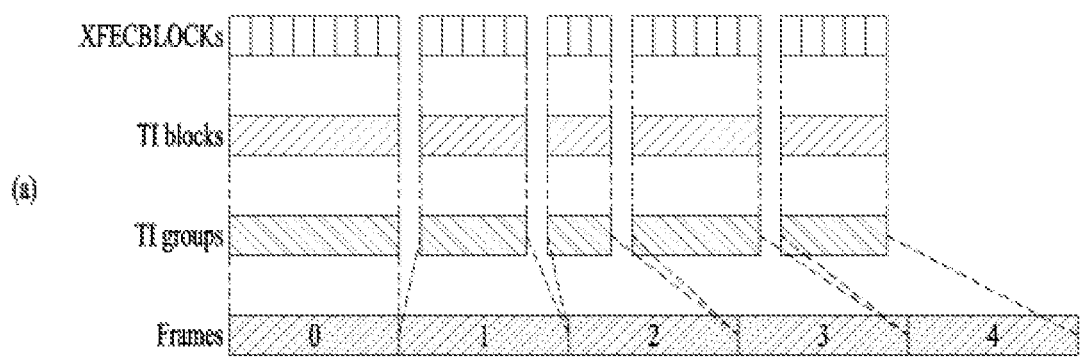
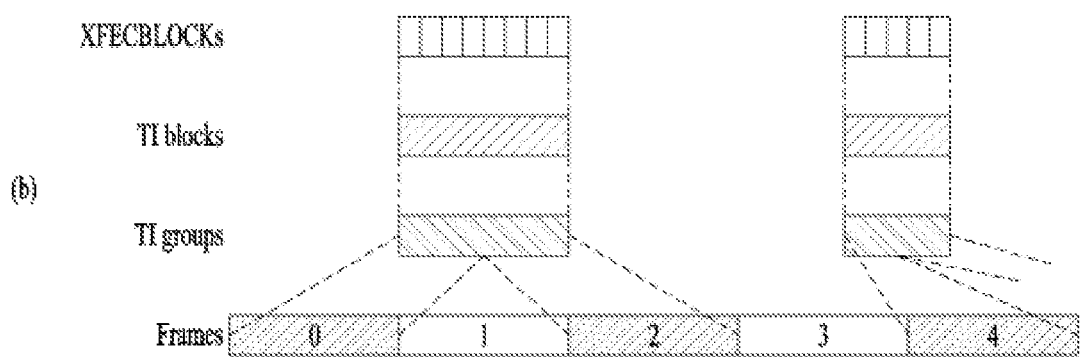
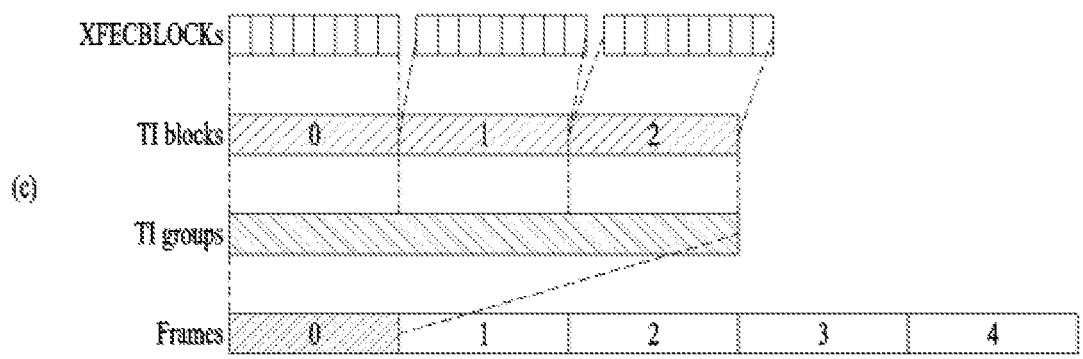

[FIG. 30]
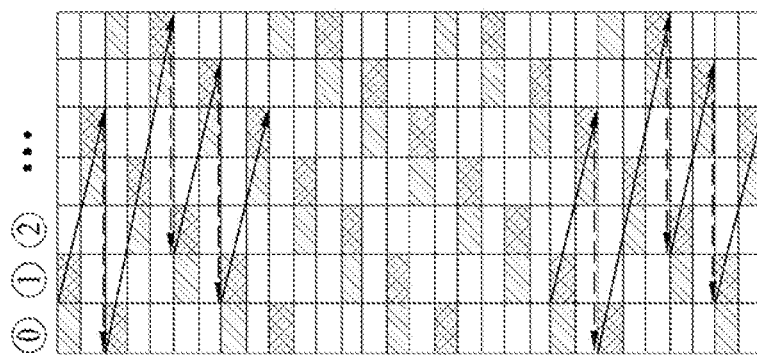
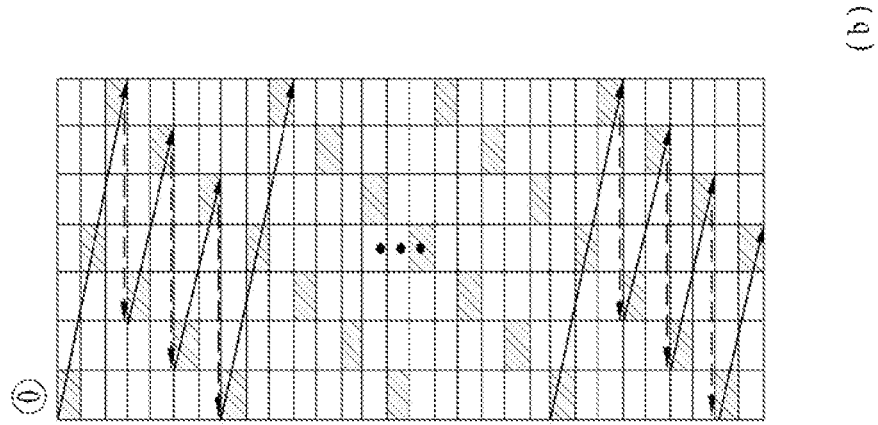
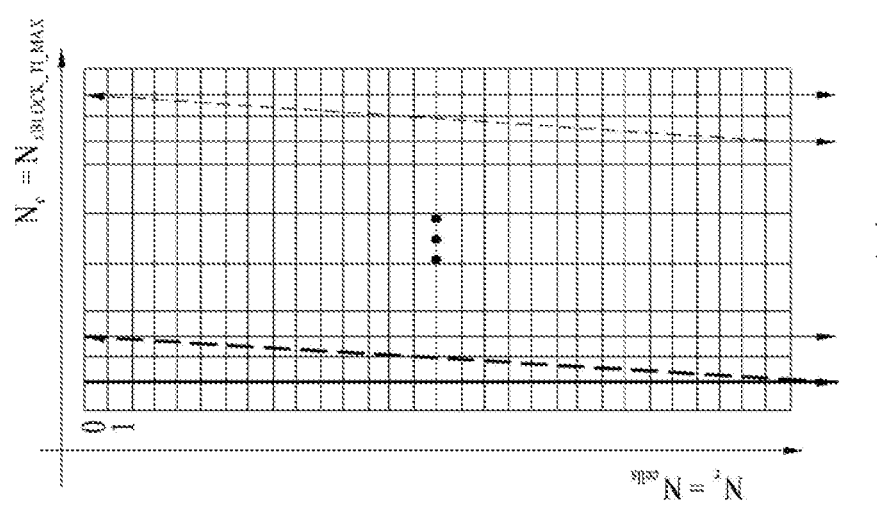

[FIG. 31]
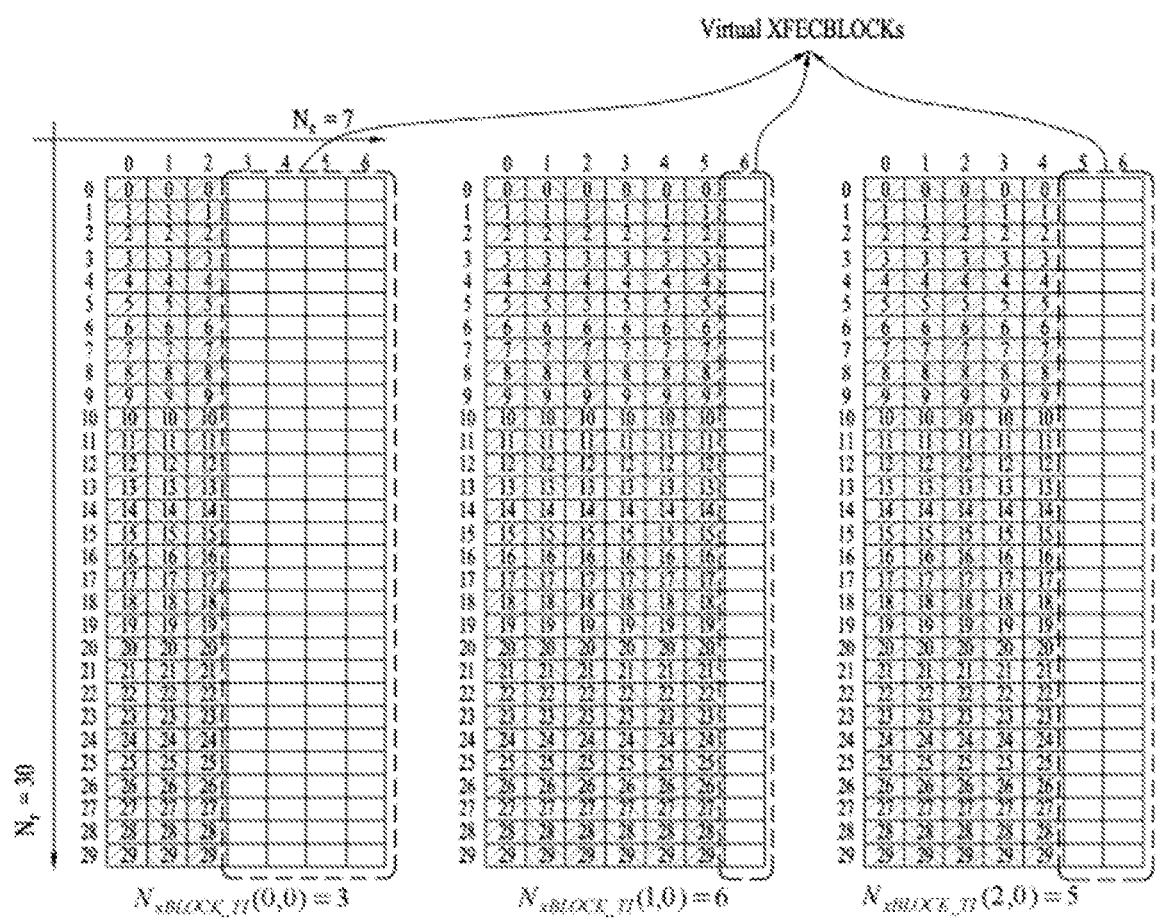

[FIG. 32]
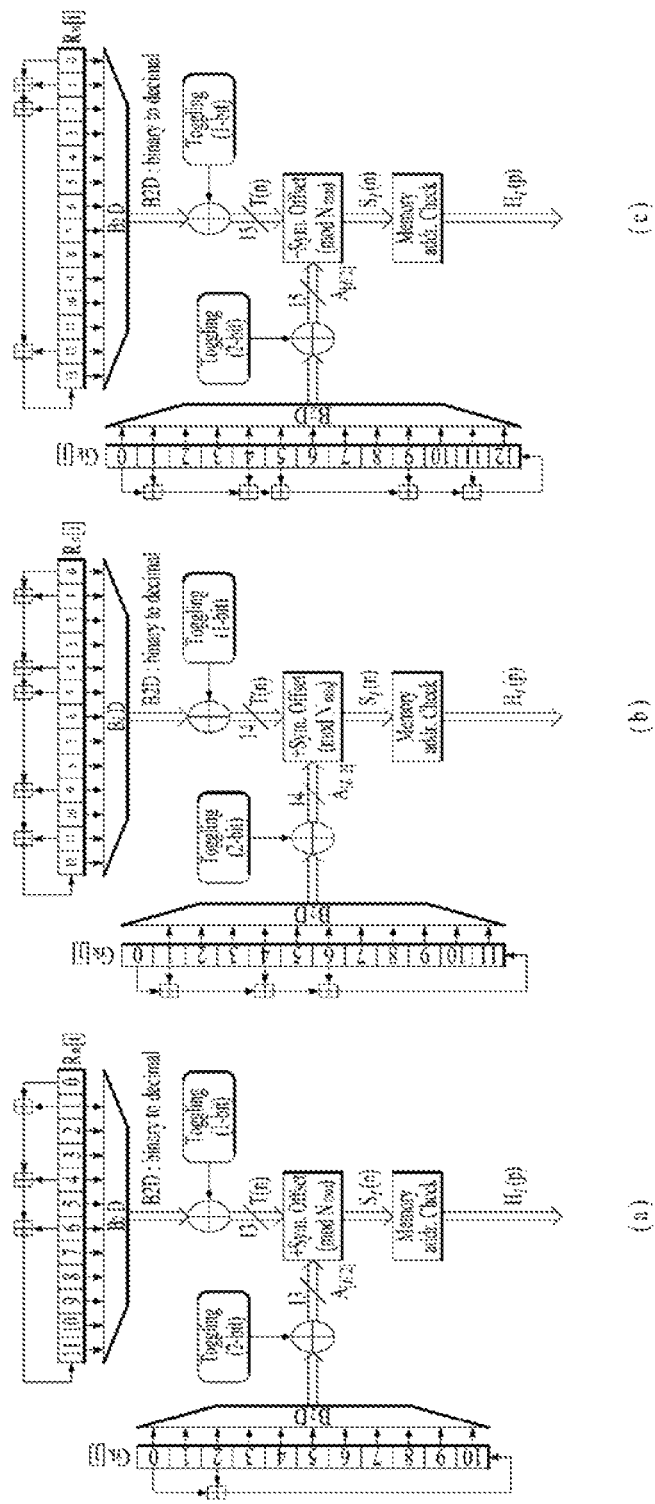

[FIG. 33]

The main-PRBS generator is defined based on the $(N_r-1)$-bit binary word sequence $R_n$ with $N_r = \log_2 N_{max}$ $0 \leq n < 2$
  $R_n[N_r-2, N_r-3, \ldots, 1, 0] = 0, 0, \ldots, 0, 0$
$n = 2$
  $R_n[N_r-2, N_r-3, \ldots, 1, 0] = 0, 0, \ldots, 0, 1$
$2 < n < N_{max}$
  $R_n[N_r-3, N_r-4, \ldots, 1, 0] = R_n[N_r-2, N_r-3, \ldots, 2, 1]$
where
$R_n[N_r-2]$ is defined as:

in 8K FFT mode: $R_n[11] = R_{n-1}[0] \oplus R_{n-1}[1] \oplus R_{n-1}[4] \oplus R_{n-1}[6]$
in 16K FFT mode: $R_n[12] = R_{n-1}[0] \oplus R_{n-1}[1] \oplus R_{n-1}[4] \oplus R_{n-1}[5] \oplus R_{n-1}[9] \oplus R_{n-1}$
in 32K FFT mode: $R_n[13] = R_{n-1}[0] \oplus R_{n-1}[1] \oplus R_{n-1}[2] \oplus R_{n-1}[12]$ (a)

| FFT mode | Nmax |
|---|---|
| 8K | 8192 |
| 16K | 16384 |
| 32K | 32768 |

The sub-PRBS generator is defined based on the $(N_b-1)$-bit binary word sequence $G_i$ with $N_b = \log_2(0.5 N_{max})$ $0 \leq k < 4$
  $G_i[N_b-2, N_b-3, \ldots, 1, 0] = 0, 0, \ldots, 0, 0$
$k = 4$
  $G_i[N_b-2, N_b-3, \ldots, 1, 0] = 1, 1, \ldots, 1, 1$
$4 < k < N_{max}$
  $G_i[N_b-3, N_b-4, \ldots, 1, 0] = G_{i-1}[N_b-2, N_b-3, \ldots, 2, 1]$ where
  $G_i[N_b-2]$ is defined as:

in 8K FFT mode: $G_i[1] = G_{i-1}[0] \oplus G_{i-1}[2]$
in 16K FFT mode: $G_i[11] = G_{i-1}[0] \oplus G_{i-1}[1] \oplus G_{i-1}[4] \oplus G_{i-1}[6]$
in 32K FFT mode: $G_i[12] = G_{i-1}[0] \oplus G_{i-1}[1] \oplus G_{i-1}[4] \oplus G_{i-1}[5] \oplus G_{i-1}[9] \oplus G_{i-1}[11]$ (a)

$p = 0;$
$for\ (n=0; n < N_{max}; n=n+1)$
  $\{T(n) = (n \bmod 2) \cdot 2^{N_b-1} + \sum_{i=0}^{N_b-2} (2^i \cdot R_p[i]);$
  $S_l(n) = (T(n) + A_{\lfloor p/2 \rfloor}) \bmod N_{max};$
  $if\ S_l(n) < N_{data}$
    $\{H_l(p) = S_l(n);$
    $p = p + 1;\}$
  $\}$ $(n \bmod 2) \cdot 2^{N_b-1}$ denotes 1-bit toggling, i.e., $R_p[N_b-1] = 0, 1, 0, 1, \ldots$ and
  the cyclic-shifting value $A_{\lfloor p/2 \rfloor}$ is calculated for every OFDM symbol pair (b)

[FIG. 35]

【FIG. 36】
| PLP_NUM | 1 | >1 |
|---|---|---|
| Interleaving type | CI | CI+BI |
【FIG. 37】
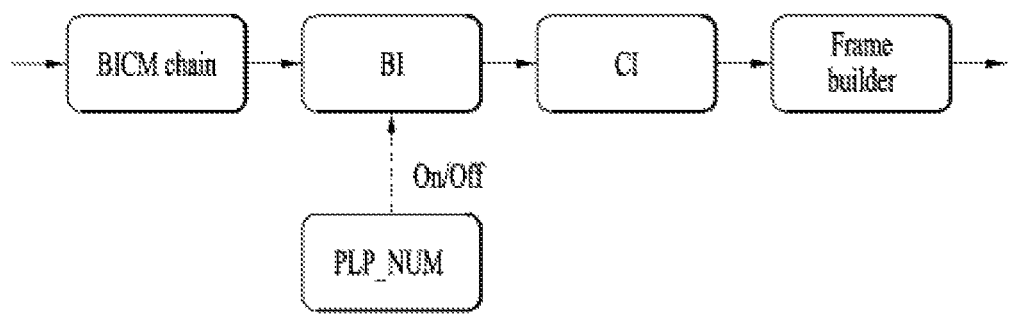
<Hybrid TI structure: example-1>
【FIG. 38】
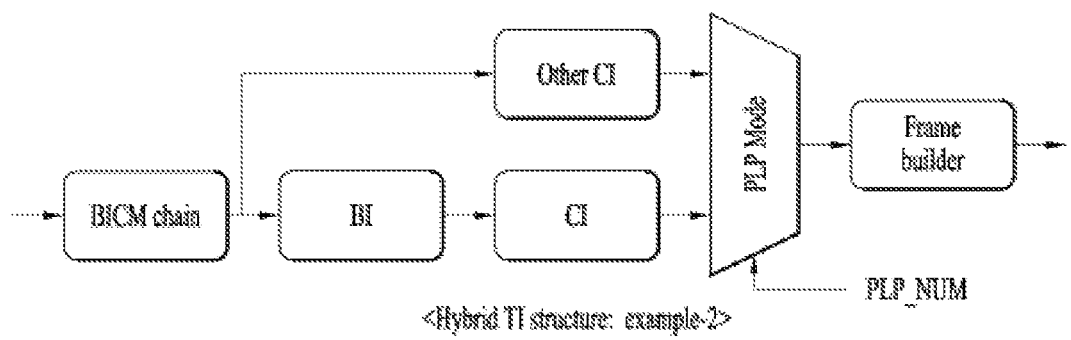
<Hybrid TI structure: example-2>

【FIG. 39】
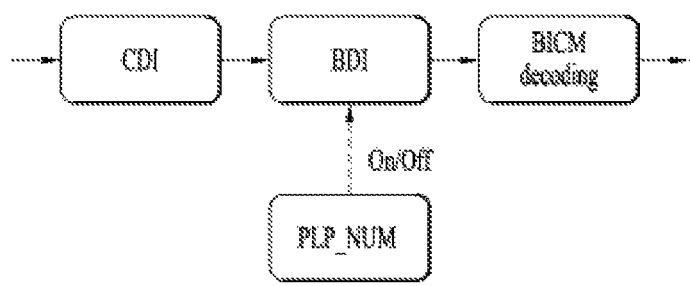
<Hybrid TI structure: example-1>
【FIG. 40】
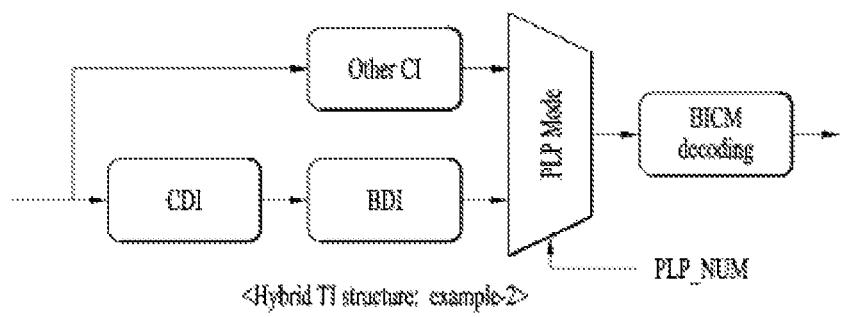
<Hybrid TI structure: example-2>

[FIG. 41]
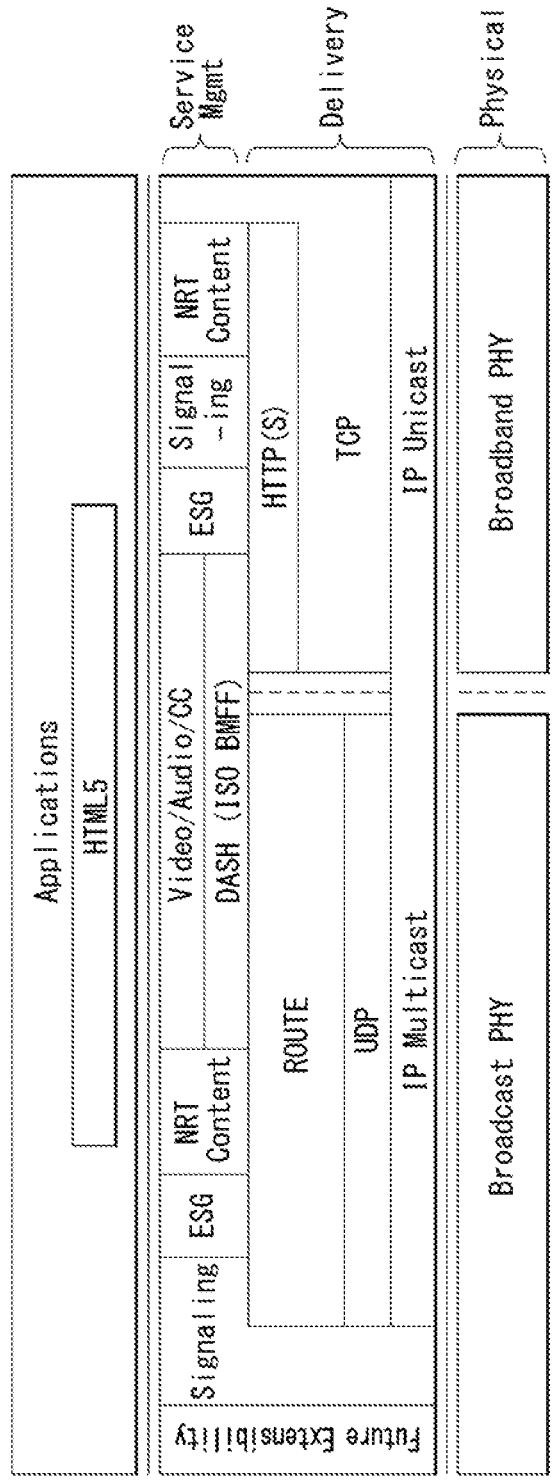

[FIG. 42]
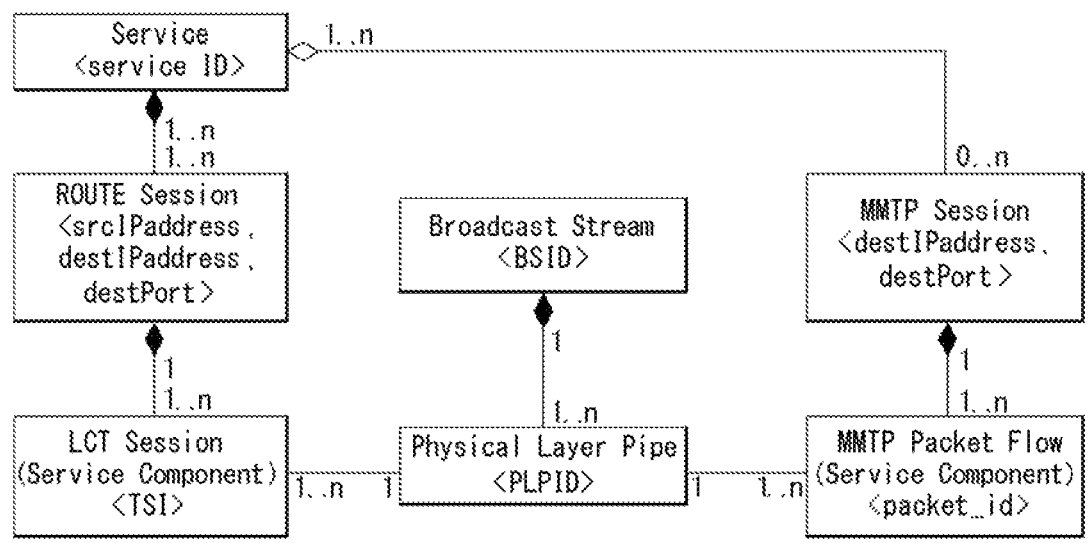

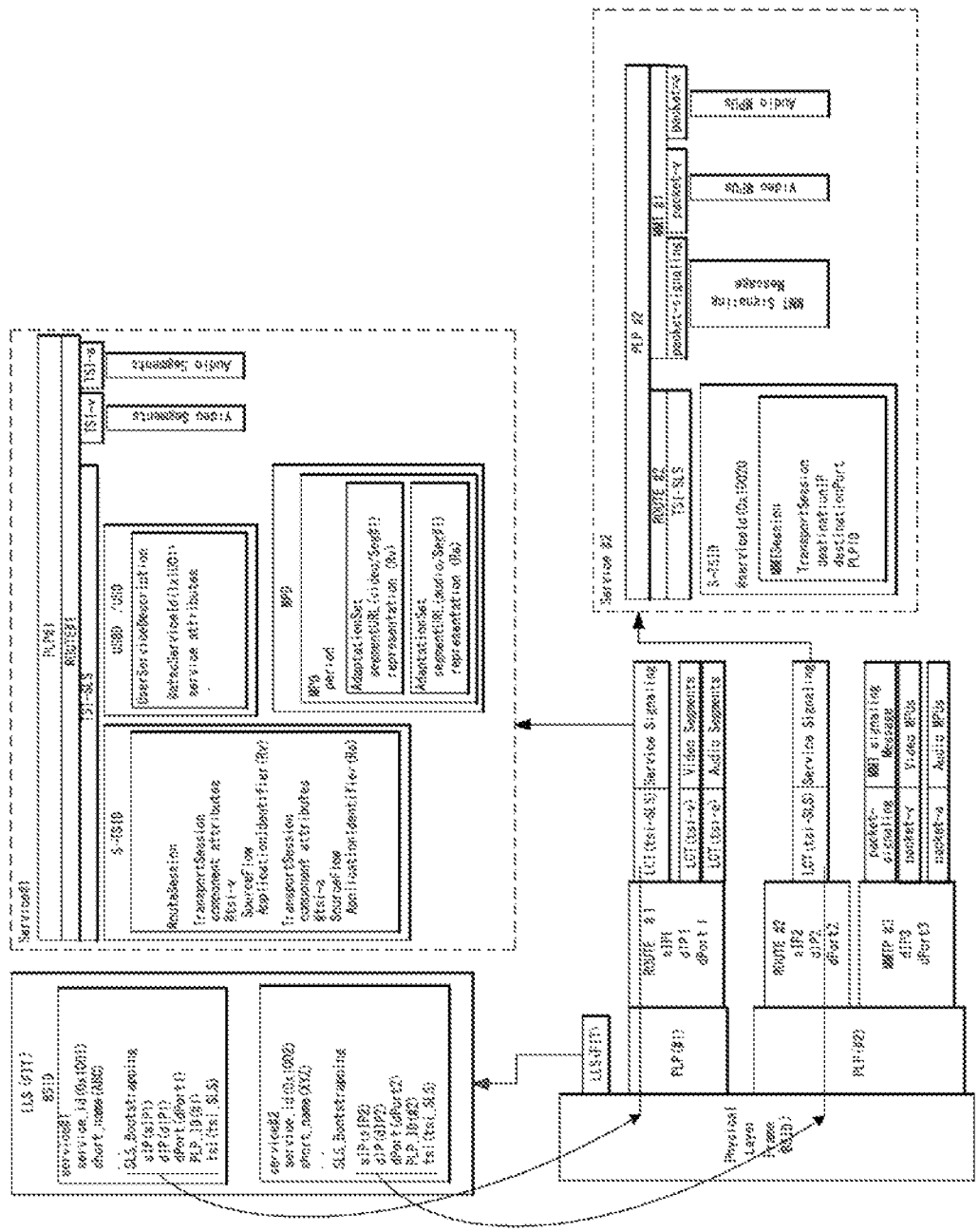
[FIG. 43]

【FIG. 44】

| Syntax | No. of Bits | Format |
|---|---|---|
| fast_information_table() { | | |
|   FIT_protocol_version | 8 | uimsbf |
|   broadcast_stream_id | 16 | uimsbf |
|   FIT_section_number | 4 | |
|   totalFIT_section_number | 4 | |
|   FIT_section_version | 4 | |
|   FIT_section_length | 12 | |
|   num_services | 8 | uimsbf |
|   for (i=0; i<num_services; i++) { | | |
|     service_id | 16 | uimsbf |
|     SLS_data_version | 8 | uimsbf |
|     service_category | 5 | uimsbf |
|     short_service_name_length | 3 | uimsbf |
|     for (j=0; j<short_name_length; j++) { | | |
|       short_service_name_byte_pair() | 16*m | bslbf |
|     } | | |
|     provider_id | 8 | uimsbf |
|     service_status | 3 | uimsbf |
|     sp_indicator | 1 | bslbf |
|     num_service_level_descriptors | 4 | uimsbf |
|     for (j=0; j<num_service_level_descriptors; j++) { | | |
|       service_level_descriptor() | var | |
|     } | | |
|   } | | |
|   reserved | 4 | '1111' |
|   num_FIT_level_descriptors | 4 | uimsbf |
|   for (n=0; n<num_FIT_level_descriptors; n++) { | | |
|     FIT_level_descriptor() | var | |
|   } | | |
| } | | |

[FIG. 45]

| Descriptor Name | Descriptor Tag | ATSC3.0 Broadcast | |
|---|---|---|---|
| | | Service level | FIT level |
| broadcast_signaling_location_descriptor() | TBD | M | |
| inet_signaling_location_descriptor() | TBD | O | O |
| capability_descriptor() | TBD | O | |

List and Location of ATSC3.0 Fast Information Table Descriptors

[FIG. 46]

| Syntax | No. of Bits | Format |
|---|---|---|
| broadcast_signaling_location_descriptor() { | | |
|     descriptor_tag | 8 | TBD |
|     descriptor_length | 8 | |
|     reserved | 6 | '111111' |
|     IP_version_flag | 1 | bslbf |
|     SLS_source_IP_address_flag | 1 | bslbf |
|     if (SLS_source_IP_address_flag) { | | |
|         SLS_source_IP_address | 32 or 128 | uimsbf |
|     } | | |
|     SLS_destination_IP_address | 32 or 128 | uimsbf |
|     SLS_destination_UDP_port | 16 | uimsbf |
|     SLS_TSI | 16 | uimsbf |
|     SLS_PLP_ID | 8 | uimsbf |
| } | | |

Bit Stream Syntax for broadcast_signaling_location_descriptor()

[FIG. 47]

| Syntax | No. of Bits | Format |
|---|---|---|
| inet_signaling_location_descriptor () { | | |
|     descriptor_tag | 8 | TBD |
|     descriptor_length | 8 | |
|     provider_id | 8 | uimsbf |
|     URL_type | 8 | uimsbf |
|     URL_bytes () | descriptor_length-2 | |
| } | | |

[FIG. 48]

| Resource(s) Requested | Query Term(s) |
|---|---|
| SLS Set | ? SLS = ALL [ &svc=<service_id>] |
| SLS Diff Set | ? SLS = Diff ALL [ &svc=<service_id> ] |
| SLS Template | ?SLS=Template [ &svc=<service_id> >] |
| USD | ? SLS = USD [ &svc=<service_id>] |
| S-TSID | ? SLS =S-TSID[&svc=<service_id>] |
| ESG | ? ESG [ &prv =< prv >] |

[FIG. 49]

| Table(s) Requested | Query Term(s) |
|---|---|
| SLS Set | ? SLS = ALL |
| SLS Diff Set | ?SLS=DiffALL |
| SLS Template | ?SLS=Template |
| USD | ? SLS = USD |
| S-TSID | ? SLS = S-TSID |
| MPD | ? SLS = MPD |

【FIG. 50】

| Element or Attribute Name | | | | Use |
|---|---|---|---|---|
| fit | | | | |
| | @bsid | | | M |
| | @fitSectionNumber | | | M |
| | @totalFitSectionNumber | | | M |
| | @fitSectionVersion | | | M |
| | Service | | | 1···N |
| | | @serviceId | | M |
| | | @providerId | | O |
| | | @serviceCategory | | O |
| | | @spIndicator | | O |
| | | @serviceStatus | | O |
| | | @shortServiceName | | O |
| | | @SLSVersion | | M |
| | | capabilityCode | | 0···1 |
| | | inetSignalingLocation | | 0···1 |
| | | | @urlType | M |
| | | | @url | M |
| | | broadcastSignalingLocation | | 1 |
| | | | @IPVersion | OD |
| | | | @sourceIPAddress | O |
| | | | @destinationIPAddress | M |
| | | | @destinationUdpPort | M |
| | | | @TSI | O |
| | | | @PLPID | O |
| | inetSignalingLocation | | | 0···1 |
| | | @providerId | | O |
| | | @urlType | | M |
| | | @url | | M |

Legend:
For attributes: M=Mandatory, O=Optional, OD=Optional with
Default Value, CM=Conditionally Mandatory.
For elements: <minOccurs>...<maxOccurs> (N=unbounded)
Elements are bold; attributes are non-bold and preceded with an @.

[FIG. 51]
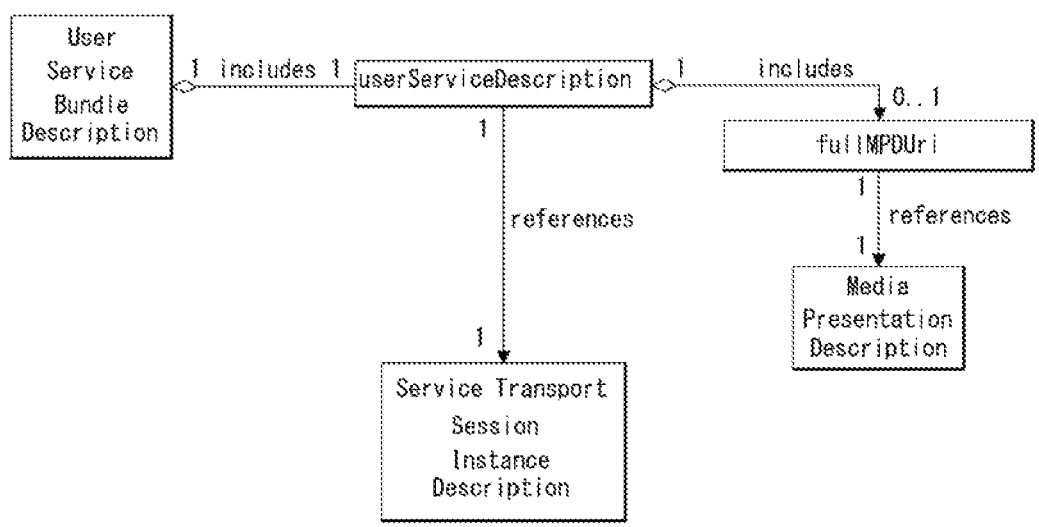

[FIG. 52]

| Element or Attribute Name | | | | Use |
|---|---|---|---|---|
| bundleDescription | | | | |
| | userServiceDescription | | | |
| | | @serviceId | | M |
| | | @atsc:serviceId | | M |
| | | @atsc:fullMPDUri | | M |
| | | @atsc:sTSIDUri | | M |
| | | name | | 0...N |
| | | | lang | CM |
| | | serviceLanguage | | 0...N |
| | | atsc:capabilityCode | | 0...1 |
| | | deliveryMethod | | 1...N |
| | | | atsc:broadcastAppService | 1...N |
| | | | | basePattern | 1...N |
| | | | atsc:unicastAppService | 0...N |
| | | | | basePattern | 1...N |

Legend:
  For attributes: M=Mandatory, O=Optional, OD=Optional with Default Value, CM=Conditionally Mandatory.
  For elements: <minOccurs>...<maxOccurs> (N=unbounded)
  Note that the conditions only holds without using xlink:href. If linking is used, then all attributes are "optional" and <minOccurs=0>
Elements are bold; attributes are non-bold and preceded with an @.

[FIG. 53]

| Element/@Attribute | | | | Use |
|---|---|---|---|---|
| S - TSID | | | | |
| | @serviceId | | | O |
| | RS | | | 0..N |
| | | @bsid | | OD |
| | | @sIpAddr | | OD |
| | | @dIpAddr | | OD |
| | | @dport | | OD |
| | | @PLPID | | OD |
| | | LS | | 1..N |
| | | | @tsi | M |
| | | | @PLPID | OD |
| | | | @bw | O |
| | | | @startTime | O |
| | | | @endTime | O |
| | | | SrcFlow | 0..1 |
| | | | RprFlow | 0..1 |
| | MS | | | 0..1 |
| | | @versionNumber | | OD |
| | | @bsid | | OD |
| | | @sIpAddr | | O |
| | | @dIpAddr | | M |
| | | @dport | | M |
| | | @packetId | | OD |
| | | @PLPID | | OD |
| | | @bw | | O |
| | | @startTime | | O |
| | | @endTime | | O |

Legend:
For attributes: M=Mandatory, O=Optional, OD=Optional with Default Value, CM=Conditionally Mandatory.
For elements: <minOccurs>...<maxOccurs> (N=unbounded)
Note that the conditions only holds without using xlink:href. If linking is used, then all attributes are "optional" and <minOccurs=0>
Elements are bold; attributes are non-bold and preceded with an @.

[FIG. 54]
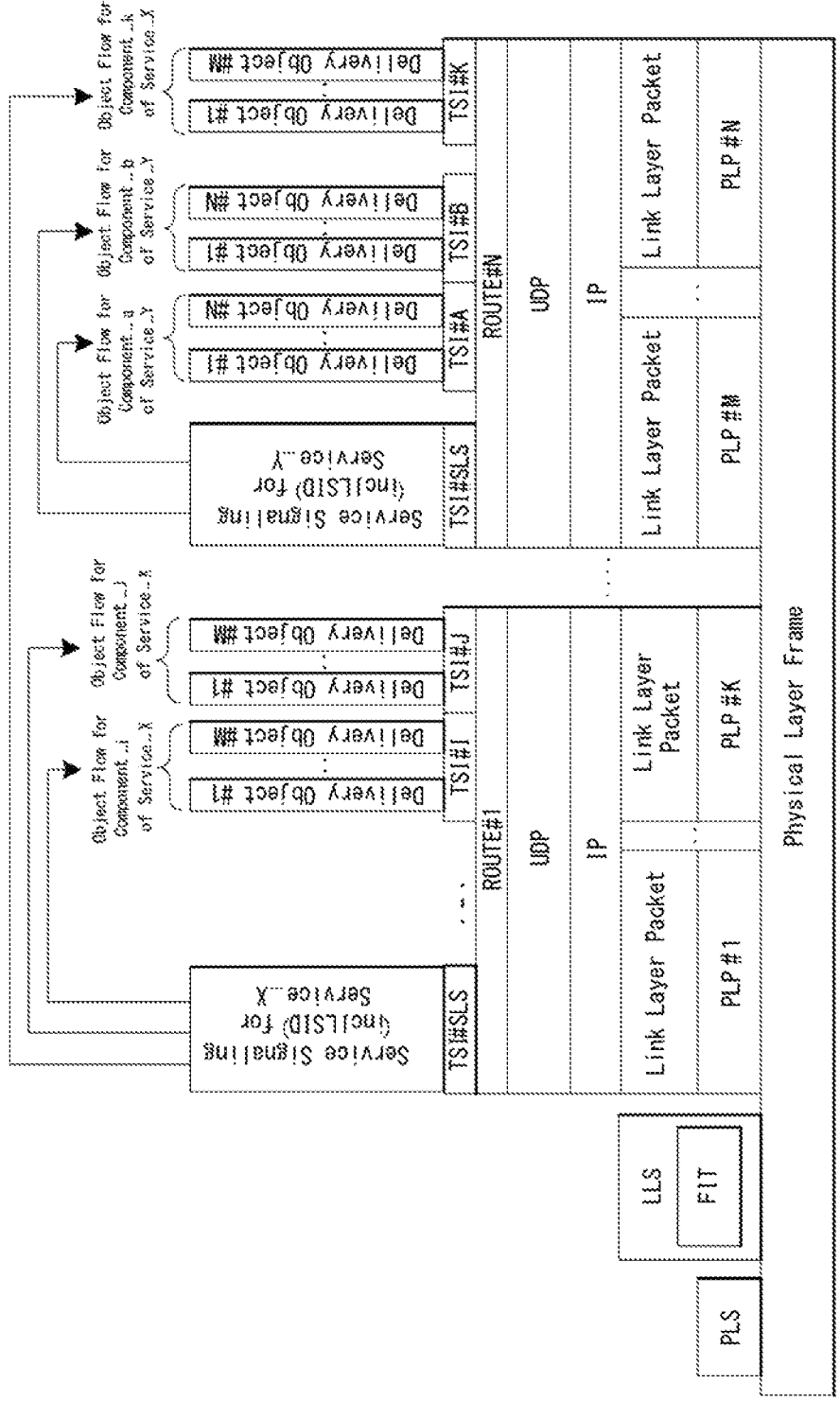

[FIG. 55]
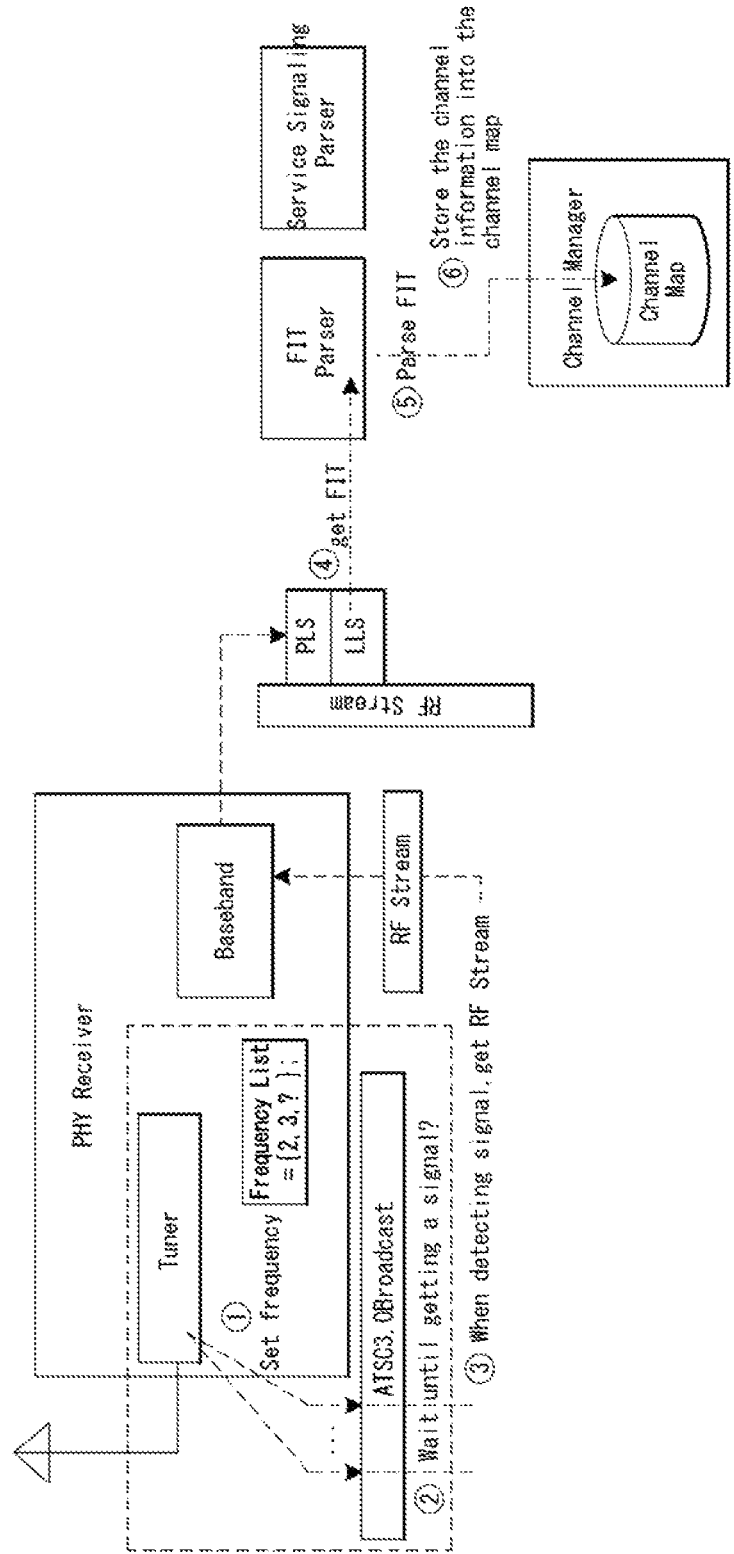

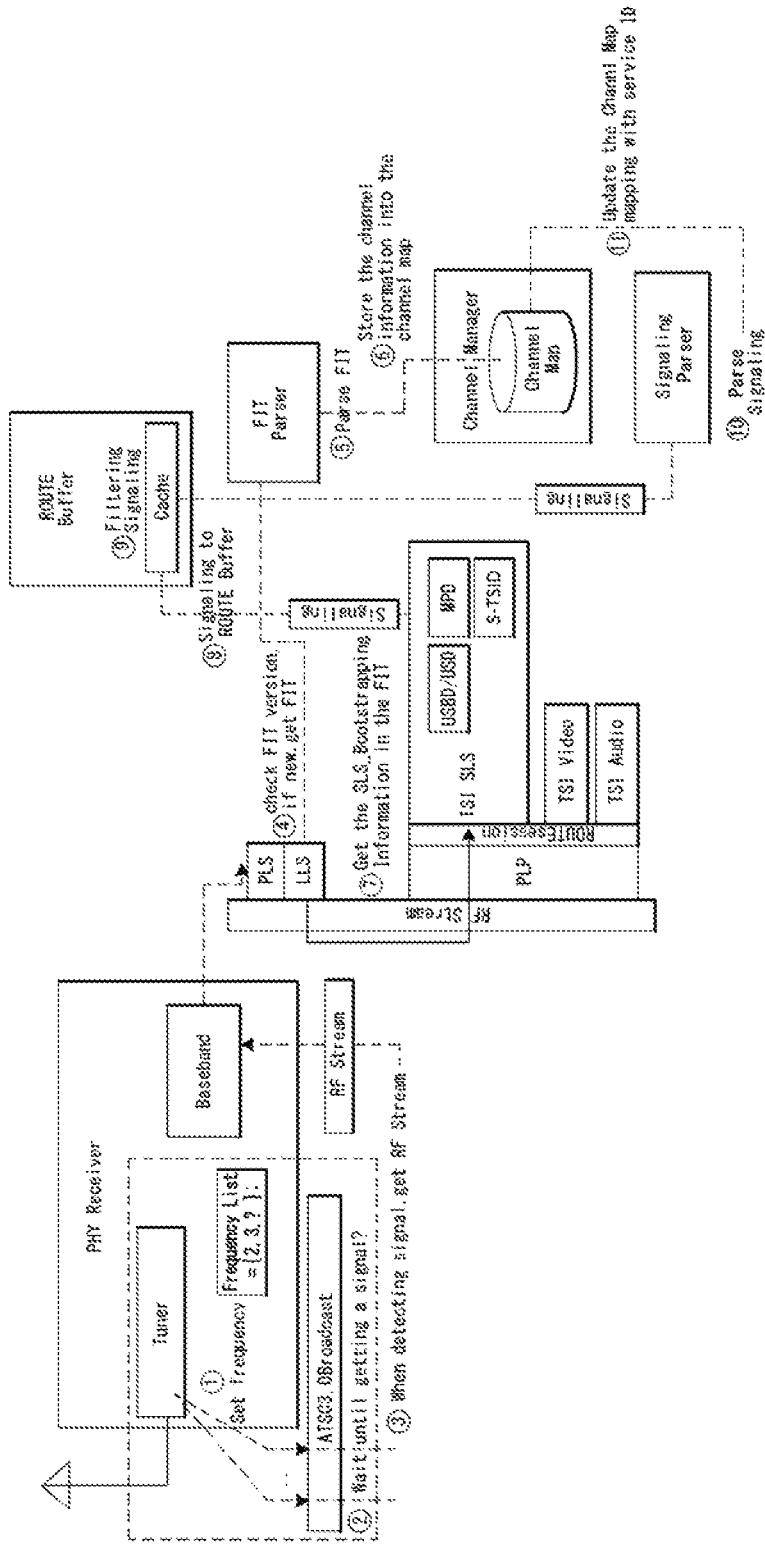
[FIG. 56]

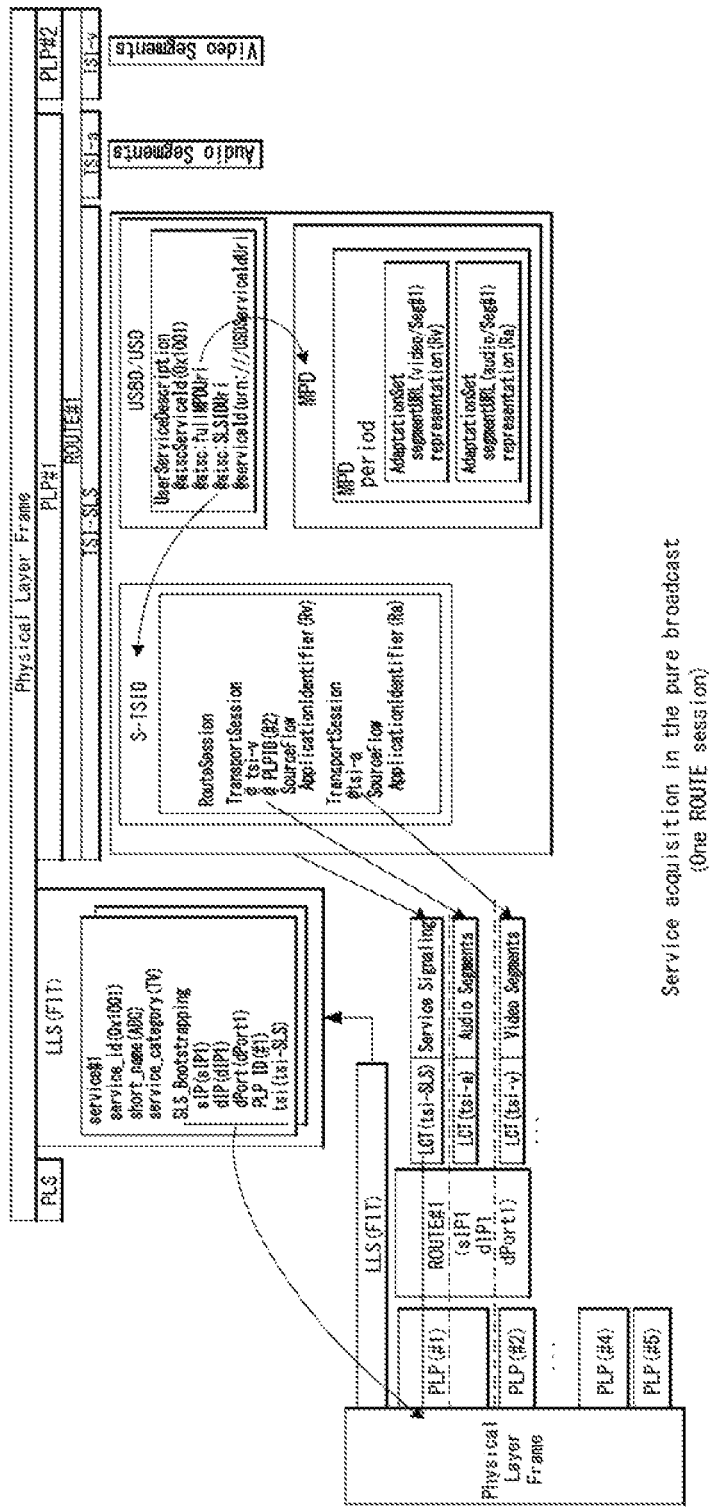
[FIG. 57]

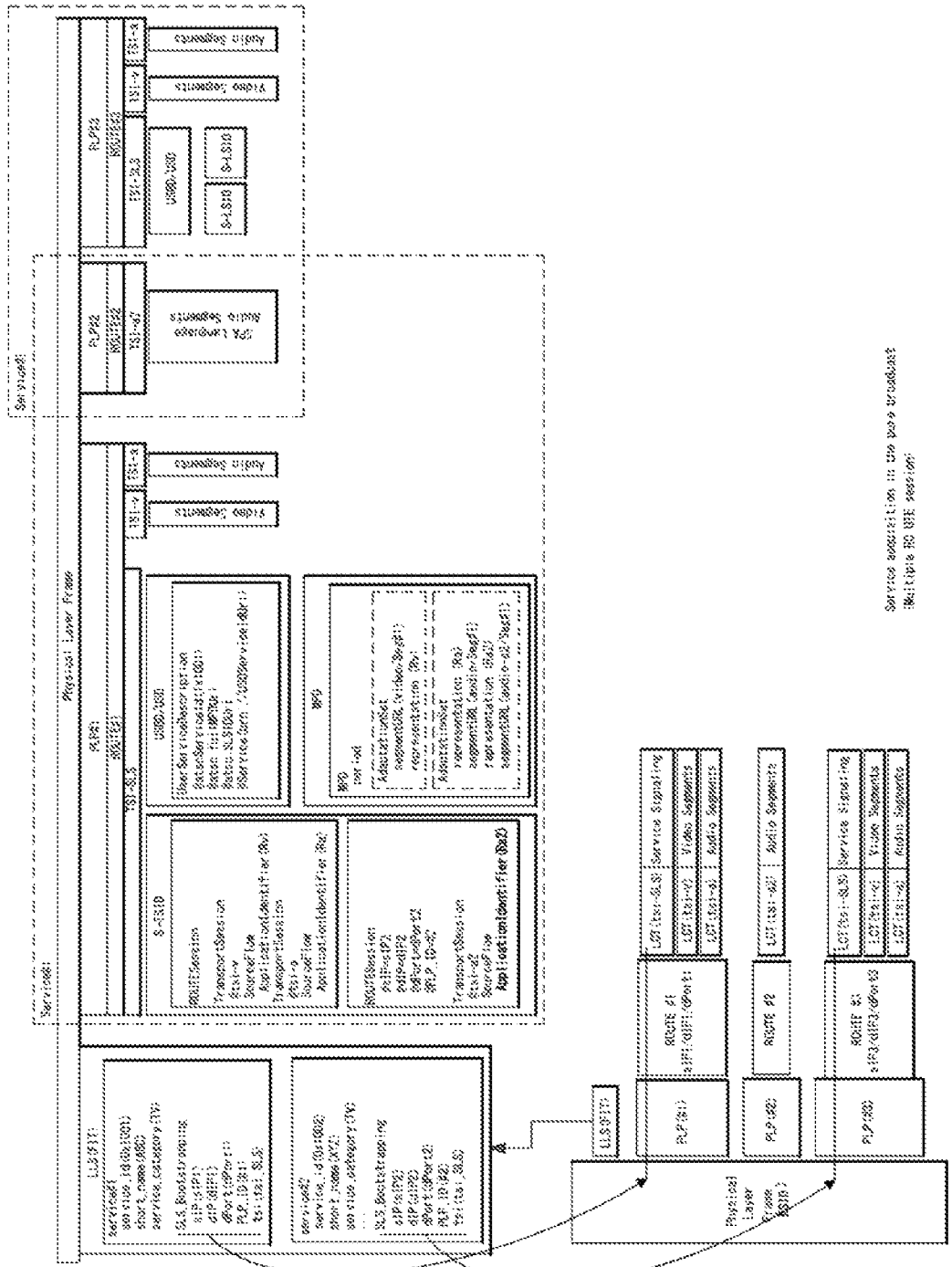
[FIG. 58]

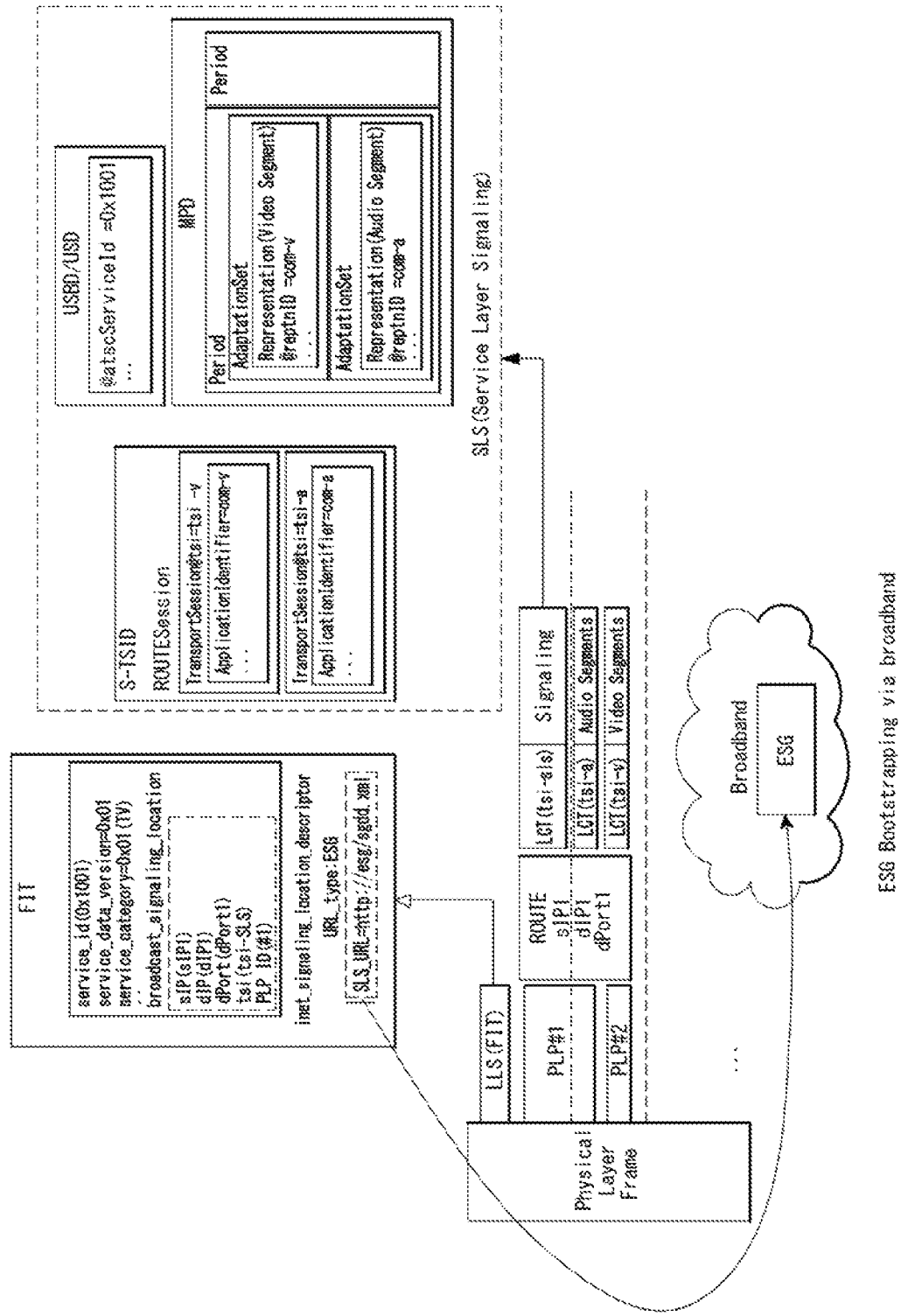
[FIG. 59]

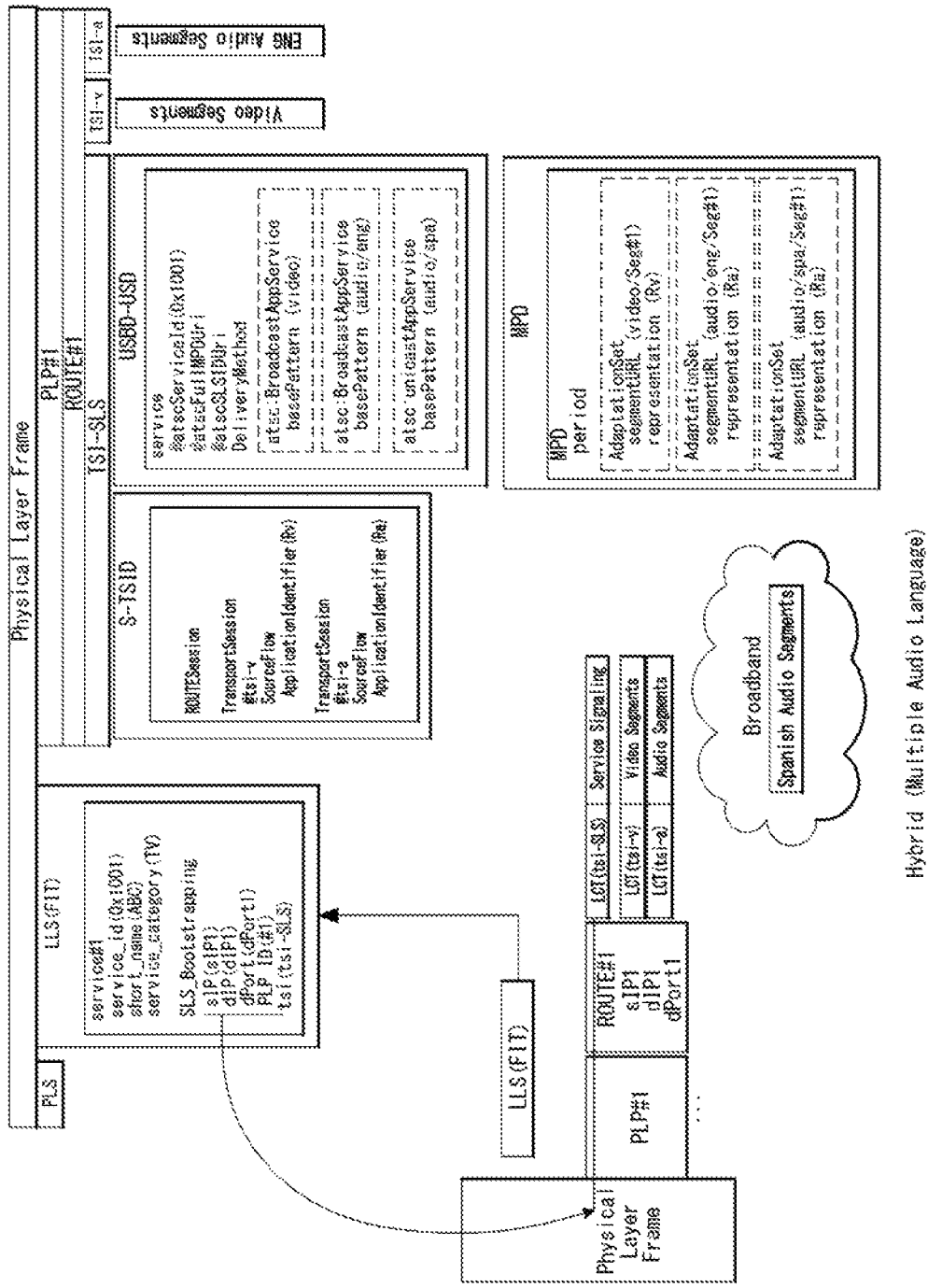
[FIG. 60]

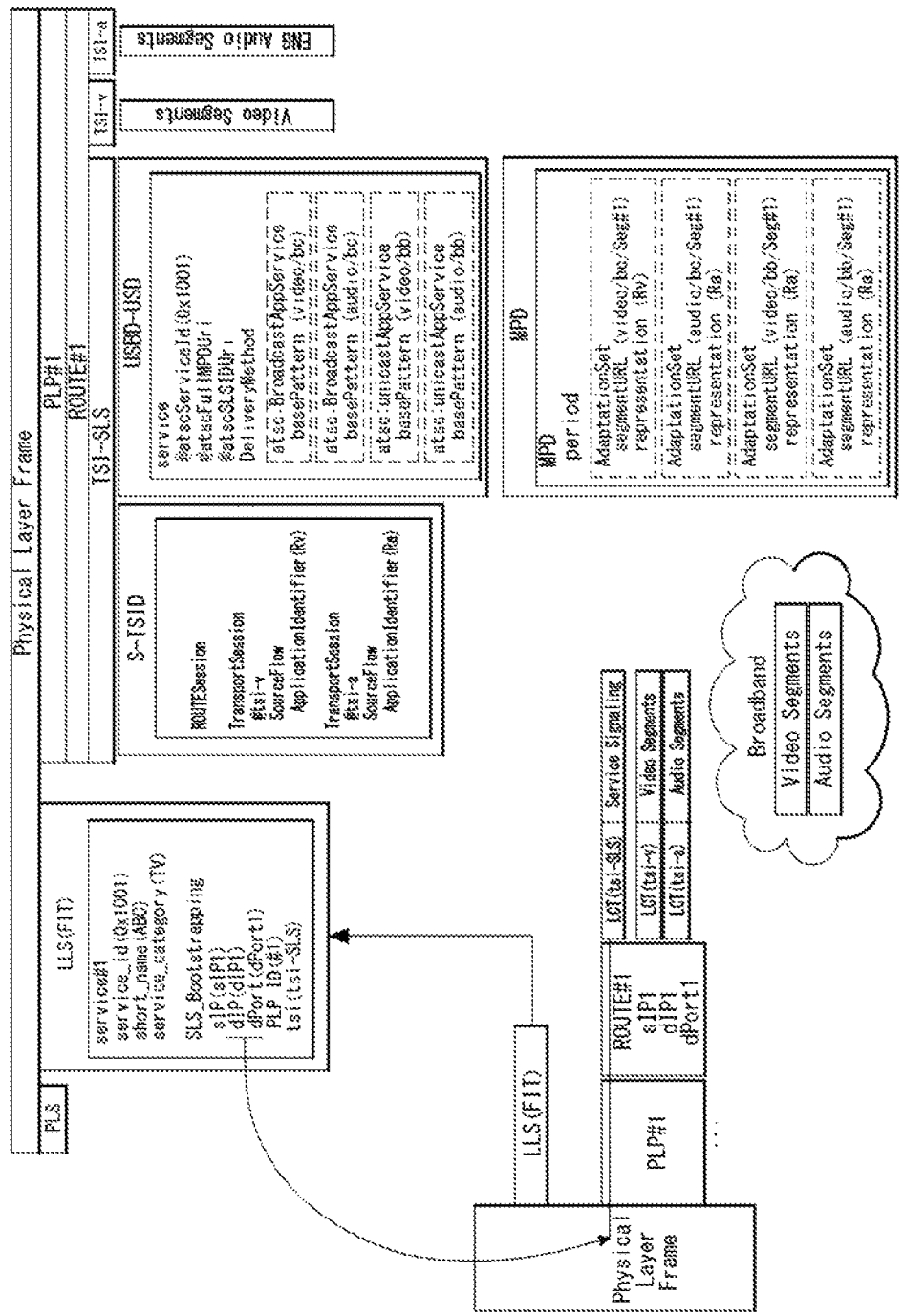
[FIG. 61]

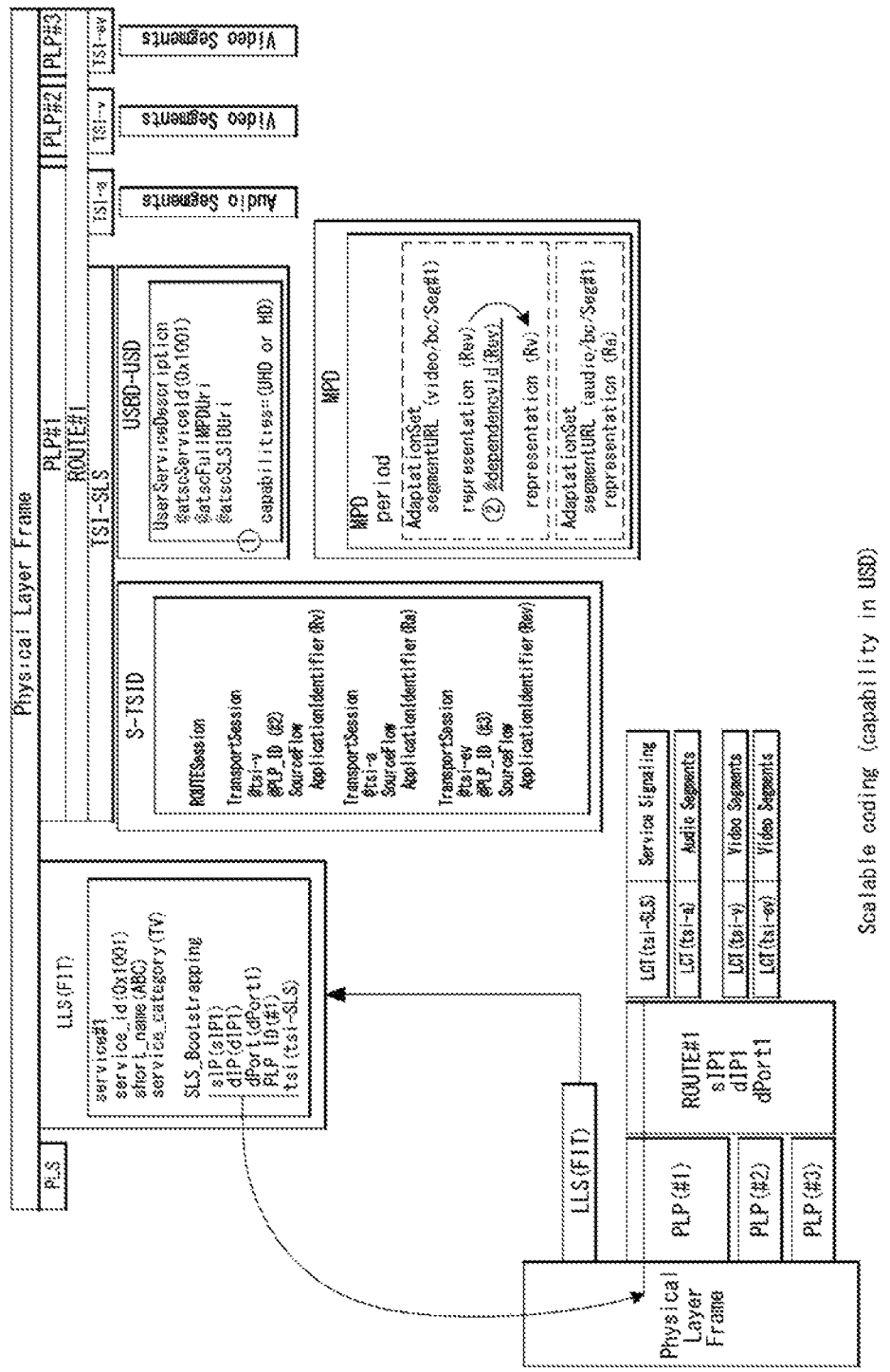
[FIG. 62]

[FIG. 63]

```
metadataEnvelope.
<metadataEnvelope xmlns="urn:3gpp:metadata:2005:MBMS:envelope">
  <item metadataURI="SignalingInstanceID"
version=" SignalingInstanceVersion"   -- optional
    <metadataFragment>
      <![CDATA[<diffUpdate>
        <templateID>SignalingTemplateID</templateID>
        <templateVersion>SignalingTemplateVersion</templateVersion> - optional
        <update>Diff</update>
        </diffUpdate>]]>
    </metadataFragment>
  </item>
</metadataEnvelope>
```

[FIG. 64]
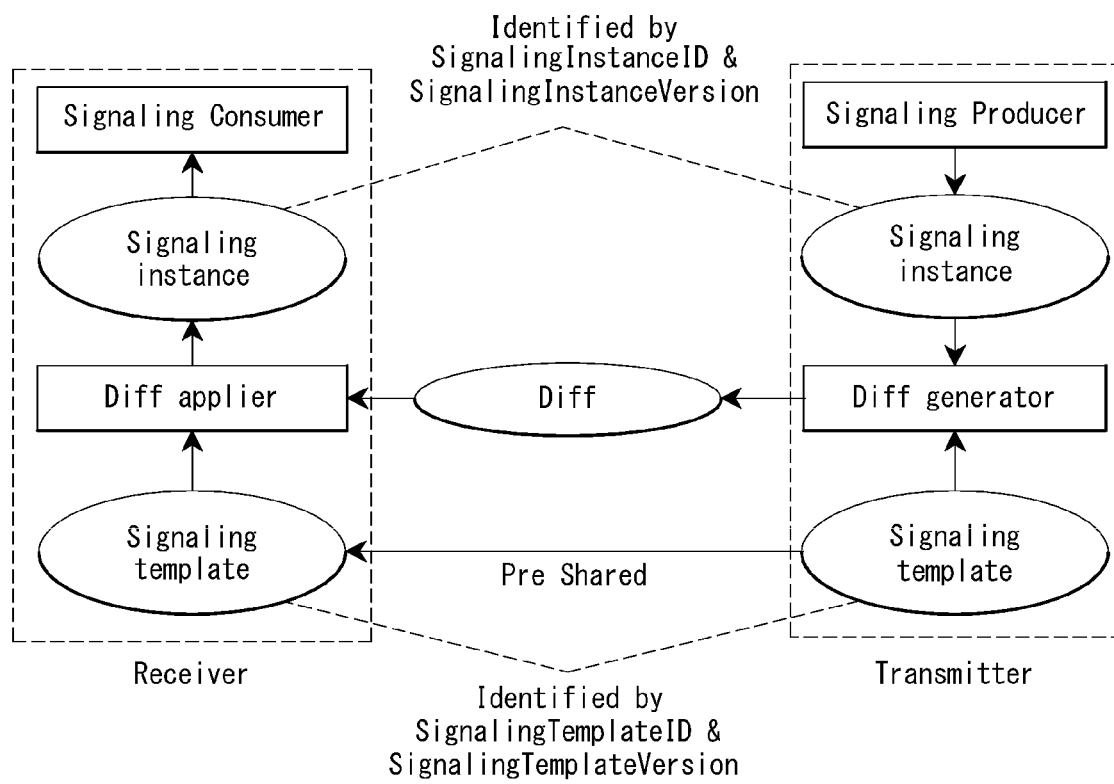
[FIG. 65]
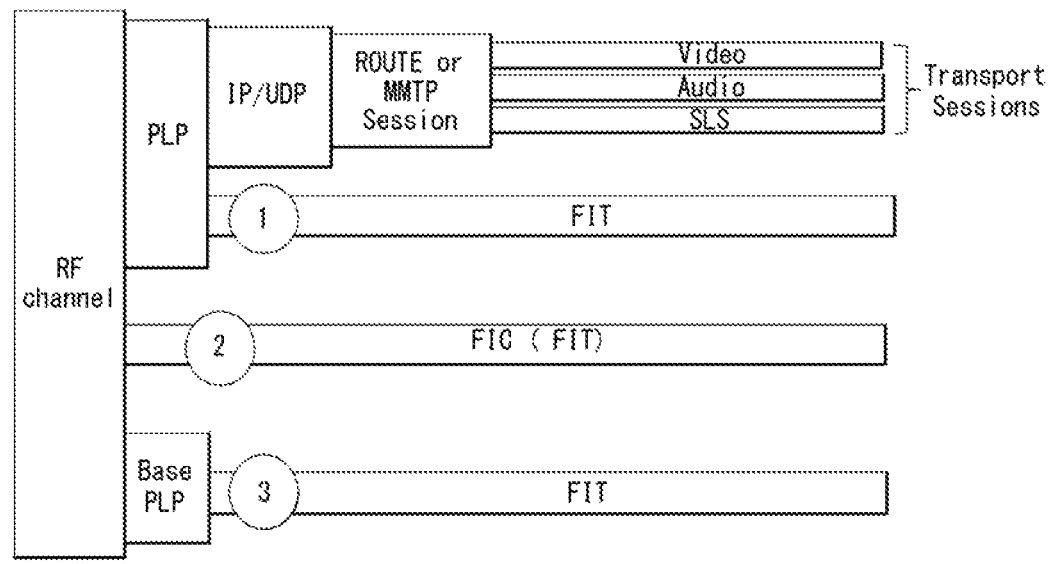

[FIG. 66]

| Syntax | No. of Bits | Format |
|---|---|---|
| service_list_table_section() { | | |
|   table_id | 8 | TBD |
|   SLT_section_version | 4 | uimsbf |
|   SLT_section_length | 12 | uimsbf |
|   SLT_protocol_version | 8 | uimsbf |
|   broadcast_stream_id | 16 | uimsbf |
|   SLT_section_number | 4 | uimsbf |
|   last_SLT_section_number | 4 | uimsbf |
|   num_services | 8 | uimsbf |
|   for (i=0; i<num_services; i++) { | | |
|     service_id | 16 | uimsbf |
|     reserved | 1 | bslbf |
|     protected | 2 | '11' |
|     rep_service_flag | 1 | bslbf |
|     major_channel_number | 10 | uimsbf |
|     minor_channel_number | 10 | uimsbf |
|     service_category | 4 | uimsbf |
|     short_service_name_length | 4 | uimsbf |
|     short_service_name() | 8*m | /* m */ |
|     reserved | 2 | '11' |
|     SLS_protocol_type | 4 | uimsbf |
|     if(SLS_protocol_type == 0x01) { | | |
|       reserved | 2 | '11' |
|       SLS_PLP_ID | 8 | uimsbf |
|       TSID | 16 | uimsbf |
|     } else { | | |
|       broadcast_components_present | 1 | bslbf |
|       SLS_source_IP_address_present | 1 | bslbf |
|       if (broadcast_components_present) { | | |
|         SLS_PLP_ID | 8 | uimsbf |
|         SLS_destination_IP_address | 32 | uimsbf |
|         SLS_destination_UDP_port | 16 | uimsbf |
|         if (SLS_source_address_present) { | | |
|           SLS_source_IP_address | 32 | uimsbf |
|         } | | |
|         if (SLS_protocol_type == 0x02) { | | |
|           ROUTE_version | 8 | uimsbf |
|         } else if (SLS_protocol_type == 0x03) { | | |
|           reserved | 6 | '111111' |
|           MMTP_version | 2 | uimsbf |
|         } else { | | |
|           reserved | var | |
|         } | | |
|       } | | |
|       reserved | 4 | '1111' |
|       num_service_level_descriptors | 4 | uimsbf |
|       for (j=0; j<num_service_level_descriptors; j++) { | | |
|         service_level_descriptor() | var | |
|       } | | |
|     } | | |
|   } | | |
|   reserved | 4 | '1111' |
|   num_SLT_level_descriptors | 4 | uimsbf |
|   for (n=0; n<num_SLT_level_descriptors; n++) { | | |
|     SLT_level_descriptor() | var | |
|   } | | |
| } | | |

【FIG. 67】

| Syntax | No. of Bits | Format |
|---|---|---|
| inet_signaling_location_descriptor () { | | |
|     descriptor_tag | 8 | TBD |
|     descriptor_length | 8 | uimsbf |
|     URL_type | 8 | uimsbf |
|     URL_bytes () | 8*(descriptor_length-1) | |
| } | | |

【FIG. 68】

| Syntax | No. of Bits | Format |
|---|---|---|
| service_language_descriptor () { | | |
|     descriptor_tag | 8 | TBD |
|     descriptor_length | 8 | uimsbf |
|     language | 3*8 | |
| } | | |

【FIG. 69】

| Syntax | No. of Bits | Format |
|---|---|---|
| Representative_service_descriptor () { | | |
|     descriptor_tag | 8 | TBD |
|     descriptor_length | 8 | uimsbf |
|     num_provider | 8 | uimsbf |
|     for (i=0; i<num_provider; i++) { | | |
|         rep_service_id | 16 | |
|     } | | |
| } | | |

【FIG. 70】

| Syntax | No. of Bits | Format |
|---|---|---|
| service_group_descriptor() { | | |
|     descriptor_tag | 8 | TBD |
|     descriptor_length | 8 | uimsbf |
|     num_service | 8 | uimsbf |
|     for(i=0;i<num_service;i++) { | | |
|         service_id | 16 | |
|     } | | |
| } | | |

【FIG. 71】

| Syntax | No. of Bits | Format |
|---|---|---|
| service_group_descriptor() { | | |
|     descriptor_tag | 8 | TBD |
|     descriptor_length | 8 | uimsbf |
|     num_broadcaster | 8 | uimsbf |
|     for(i=0;i<num_broadcaster;i++) { | | |
|         num_service | | |
|         for(j=0;j<num_service;j++) { | | |
|             service_id | 16 | |
|         } | | |
|     } | | |
| } | | |

【FIG. 72】

| Syntax | No. of Bits | Format |
|---|---|---|
| service_group_descriptor () { | | |
|     descriptor_tag | 8 | TBD |
|     descriptor_length | 8 | uimsbf |
|     num_broadcaster | 8 | uimsbf |
|     for (i=0; i<num_broadcaster; i++) { | | |
|         provider_id | 8 | uimsbf |
|         num_service | 8 | |
|         for (j=0; j<num_service; j++) { | | |
|             service_id | 16 | uimsbf |
|         } | | |
|     } | | |
| } | | |

【FIG. 73】

| Syntax | No. of Bits | Format |
|---|---|---|
| service_group_descriptor () { | | |
|     descriptor_tag | 8 | TBD |
|     descriptor_length | 8 | uimsbf |
|     provider_id | 8 | uimsbf |
| } | | |

[FIG. 74]

| Element or Attribute Name | | | Use |
|---|---|---|---|
| slt | | | |
| | @bsid | | 1 |
| | @sltSectionVersion | | 1 |
| | @sltSectionNumber | | 0..1 |
| | @totalSltSectionNumbers | | 0..1 |
| | @language | | 0..1 |
| | @providerId | | 0..1 |
| | InetSigLocation | | 0..1 |
| | RepresentativeService | | 0..1 |
| | ServiceGroup | | 0..1 |
| | Service | | 1..N |
| | | @serviceId | M |
| | | @protected | 0..1 |
| | | @representative | 0..1 |
| | | @majorChannelNo | 1 |
| | | @minorChannelNo | 1 |
| | | @serviceCategory | 1 |
| | | @shortServiceName | 1 |
| | | @SLSProtocolType | 1 |
| | | @slsPlpId | 0..1 |
| | | @slsDestinationIpAddress | 0..1 |
| | | @slsDestinationUdpPort | 0..1 |
| | | @slsSourceIpAddress | 0..1 |
| | | @mmtpVersion | 0..1 |
| | | @routeVersion | 0..1 |
| | | @service_language | 0..1 |
| | | InetSigLocation | 0..1 |
| | | ServiceProvider | 0..1 |

【FIG. 75】

| InetSigLocation | 0...1 | Contains URL telling where a receiver can acquire any requested type of data from external server(s) via broadband. |
|---|---|---|
| @urlType | 1 | Attribute indicates the type of URL, this value is coded according to Table 3.6. |
| @url | 1 | This URL can be used by a query term to indicate what the type of resource is by which requesting with this URL. If the type of resource is SLS, it gives a single URL where the receiver can retrieve SLS over broadband for all services fragment in this SLT. In this case, optional string(svc) is very useful and the receiver can request SLS for a specific service if svc query string is appended at the end of query terms. If the type of resource is ESG, it gives a single URL for all providers described in this SLT. In this case, optional string(prv) is useful and the receiver can request ESG for a specific provider if prv query string is appended at the end of query terms. The base URL shall be further extended by one of the query terms from Table 3.7, in order to indicate the resource(s) desired. If the serviceCategory is ESG service, this URL shall mean the internet server that receivers can retrieve ESG. |

【FIG. 76】

| Representative Service | 0...1 | Contains representative service list of the number of broadcasters which are sharing one RF frequency. |
|---|---|---|
| RepServiceId | 1..N | This unsigned integer shall have the same value as the serviceId attribute in the Service element of the SLT. |

[FIG. 77]

| ServiceGroup | 0..1 | Contains service group list of the number of broadcasters which are sharing one RF frequency. |
|---|---|---|
| Provider | 1..N | Broadcaster which is consuming one RF frequency. |
| @broadcaster_id | 0..1 | Attribute indicates the identifier of broadcaster. This value is optional. |
| serviceId | 1..N | This unsigned integer shall have the same value as the serviceId attribute in the Service element of the SLT. |

[FIG. 78]

| Service Provider | 0..1 | |
|---|---|---|
| @id | 1 | Provider identifier |

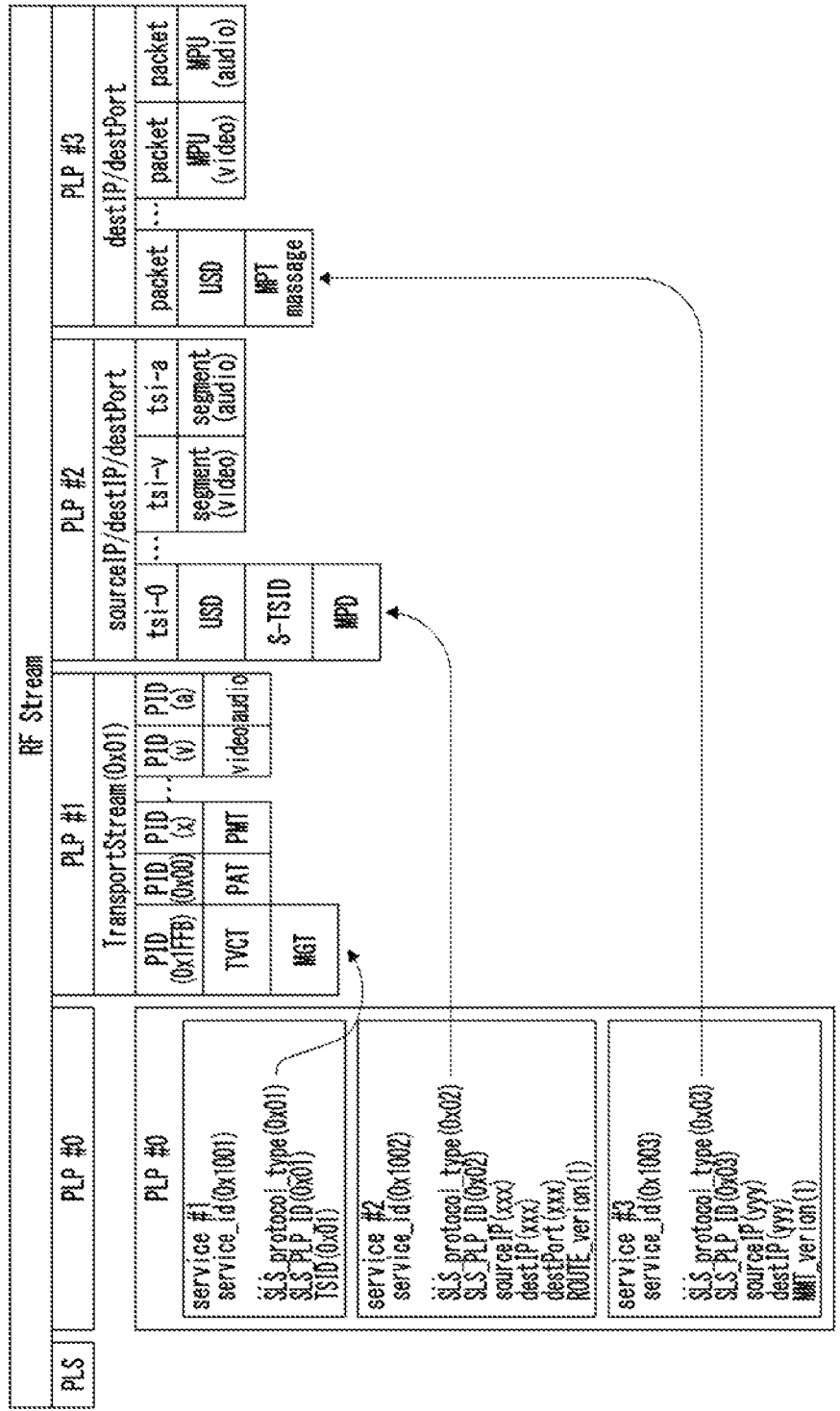
[FIG. 79]

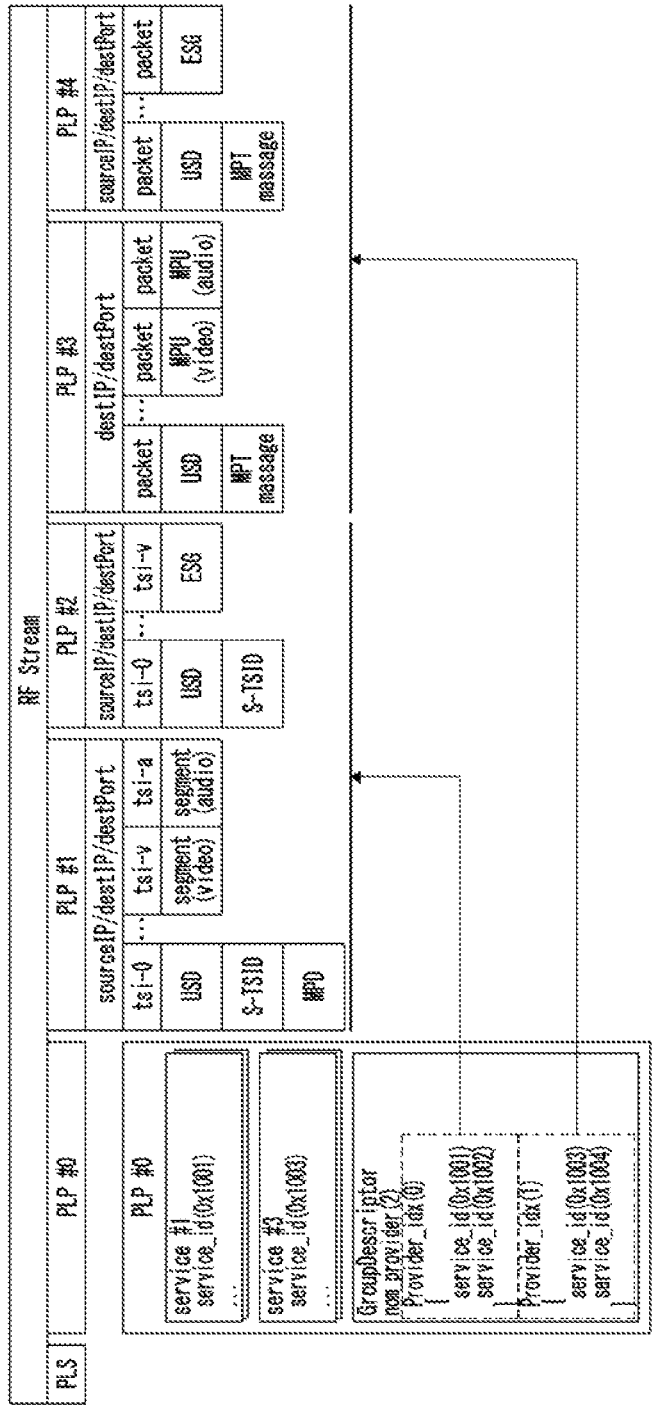
[FIG. 80]

[FIG. 81]
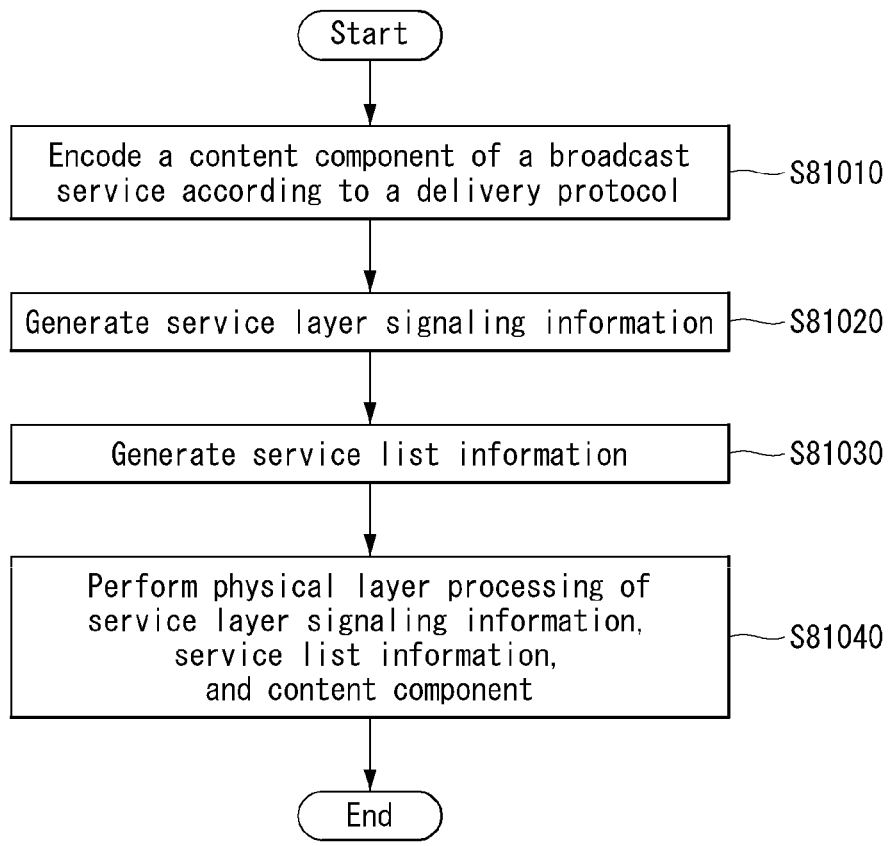

[FIG. 82]
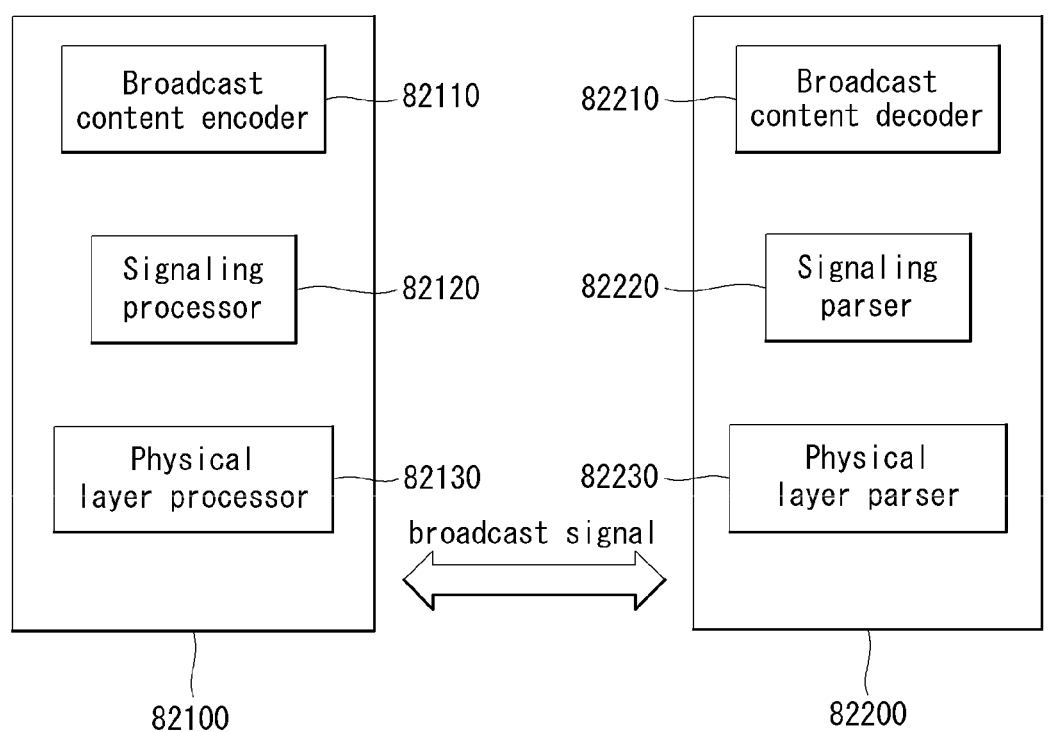

APPARATUS AND METHOD FOR TRANSMITTING AND RECEIVING BROADCAST SIGNAL

CROSS-REFERENCE TO RELATED APPLICATIONS

This application is the National Stage filing under 35 U.S.C. 371 of International Application No. PCT/KR2016/002255, filed on Mar. 7, 2016, which claims the benefit of U.S. Provisional Application No. 62/129,933, filed on Mar. 8, 2015, 62/130,612, filed on Mar. 10, 2015, 62/133,963, filed on Mar. 16, 2015 and 62/151,374, filed on Apr. 22, 2015, the contents of which are all hereby incorporated by reference herein in their entirety.

TECHNICAL FIELD

The present invention relates to an apparatus for transmitting a broadcast signal, an apparatus for receiving a broadcast signal and methods for transmitting and receiving a broadcast signal.

BACKGROUND ART

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

Technical Problem

A digital broadcast system can provide HD (high definition) images, multichannel audio and various additional services. However, data transmission efficiency for transmission of large amounts of data, robustness of transmission/reception networks and network flexibility in consideration of mobile reception equipment need to be improved for digital broadcast.

Technical Solution

To solve the technical problem, a method and an apparatus for transmitting a broadcast signal are disclosed.

A method for transmitting a broadcast signal according to an embodiment of the present invention comprises encoding a content component of a broadcast service according to a delivery protocol, wherein the delivery protocol includes at least one of ROUTE (Real-Time Object Delivery over Unidirectional Transport) protocol or MMT (MPEG Media Transport) protocol; generating SLS (Service Layer Signaling) information for discovering and obtaining the broadcast service and a content component of the broadcast service; generating service list information including information for service list building and discovery of the SLS information; and physical layer processing of the service list information, the SLS information, and the content component, wherein the SLS information may be transmitted by using at least one delivery protocol of the ROUTE protocol or MMT protocol.

Also, in a method for transmitting a broadcast signal according to an embodiment of the present invention, the service list information may include SLS protocol type information, and the SLS protocol type information may indicate a delivery protocol according to which the SLS information is transmitted.

Also, in a method for transmitting a broadcast signal according to an embodiment of the present invention, if the content component is a streaming component, the content component may be transmitted by using only one delivery protocol between the ROUTE protocol and the MMT protocol.

Also, in a method for transmitting a broadcast signal according to an embodiment of the present invention, if the SLS information is transmitted according to the ROUTE protocol, the SLS information may include USBD (User Service Bundle Description) information, S-TSID (Service-based Transport Session Instance Description) information, and MPD (Media Presentation Description) information; the USBD information may correspond to an entry point of an SLS fragment; the S-TSID information may include ROUTE session information in which the content component of the broadcast service is delivered; and the MPD information may provide context of an identified resource within MP (Media Presentation) and a resource identifier of a segment.

Also, in a method for transmitting a broadcast signal according to an embodiment of the present invention, the service list information may include service ID information of 16-bit integer format for identifying the broadcast service, and the USBD includes the service ID information and global service ID information of URI format for identifying the broadcast service.

Also, in a method for transmitting a broadcast signal according to an embodiment of the present invention, the service list information may include service category information about the broadcast service, and the service category information may indicate whether the broadcast service is an audio/video service, audio service, app-based service, or service-guide service.

Also, in a method for transmitting a broadcast signal according to an embodiment of the present invention, if a frequency band in which a broadcast signal including the service list information, SLS information, and content component is transmitted is shared with a plurality of broadcasters, the service list information may further comprise service group information about a group of services provided by the respective broadcasters.

An apparatus for transmitting a broadcast signal according to an embodiment of the present invention comprises a broadcast content encoder encoding a content component of a broadcast service according to a delivery protocol, wherein the delivery protocol includes at least one of ROUTE (Real-Time Object Delivery over Unidirectional Transport) protocol or MMT (MPEG Media Transport) protocol; a signaling processor generating signaling information about a broadcast service; and a physical layer processor performing physical layer processing of the content component and signaling information, wherein the signaling information may include service list information including SLS (Service Layer Signaling) information for discovering and obtaining the broadcast service and the content component of the broadcast service; and information for service list building and discovery of the SLS information and wherein the SLS information may be transmitted by using at least one delivery protocol of the ROUTE protocol or MMT protocol.

Advantageous Effects

The present invention can control quality of service (QoS) with respect to services or service components by processing data on the basis of service characteristics, thereby providing various broadcast services.

The present invention can achieve transmission flexibility by transmitting various broadcast services through the same radio frequency (RF) signal bandwidth.

The present invention can provide methods and apparatuses for transmitting and receiving broadcast signals, which enable digital broadcast signals to be received without error even when a mobile reception device is used or even in an indoor environment.

The present invention can effectively support future broadcast services in an environment supporting future hybrid broadcasting using terrestrial broadcast networks and the Internet.

In what follows, additional effects of the present invention may be described along with the description of the invention.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates a receiver protocol stack according to an embodiment of the present invention;

FIG. 2 illustrates a relation between an SLT and service layer signaling (SLS) according to an embodiment of the present invention;

FIG. 3 illustrates an SLT according to an embodiment of the present invention;

FIG. 4 illustrates SLS bootstrapping and a service discovery process according to an embodiment of the present invention;

FIG. 5 illustrates a USBD fragment for ROUTE/DASH according to an embodiment of the present invention;

FIG. 6 illustrates an S-TSID fragment for ROUTE/DASH according to an embodiment of the present invention;

FIG. 7 illustrates a USBD/USD fragment for MMT according to an embodiment of the present invention;

FIG. 8 illustrates a link layer protocol architecture according to an embodiment of the present invention;

FIG. 9 illustrates a structure of a base header of a link layer packet according to an embodiment of the present invention;

FIG. 10 illustrates a structure of an additional header of a link layer packet according to an embodiment of the present invention;

FIG. 11 illustrates a structure of an additional header of a link layer packet according to another embodiment of the present invention;

FIG. 12 illustrates a header structure of a link layer packet for an MPEG-2 TS packet and an encapsulation process thereof according to an embodiment of the present invention;

FIG. 13 illustrates an example of adaptation modes in IP header compression according to an embodiment of the present invention (transmitting side);

FIG. 14 illustrates a link mapping table (LMT) and an RoHC-U description table according to an embodiment of the present invention;

FIG. 15 illustrates a structure of a link layer on a transmitter side according to an embodiment of the present invention;

FIG. 16 illustrates a structure of a link layer on a receiver side according to an embodiment of the present invention;

FIG. 17 illustrates a configuration of signaling transmission through a link layer according to an embodiment of the present invention (transmitting/receiving sides);

FIG. 18 is a block diagram illustrating a configuration of a broadcast signal transmission apparatus for future broadcast services according to an embodiment of the present invention;

FIG. 19 is a block diagram illustrating a bit interleaved coding & modulation (BICM) block according to an embodiment of the present invention;

FIG. 20 is a block diagram illustrating a BICM block according to another embodiment of the present invention;

FIG. 21 illustrates a bit interleaving process of physical layer signaling (PLS) according to an embodiment of the present invention;

FIG. 22 is a block diagram illustrating a configuration of a broadcast signal reception apparatus for future broadcast services according to an embodiment of the present invention;

FIG. 23 illustrates a signaling hierarchy structure of a frame according to an embodiment of the present invention;

FIG. 24 is a table illustrating PLS1 data according to an embodiment of the present invention;

FIG. 25 is a table illustrating PLS2 data according to an embodiment of the present invention;

FIG. 26 is a table illustrating PLS2 data according to another embodiment of the present invention;

FIG. 27 illustrates a logical structure of a frame according to an embodiment of the present invention;

FIG. 28 illustrates PLS mapping according to an embodiment of the present invention;

FIG. 29 illustrates time interleaving according to an embodiment of the present invention;

FIG. 30 illustrates a basic operation of a twisted row-column block interleaver according to an embodiment of the present invention;

FIG. 31 illustrates an operation of a twisted row-column block interleaver according to another embodiment of the present invention;

FIG. 32 is a block diagram illustrating an interlaving address generator including a main pseudo-random binary sequence (PRBS) generator and a sub-PRBS generator according to each FFT mode according to an embodiment of the present invention;

FIG. 33 illustrates a main PRBS used for all FFT modes according to an embodiment of the present invention;

FIG. 34 illustrates a sub-PRBS used for FFT modes and an interleaving address for frequency interleaving according to an embodiment of the present invention;

FIG. 35 illustrates a write operation of a time interleaver according to an embodiment of the present invention;

FIG. 36 is a table illustrating an interleaving type applied according to the number of PLPs;

FIG. 37 is a block diagram including a first example of a structure of a hybrid time interleaver;

FIG. 38 is a block diagram including a second example of the structure of the hybrid time interleaver;

FIG. 39 is a block diagram including a first example of a structure of a hybrid time deinterleaver;

FIG. 40 is a block diagram including a second example of the structure of the hybrid time deinterleaver;

FIG. 41 is a receiver protocol stack according to an embodiment of the present invention.

FIG. 42 illustrates logical entities of service management, delivery, and physical layer and their relationship according to one embodiment of the present invention.

FIG. 43 illustrates a method for using service signaling for bootstrapping and service discovery according to an embodiment of the present invention.

FIG. 44 illustrates an FIT according to an embodiment of the present invention.

FIG. 45 an FIT descriptor according to an embodiment of the present invention.

FIG. 46 illustrates an embodiment of broadcast_signaling_location_descriptor( ).

FIG. 47 illustrates an embodiment of inet_signaling_location_descriptor( ).

FIG. 48 illustrates an embodiment of a query term when inet_signaling_location_descriptor( ) is located at FIT level.

FIG. 49 illustrates an embodiment of a query term when inet_signaling_location_descriptor( ) is located at service level.

FIG. 50 illustrates an XML format of the FIT shown and described in FIGS. 44 to 49.

FIG. 51 illustrates a service layer signaling data model according to an embodiment of the present invention.

FIG. 52 illustrates USBD according to one embodiment of the present invention.

FIG. 53 illustrates an S-TSID according to one embodiment of the present invention.

FIG. 54 illustrates hierarchical signaling architecture according to an embodiment of the present invention.

FIG. 55 illustrates a fast service scan signaling flow according to one embodiment of the present invention.

FIG. 56 illustrates a full channel scan signaling flow according to an embodiment of the present invention.

FIG. 57 illustrates a service acquisition method in the pure broadcast according to an embodiment of the present invention.

FIG. 58 illustrates a service acquisition method in the pure broadcast according to an embodiment of the present invention.

FIG. 59 illustrates an ESG information acquisition method according to an embodiment of the present invention.

FIG. 60 illustrates a method for receiving a hybrid (multi-audio language) service according to an embodiment of the present invention.

FIG. 61 illustrates a method for receiving a broadcast signal employing handoff according to an embodiment of the present invention.

FIG. 62 illustrates a method for receiving a broadcast signal employing scalable coding according to an embodiment of the present invention.

FIG. 63 is an XML instance notation illustrating a method for encapsulating Diff in a metadataEnvelope element.

FIG. 64 illustrates a method for template pre-sharing and diff-patching according to an embodiment of the present invention.

FIG. 65 illustrates an FIT delivery method according to an embodiment of the present invention.

FIG. 66 illustrates an SLT according to an embodiment of the present invention.

FIG. 67 illustrates an inet signaling location descriptor according to an embodiment of the present invention.

FIG. 68 illustrates a service language descriptor according to an embodiment of the present invention.

FIG. 69 illustrates a representative service descriptor according to an embodiment of the present invention.

FIG. 70 illustrates a service group descriptor according to a first embodiment of the present invention.

FIG. 71 illustrates a service group descriptor according to a second embodiment of the present invention.

FIG. 72 illustrates a service group descriptor according to a third embodiment of the present invention.

FIG. 73 illustrates a service provider descriptor according to an embodiment of the present invention.

FIG. 74 illustrates SLT by using the XML format according to an embodiment of the present invention.

FIG. 75 illustrates an inet signaling location descriptor in the XML format according to an embodiment of the present invention.

FIG. 76 illustrates a representative service descriptor in the XML format according to an embodiment of the present invention.

FIG. 77 illustrates a service group descriptor in the XML format according to an embodiment of the present invention.

FIG. 78 illustrates a service provider descriptor in the XML format according to an embodiment of the present invention.

FIG. 79 illustrates a method for transmitting signaling information and content data of a broadcasting system according to an embodiment of the present invention.

FIG. 80 illustrates a method for transmitting signaling information and content data of a broadcasting system according to an embodiment of the present invention.

FIG. 81 illustrates a method for transmitting a broadcast signal according to an embodiment of the present invention.

FIG. 82 illustrates a broadcast signal transmitter and a broadcast signal receiver according to an embodiment of the present invention.

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The present invention provides apparatuses and methods for transmitting and receiving broadcast signals for future broadcast services. Future broadcast services according to an embodiment of the present invention include a terrestrial broadcast service, a mobile broadcast service, an ultra high definition television (UHDTV) service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

FIG. 1 illustrates a receiver protocol stack according to an embodiment of the present invention.

Two schemes may be used in broadcast service delivery through a broadcast network.

In a first scheme, media processing units (MPUs) are transmitted using an MMT protocol (MMTP) based on MPEG media transport (MMT). In a second scheme, dynamic adaptive streaming over HTTP (DASH) segments may be transmitted using real time object delivery over unidirectional transport (ROUTE) based on MPEG DASH.

Non-timed content including NRT media, EPG data, and other files is delivered with ROUTE. Signaling may be delivered over MMTP and/or ROUTE, while bootstrap signaling information is provided by the means of the Service List Table (SLT).

In hybrid service delivery, MPEG DASH over HTTP/TCP/IP is used on the broadband side. Media files in ISO Base Media File Format (BMFF) are used as the delivery, media encapsulation and synchronization format for both broadcast and broadband delivery. Here, hybrid service delivery may refer to a case in which one or more program elements are delivered through a broadband path.

Services are delivered using three functional layers. These are the physical layer, the delivery layer and the service management layer. The physical layer provides the mechanism by which signaling, service announcement and IP packet streams are transported over the broadcast physical layer and/or broadband physical layer. The delivery layer provides object and object flow transport functionality. It is enabled by the MMTP or the ROUTE protocol, operating on a UDP/IP multicast over the broadcast physical layer, and enabled by the HTTP protocol on a TCP/IP unicast over the broadband physical layer. The service management layer enables any type of service, such as linear TV or HTML5 application service, to be carried by the underlying delivery and physical layers.

In this figure, a protocol stack part on a broadcast side may be divided into a part transmitted through the SLT and the MMTP, and a part transmitted through ROUTE.

The SLT may be encapsulated through UDP and IP layers. Here, the SLT will be described below. The MMTP may transmit data formatted in an MPU format defined in MMT, and signaling information according to the MMTP. The data may be encapsulated through the UDP and IP layers. ROUTE may transmit data formatted in a DASH segment form, signaling information, and non-timed data such as NRT data, etc. The data may be encapsulated through the UDP and IP layers. According to a given embodiment, some or all processing according to the UDP and IP layers may be omitted. Here, the illustrated signaling information may be signaling information related to a service.

The part transmitted through the SLT and the MMTP and the part transmitted through ROUTE may be processed in the UDP and IP layers, and then encapsulated again in a data link layer. The link layer will be described below. Broadcast data processed in the link layer may be multicast as a broadcast signal through processes such as encoding/interleaving, etc. in the physical layer.

In this figure, a protocol stack part on a broadband side may be transmitted through HTTP as described above. Data formatted in a DASH segment form, signaling information, NRT information, etc. may be transmitted through HTTP. Here, the illustrated signaling information may be signaling information related to a service. The data may be processed through the TCP layer and the IP layer, and then encapsulated into the link layer. According to a given embodiment, some or all of the TCP, the IP, and the link layer may be omitted. Broadband data processed thereafter may be transmitted by unicast in the broadband through a process for transmission in the physical layer.

Service can be a collection of media components presented to the user in aggregate; components can be of multiple media types; a Service can be either continuous or intermittent; a Service can be Real Time or Non-Real Time; Real Time Service can consist of a sequence of TV programs.

FIG. 2 illustrates a relation between the SLT and SLS according to an embodiment of the present invention.

Service signaling provides service discovery and description information, and comprises two functional components: Bootstrap signaling via the Service List Table (SLT) and the Service Layer Signaling (SLS). These represent the information which is necessary to discover and acquire user services. The SLT enables the receiver to build a basic service list, and bootstrap the discovery of the SLS for each service.

The SLT can enable very rapid acquisition of basic service information. The SLS enables the receiver to discover and access services and their content components. Details of the SLT and SLS will be described below.

As described in the foregoing, the SLT may be transmitted through UDP/IP. In this instance, according to a given embodiment, data corresponding to the SLT may be delivered through the most robust scheme in this transmission.

The SLT may have access information for accessing SLS delivered by the ROUTE protocol. In other words, the SLT may be bootstrapped into SLS according to the ROUTE protocol. The SLS is signaling information positioned in an upper layer of ROUTE in the above-described protocol stack, and may be delivered through ROUTE/UDP/IP. The SLS may be transmitted through one of LCT sessions included in a ROUTE session. It is possible to access a service component corresponding to a desired service using the SLS.

In addition, the SLT may have access information for accessing an MMT signaling component delivered by MMTP. In other words, the SLT may be bootstrapped into SLS according to the MMTP. The SLS may be delivered by an MMTP signaling message defined in MMT. It is possible to access a streaming service component (MPU) corresponding to a desired service using the SLS. As described in the foregoing, in the present invention, an NRT service component is delivered through the ROUTE protocol, and the SLS according to the MMTP may include information for accessing the ROUTE protocol. In broadband delivery, the SLS is carried over HTTP(S)/TCP/IP.

FIG. 3 illustrates an SLT according to an embodiment of the present invention.

First, a description will be given of a relation among respective logical entities of service management, delivery, and a physical layer.

Services may be signaled as being one of two basic types. First type is a linear audio/video or audio-only service that may have an app-based enhancement. Second type is a service whose presentation and composition is controlled by a downloaded application that is executed upon acquisition of the service. The latter can be called an "app-based" service.

The rules regarding presence of ROUTE/LCT sessions and/or MMTP sessions for carrying the content components of a service may be as follows.

For broadcast delivery of a linear service without app-based enhancement, the service's content components can be carried by either (but not both): (1) one or more ROUTE/LCT sessions, or (2) one or more MMTP sessions.

For broadcast delivery of a linear service with app-based enhancement, the service's content components can be carried by: (1) one or more ROUTE/LCT sessions, and (2) zero or more MMTP sessions.

In certain embodiments, use of both MMTP and ROUTE for streaming media components in the same service may not be allowed.

For broadcast delivery of an app-based service, the service's content components can be carried by one or more ROUTE/LCT sessions.

Each ROUTE session comprises one or more LCT sessions which carry as a whole, or in part, the content components that make up the service. In streaming services delivery, an LCT session may carry an individual component of a user service such as an audio, video or closed caption stream. Streaming media is formatted as DASH Segments.

Each MMTP session comprises one or more MMTP packet flows which carry MMT signaling messages or as a whole, or in part, the content component. An MMTP packet flow may carry MMT signaling messages or components formatted as MPUs.

For the delivery of NRT User Services or system metadata, an LCT session carries file-based content items. These content files may consist of continuous (time-based) or discrete (non-time-based) media components of an NRT service, or metadata such as Service Signaling or ESG fragments. Delivery of system metadata such as service signaling or ESG fragments may also be achieved through the signaling message mode of MMTP.

A broadcast stream is the abstraction for an RF channel, which is defined in terms of a carrier frequency centered within a specified bandwidth. It is identified by the pair [geographic area, frequency]. A physical layer pipe (PLP) corresponds to a portion of the RF channel. Each PLP has certain modulation and coding parameters. It is identified by a PLP identifier (PLPID), which is unique within the broadcast stream it belongs to. Here, PLP can be referred to as DP (data pipe).

Each service is identified by two forms of service identifier: a compact form that is used in the SLT and is unique only within the broadcast area; and a globally unique form that is used in the SLS and the ESG. A ROUTE session is identified by a source IP address, destination IP address and destination port number. An LCT session (associated with the service component(s) it carries) is identified by a transport session identifier (TSI) which is unique within the scope of the parent ROUTE session. Properties common to the LCT sessions, and certain properties unique to individual LCT sessions, are given in a ROUTE signaling structure called a service-based transport session instance description (S-TSID), which is part of the service layer signaling. Each LCT session is carried over a single physical layer pipe. According to a given embodiment, one LCT session may be transmitted through a plurality of PLPs. Different LCT sessions of a ROUTE session may or may not be contained in different physical layer pipes. Here, the ROUTE session may be delivered through a plurality of PLPs. The properties described in the S-TSID include the TSI value and PLPID for each LCT session, descriptors for the delivery objects/files, and application layer FEC parameters.

A MMTP session is identified by destination IP address and destination port number. An MMTP packet flow (associated with the service component(s) it carries) is identified by a packet_id which is unique within the scope of the parent MMTP session. Properties common to each MMTP packet flow, and certain properties of MMTP packet flows, are given in the SLT. Properties for each MMTP session are given by MMT signaling messages, which may be carried within the MMTP session. Different MMTP packet flows of a MMTP session may or may not be contained in different physical layer pipes. Here, the MMTP session may be delivered through a plurality of PLPs. The properties described in the MMT signaling messages include the packet_id value and PLPID for each MMTP packet flow. Here, the MMT signaling messages may have a form defined in MMT, or have a deformed form according to embodiments to be described below.

Hereinafter, a description will be given of low level signaling (LLS).

Signaling information which is carried in the payload of IP packets with a well-known address/port dedicated to this function is referred to as low level signaling (LLS). The IP address and the port number may be differently configured depending on embodiments. In one embodiment, LLS can be transported in IP packets with address 224.0.23.60 and destination port 4937/udp. LLS may be positioned in a portion expressed by "SLT" on the above-described protocol stack. However, according to a given embodiment, the LLS may be transmitted through a separate physical channel (dedicated channel) in a signal frame without being subjected to processing of the UDP/IP layer.

UDP/IP packets that deliver LLS data may be formatted in a form referred to as an LLS table. A first byte of each UDP/IP packet that delivers the LLS data may correspond to a start of the LLS table. The maximum length of any LLS table is limited by the largest IP packet that can be delivered from the PHY layer, 65,507 bytes.

The LLS table may include an LLS table ID field that identifies a type of the LLS table, and an LLS table version field that identifies a version of the LLS table. According to a value indicated by the LLS table ID field, the LLS table may include the above-described SLT or a rating region table (RRT). The RRT may have information about content advisory rating.

Hereinafter, the SLT will be described. LLS can be signaling information which supports rapid channel scans and bootstrapping of service acquisition by the receiver, and SLT can be a table of signaling information which is used to build a basic service listing and provide bootstrap discovery of SLS.

The function of the SLT is similar to that of the program association table (PAT) in MPEG-2 Systems, and the fast information channel (FIC) found in ATSC Systems. For a receiver first encountering the broadcast emission, this is the place to start. SLT supports a rapid channel scan which allows a receiver to build a list of all the services it can receive, with their channel name, channel number, etc., and SLT provides bootstrap information that allows a receiver to discover the SLS for each service. For ROUTE/DASH-delivered services, the bootstrap information includes the destination IP address and destination port of the LCT session that carries the SLS. For MMT/MPU-delivered services, the bootstrap information includes the destination IP address and destination port of the MMTP session carrying the SLS.

The SLT supports rapid channel scans and service acquisition by including the following information about each service in the broadcast stream. First, the SLT can include information necessary to allow the presentation of a service list that is meaningful to viewers and that can support initial service selection via channel number or up/down selection. Second, the SLT can include information necessary to locate the service layer signaling for each service listed. That is, the SLT may include access information related to a location at which the SLS is delivered.

The illustrated SLT according to the present embodiment is expressed as an XML document having an SLT root element. According to a given embodiment, the SLT may be expressed in a binary format or an XML document.

The SLT root element of the SLT illustrated in the figure may include @bsid, @sltSectionVersion, @sltSectionNumber, @totalSltSectionNumbers, @language, @capabilities, InetSigLoc and/or Service. According to a given embodiment, the SLT root element may further include @providerId. According to a given embodiment, the SLT root element may not include @language.

The service element may include @serviceId, @SLTserviceSeqNumber, @protected, @majorChannelNo, @minorChannelNo, @serviceCategory, @shortServiceName, @hidden, @slsProtocolType, BroadcastSignaling, @slsPlpId, @slsDestinationIpAddress, @slsDestinationUdpPort, @slsSourceIpAddress, @slsMajorProtocolVersion, @SlsMinorProtocolVersion, @serviceLanguage, @broadbandAccessRequired, @capabilities and/or InetSigLoc.

According to a given embodiment, an attribute or an element of the SLT may be added/changed/deleted. Each element included in the SLT may additionally have a separate attribute or element, and some attribute or elements according to the present embodiment may be omitted. Here, a field which is marked with @ may correspond to an attribute, and a field which is not marked with @ may correspond to an element.

@bsid is an identifier of the whole broadcast stream. The value of BSID may be unique on a regional level.

@providerId can be an index of broadcaster that is using part or all of this broadcast stream. This is an optional attribute. When it's not present, it means that this broadcast stream is being used by one broadcaster. @providerId is not illustrated in the figure.

@sltSectionVersion can be a version number of the SLT section. The sltSectionVersion can be incremented by 1 when a change in the information carried within the slt occurs. When it reaches maximum value, it wraps around to 0.

@sltSectionNumber can be the number, counting from 1, of this section of the SLT. In other words, @sltSectionNumber may correspond to a section number of the SLT section. When this field is not used, @sltSectionNumber may be set to a default value of 1.

@totalSltSectionNumbers can be the total number of sections (that is, the section with the highest sltSectionNumber) of the SLT of which this section is part. sltSectionNumber and totalSltSectionNumbers together can be considered to indicate "Part M of N" of one portion of the SLT when it is sent in fragments. In other words, when the SLT is transmitted, transmission through fragmentation may be supported. When this field is not used, @totalSltSectionNumbers may be set to a default value of 1. A case in which this field is not used may correspond to a case in which the SLT is not transmitted by being fragmented.

@language can indicate primary language of the services included in this slt instance. According to a given embodiment, a value of this field may have be a three-character language code defined in the ISO. This field may be omitted.

@capabilities can indicate required capabilities for decoding and meaningfully presenting the content for all the services in this slt instance.

InetSigLoc can provide a URL telling the receiver where it can acquire any requested type of data from external server(s) via broadband. This element may include @urlType as a lower field. According to a value of the @urlType field, a type of a URL provided by InetSigLoc may be indicated. According to a given embodiment, when the @urlType field has a value of 0, InetSigLoc may provide a URL of a signaling server. When the @urlType field has a value of 1, InetSigLoc may provide a URL of an ESG server. When the @urlType field has other values, the field may be reserved for future use.

The service field is an element having information about each service, and may correspond to a service entry. Service element fields corresponding to the number of services indicated by the SLT may be present. Hereinafter, a description will be given of a lower attribute/element of the service field.

@serviceId can be an integer number that uniquely identify this service within the scope of this broadcast area. According to a given embodiment, a scope of @serviceId may be changed. @SLTserviceSeqNumber can be an integer number that indicates the sequence number of the SLT service information with service ID equal to the serviceId attribute above. SLTserviceSeqNumber value can start at 0 for each service and can be incremented by 1 every time any attribute in this service element is changed. If no attribute values are changed compared to the previous Service element with a particular value of ServiceID then SLTserviceSeqNumber would not be incremented. The SLTserviceSeqNumber field wraps back to 0 after reaching the maximum value.

@protected is flag information which may indicate whether one or more components for significant reproduction of the service are in a protected state. When set to "1" (true), that one or more components necessary for meaningful presentation is protected. When set to "0" (false), this flag indicates that no components necessary for meaningful presentation of the service are protected. Default value is false.

@majorChannelNo is an integer number representing the "major" channel number of the service. An example of the field may have a range of 1 to 999.

@minorChannelNo is an integer number representing the "minor" channel number of the service. An example of the field may have a range of 1 to 999.

@serviceCategory can indicate the category of this service. This field may indicate a type that varies depending on embodiments. According to a given embodiment, when this field has values of 1, 2, and 3, the values may correspond to a linear A/V service, a linear audio only service, and an app-based service, respectively. When this field has a value of 0, the value may correspond to a service of an undefined category. When this field has other values except for 1, 2, and 3, the field may be reserved for future use. @shortServiceName can be a short string name of the Service.

@hidden can be boolean value that when present and set to "true" indicates that the service is intended for testing or proprietary use, and is not to be selected by ordinary TV receivers. The default value is "false" when not present.

@slsProtocolType can be an attribute indicating the type of protocol of Service Layer Signaling used by this service. This field may indicate a type that varies depending on embodiments. According to a given embodiment, when this field has values of 1 and 2, protocols of SLS used by respective corresponding services may be ROUTE and MMTP, respectively. When this field has other values except for 0, the field may be reserved for future use. This field may be referred to as @slsProtocol.

BroadcastSignaling and lower attributes/elements thereof may provide information related to broadcast signaling. When the BroadcastSignaling element is not present, the child element InetSigLoc of the parent service element can be present and its attribute urlType includes URL_type 0x00 (URL to signaling server). In this case attribute url supports the query parameter svc=<service_id> where service_id corresponds to the serviceId attribute for the parent service element.

Alternatively when the BroadcastSignaling element is not present, the element InetSigLoc can be present as a child element of the slt root element and the attribute urlType of that InetSigLoc element includes URL_type 0x00 (URL to signaling server). In this case, attribute url for URL_type 0x00 supports the query parameter svc=<service_id> where service_id corresponds to the serviceId attribute for the parent Service element.

@slsPlpId can be a string representing an integer number indicating the PLP ID of the physical layer pipe carrying the SLS for this service.

@slsDestinationIpAddress can be a string containing the dotted-IPv4 destination address of the packets carrying SLS data for this service.

@slsDestinationUdpPort can be a string containing the port number of the packets carrying SLS data for this service. As described in the foregoing, SLS bootstrapping may be performed by destination IP/UDP information.

@slsSourceIpAddress can be a string containing the dotted-IPv4 source address of the packets carrying SLS data for this service.

@slsMajorProtocolVersion can be major version number of the protocol used to deliver the service layer signaling for this service. Default value is 1.

@SlsMinorProtocolVersion can be minor version number of the protocol used to deliver the service layer signaling for this service. Default value is 0.

@serviceLanguage can be a three-character language code indicating the primary language of the service. A value of this field may have a form that varies depending on embodiments.

@broadbandAccessRequired can be a Boolean indicating that broadband access is required for a receiver to make a meaningful presentation of the service. Default value is false. When this field has a value of True, the receiver needs to access a broadband for significant service reproduction, which may correspond to a case of hybrid service delivery.

@capabilities can represent required capabilities for decoding and meaningfully presenting the content for the service with service ID equal to the service Id attribute above.

InetSigLoc can provide a URL for access to signaling or announcement information via broadband, if available. Its data type can be an extension of the any URL data type, adding an @urlType attribute that indicates what the URL gives access to. An @urlType field of this field may indicate the same meaning as that of the @urlType field of InetSigLoc described above. When an InetSigLoc element of attribute URL_type 0x00 is present as an element of the SLT, it can be used to make HTTP requests for signaling metadata. The HTTP POST message body may include a service term. When the InetSigLoc element appears at the section level, the service term is used to indicate the service to which the requested signaling metadata objects apply. If the service term is not present, then the signaling metadata objects for all services in the section are requested. When the InetSigLoc appears at the service level, then no service term is needed to designate the desired service. When an InetSigLoc element of attribute URL_type 0x01 is provided, it can be used to retrieve ESG data via broadband. If the element appears as a child element of the service element, then the URL can be used to retrieve ESG data for that service. If the element appears as a child element of the SLT element, then the URL can be used to retrieve ESG data for all services in that section.

In another example of the SLT, @sltSectionVersion, @sltSectionNumber, @totalSltSectionNumbers and/or @language fields of the SLT may be omitted In addition, the above-described InetSigLoc field may be replaced by @sltInetSigUri and/or @sltInetEsgUri field. The two fields may include the URI of the signaling server and URI information of the ESG server, respectively. The InetSigLoc field corresponding to a lower field of the SLT and the InetSigLoc field corresponding to a lower field of the service field may be replaced in a similar manner.

The suggested default values may vary depending on embodiments. An illustrated "use" column relates to the respective fields. Here, "1" may indicate that a corresponding field is an essential field, and "0 . . . 1" may indicate that a corresponding field is an optional field.

FIG. 4 illustrates SLS bootstrapping and a service discovery process according to an embodiment of the present invention.

Hereinafter, SLS will be described.

SLS can be signaling which provides information for discovery and acquisition of services and their content components.

For ROUTE/DASH, the SLS for each service describes characteristics of the service, such as a list of its components and where to acquire them, and the receiver capabilities required to make a meaningful presentation of the service. In the ROUTE/DASH system, the SLS includes the user service bundle description (USBD), the S-TSID and the DASH media presentation description (MPD). Here, USBD or user service description (USD) is one of SLS XML fragments, and may function as a signaling herb that describes specific descriptive information. USBD/USD may be extended beyond 3GPP MBMS. Details of USBD/USD will be described below.

The service signaling focuses on basic attributes of the service itself, especially those attributes needed to acquire the service. Properties of the service and programming that are intended for viewers appear as service announcement, or ESG data.

Having separate Service Signaling for each service permits a receiver to acquire the appropriate SLS for a service of interest without the need to parse the entire SLS carried within a broadcast stream.

For optional broadband delivery of Service Signaling, the SLT can include HTTP URLs where the Service Signaling files can be obtained, as described above.

LLS is used for bootstrapping SLS acquisition, and subsequently, the SLS is used to acquire service components delivered on either ROUTE sessions or MMTP sessions. The described figure illustrates the following signaling sequences. Receiver starts acquiring the SLT described above. Each service identified by service_id delivered over ROUTE sessions provides SLS bootstrapping information: PLPID(#1), source IP address (sIP1), destination IP address (dIP1), and destination port number (dPort1). Each service identified by service_id delivered over MMTP sessions provides SLS bootstrapping information: PLPID(#2), destination IP address (dIP2), and destination port number (dPort2).

For streaming services delivery using ROUTE, the receiver can acquire SLS fragments carried over the IP/UDP/LCT session and PLP; whereas for streaming services delivery using MMTP, the receiver can acquire SLS fragments carried over an MMTP session and PLP. For service delivery using ROUTE, these SLS fragments include USBD/USD fragments, S-TSID fragments, and MPD fragments. They are relevant to one service. USBD/USD fragments describe service layer properties and provide URI references to S-TSID fragments and URI references to MPD fragments. In other words, the USBD/USD may refer to S-TSID and MPD. For service delivery using MMTP, the USBD references the MMT signaling's MPT message, the MP Table of which provides identification of package ID and location information for assets belonging to the service. Here, an asset is a multimedia data entity, and may refer to a data entity which is combined into one unique ID and is used to generate one multimedia presentation. The asset may correspond to a service component included in one service. The MPT message is a message having the MP table of MMT. Here, the MP table may be an MMT package table having information about content and an MMT asset. Details may be similar to a definition in MMT. Here, media presentation may correspond to a collection of data that establishes bounded/unbounded presentation of media content.

The S-TSID fragment provides component acquisition information associated with one service and mapping between DASH Representations found in the MPD and in the TSI corresponding to the component of the service. The S-TSID can provide component acquisition information in the form of a TSI and the associated DASH representation identifier, and PLPID carrying DASH segments associated with the DASH representation. By the PLPID and TSI values, the receiver collects the audio/video components from the service and begins buffering DASH media segments then applies the appropriate decoding processes.

For USBD listing service components delivered on MMTP sessions, as illustrated by "Service #2" in the described figure, the receiver also acquires an MPT message with matching MMT_package_id to complete the SLS. An MPT message provides the full list of service components comprising a service and the acquisition information for each component. Component acquisition information includes MMTP session information, the PLPID carrying the session and the packet_id within that session.

According to a given embodiment, for example, in ROUTE, two or more S-TSID fragments may be used. Each fragment may provide access information related to LCT sessions delivering content of each service.

In ROUTE, S-TSID, USBD/USD, MPD, or an LCT session delivering S-TSID, USBD/USD or MPD may be referred to as a service signaling channel. In MMTP, USBD/UD, an MMT signaling message, or a packet flow delivering the MMTP or USBD/UD may be referred to as a service signaling channel.

Unlike the illustrated example, one ROUTE or MMTP session may be delivered through a plurality of PLPs. In other words, one service may be delivered through one or more PLPs. As described in the foregoing, one LCT session may be delivered through one PLP. Unlike the figure, according to a given embodiment, components included in one service may be delivered through different ROUTE sessions. In addition, according to a given embodiment, components included in one service may be delivered through different MMTP sessions. According to a given embodiment, components included in one service may be delivered separately through a ROUTE session and an MMTP session. Although not illustrated, components included in one service may be delivered via broadband (hybrid delivery).

FIG. 5 illustrates a USBD fragment for ROUTE/DASH according to an embodiment of the present invention.

Hereinafter, a description will be given of SLS in delivery based on ROUTE.

SLS provides detailed technical information to the receiver to enable the discovery and access of services and their content components. It can include a set of XML-encoded metadata fragments carried over a dedicated LCT session. That LCT session can be acquired using the bootstrap information contained in the SLT as described above. The SLS is defined on a per-service level, and it describes the characteristics and access information of the service, such as a list of its content components and how to acquire them, and the receiver capabilities required to make a meaningful presentation of the service. In the ROUTE/DASH system, for linear services delivery, the SLS consists of the following metadata fragments: USBD, S-TSID and the DASH MPD. The SLS fragments can be delivered on a dedicated LCT transport session with TSI=0. According to a given embodiment, a TSI of a particular LCT session (dedicated LCT session) in which an SLS fragment is delivered may have a different value. According to a given embodiment, an LCT session in which an SLS fragment is delivered may be signaled using the SLT or another scheme.

ROUTE/DASH SLS can include the user service bundle description (USBD) and service-based transport session instance description (S-TSID) metadata fragments. These service signaling fragments are applicable to both linear and application-based services. The USBD fragment contains service identification, device capabilities information, references to other SLS fragments required to access the service and constituent media components, and metadata to enable the receiver to determine the transport mode (broadcast and/or broadband) of service components. The S-TSID fragment, referenced by the USBD, provides transport session descriptions for the one or more ROUTE/LCT sessions in which the media content components of a service are delivered, and descriptions of the delivery objects carried in those LCT sessions. The USBD and S-TSID will be described below.

In streaming content signaling in ROUTE-based delivery, a streaming content signaling component of SLS corresponds to an MPD fragment. The MPD is typically associated with linear services for the delivery of DASH Segments as streaming content. The MPD provides the resource identifiers for individual media components of the linear/streaming service in the form of Segment URLs, and the context of the identified resources within the Media Presentation. Details of the MPD will be described below.

In app-based enhancement signaling in ROUTE-based delivery, app-based enhancement signaling pertains to the delivery of app-based enhancement components, such as an application logic file, locally-cached media files, network content items, or a notification stream. An application can also retrieve locally-cached data over a broadband connection when available.

Hereinafter, a description will be given of details of USBD/USD illustrated in the figure.

The top level or entry point SLS fragment is the USBD fragment. An illustrated USBD fragment is an example of the present invention, basic fields of the USBD fragment not illustrated in the figure may be additionally provided according to a given embodiment. As described in the foregoing, the illustrated USBD fragment has an extended form, and may have fields added to a basic configuration.

The illustrated USBD may have a bundleDescription root element. The bundleDescription root element may have a userServiceDescription element. The userServiceDescription element may correspond to an instance for one service.

The userServiceDescription element may include @serviceId, @atsc:serviceId, @atsc:serviceStatus, @atsc:fullMPDUri, @atsc:sTSIDUri, name, serviceLanguage, atsc:capabilityCode and/or deliveryMethod.

@serviceId can be a globally unique URI that identifies a service, unique within the scope of the BSID. This parameter can be used to link to ESG data (Service@globalServiceID).

@atsc:serviceId is a reference to corresponding service entry in LLS(SLT). The value of this attribute is the same value of serviceId assigned to the entry.

@atsc:serviceStatus can specify the status of this service. The value indicates whether this service is active or inactive. When set to "1" (true), that indicates service is active. When this field is not used, @atsc:serviceStatus may be set to a default value of 1.

@atsc:fullMPDUri can reference an MPD fragment which contains descriptions for contents components of the service delivered over broadcast and optionally, also over broadband.

@atsc:sTSIDUri can reference the S-TSID fragment which provides access related parameters to the Transport sessions carrying contents of this service.

name can indicate name of the service as given by the lang attribute. name element can include lang attribute, which indicating language of the service name. The language can be specified according to XML data types.

serviceLanguage can represent available languages of the service. The language can be specified according to XML data types.

atsc:capabilityCode can specify the capabilities required in the receiver to be able to create a meaningful presentation of the content of this service. According to a given embodiment, this field may specify a predefined capability group. Here, the capability group may be a group of capability attribute values for significant presentation. This field may be omitted according to a given embodiment.

deliveryMethod can be a container of transport related information pertaining to the contents of the service over broadcast and (optionally) broadband modes of access. Referring to data included in the service, when the number of the data is N, delivery schemes for respective data may be described by this element. The deliveryMethod may include an r12:broadcastAppService element and an r12:unicastAppService element. Each lower element may include a basePattern element as a lower element.

r12:broadcastAppService can be a DASH Representation delivered over broadcast, in multiplexed or non-multiplexed form, containing the corresponding media component(s) belonging to the service, across all Periods of the affiliated media presentation. In other words, each of the fields may indicate DASH representation delivered through the broadcast network.

r12:unicastAppService can be a DASH Representation delivered over broadband, in multiplexed or non-multiplexed form, containing the constituent media content component(s) belonging to the service, across all periods of the affiliated media presentation. In other words, each of the fields may indicate DASH representation delivered via broadband.

basePattern can be a character pattern for use by the receiver to match against any portion of the segment URL used by the DASH client to request media segments of a parent representation under its containing period. A match implies that the corresponding requested media segment is carried over broadcast transport. In a URL address for receiving DASH representation expressed by each of the r12:broadcastAppService element and the r12:unicastAppService element, a part of the URL, etc. may have a particular pattern. The pattern may be described by this field. Some data may be distinguished using this information. The proposed default values may vary depending on embodiments. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

FIG. 6 illustrates an S-TSID fragment for ROUTE/DASH according to an embodiment of the present invention.

Hereinafter, a description will be given of the S-TSID illustrated in the figure in detail.

S-TSID can be an SLS XML fragment which provides the overall session description information for transport session(s) which carry the content components of a service. The S-TSID is the SLS metadata fragment that contains the overall transport session description information for the zero or more ROUTE sessions and constituent LCT sessions in which the media content components of a service are delivered. The S-TSID also includes file metadata for the delivery object or object flow carried in the LCT sessions of the service, as well as additional information on the payload formats and content components carried in those LCT sessions.

Each instance of the S-TSID fragment is referenced in the USBD fragment by the @atsc:sTSIDUri attribute of the userServiceDescription element. The illustrated S-TSID according to the present embodiment is expressed as an XML document. According to a given embodiment, the S-TSID may be expressed in a binary format or as an XML document.

The illustrated S-TSID may have an S-TSID root element. The S-TSID root element may include @serviceId and/or RS.

@serviceID can be a reference corresponding service element in the USD. The value of this attribute can reference a service with a corresponding value of service_id.

The RS element may have information about a ROUTE session for delivering the service data. Service data or service components may be delivered through a plurality of ROUTE sessions, and thus the number of RS elements may be 1 to N.

The RS element may include @bsid, @sIpAddr, @dIpAddr, @dport, @PLPID and/or LS.

@bsid can be an identifier of the broadcast stream within which the content component(s) of the broadcastAppService are carried. When this attribute is absent, the default broadcast stream is the one whose PLPs carry SLS fragments for this service. Its value can be identical to that of the broadcast_stream_id in the SLT.

@sIpAddr can indicate source IP address. Here, the source IP address may be a source IP address of a ROUTE session for delivering a service component included in the service. As described in the foregoing, service components of one service may be delivered through a plurality of ROUTE sessions. Thus, the service components may be transmitted using another ROUTE session other than the ROUTE session for delivering the S-TSID. Therefore, this field may be used to indicate the source IP address of the ROUTE session. A default value of this field may be a source IP address of a current ROUTE session. When a service component is delivered through another ROUTE session, and thus the ROUTE session needs to be indicated, a value of this field may be a value of a source IP address of the ROUTE session. In this case, this field may correspond to M, that is, an essential field.

@dIpAddr can indicate destination IP address. Here, a destination IP address may be a destination IP address of a ROUTE session that delivers a service component included in a service. For a similar case to the above description of @sIpAddr, this field may indicate a destination IP address of a ROUTE session that delivers a service component. A default value of this field may be a destination IP address of a current ROUTE session. When a service component is delivered through another ROUTE session, and thus the ROUTE session needs to be indicated, a value of this field may be a value of a destination IP address of the ROUTE session. In this case, this field may correspond to M, that is, an essential field.

@dport can indicate destination port. Here, a destination port may be a destination port of a ROUTE session that delivers a service component included in a service. For a similar case to the above description of @sIpAddr, this field may indicate a destination port of a ROUTE session that delivers a service component. A default value of this field may be a destination port number of a current ROUTE session. When a service component is delivered through another ROUTE session, and thus the ROUTE session needs to be indicated, a value of this field may be a destination port number value of the ROUTE session. In this case, this field may correspond to M, that is, an essential field.

@PLPID may be an ID of a PLP for a ROUTE session expressed by an RS. A default value may be an ID of a PLP of an LCT session including a current S-TSID. According to a given embodiment, this field may have an ID value of a PLP for an LCT session for delivering an S-TSID in the ROUTE session, and may have ID values of all PLPs for the ROUTE session.

An LS element may have information about an LCT session for delivering a service data. Service data or service components may be delivered through a plurality of LCT sessions, and thus the number of LS elements may be 1 to N.

The LS element may include @tsi, @PLPID, @bw, @startTime, @endTime, SrcFlow and/or RprFlow.

@tsi may indicate a TSI value of an LCT session for delivering a service component of a service.

@PLPID may have ID information of a PLP for the LCT session. This value may be overwritten on a basic ROUTE session value.

@bw may indicate a maximum bandwidth value. @startTime may indicate a start time of the LCT session. @endTime may indicate an end time of the LCT session. A SrcFlow element may describe a source flow of ROUTE. A RprFlow element may describe a repair flow of ROUTE.

The proposed default values may be varied according to an embodiment. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

Hereinafter, a description will be given of MPD for ROUTE/DASH.

The MPD is an SLS metadata fragment which contains a formalized description of a DASH Media Presentation, corresponding to a linear service of a given duration defined by the broadcaster (for example a single TV program, or the set of contiguous linear TV programs over a period of time). The contents of the MPD provide the resource identifiers for Segments and the context for the identified resources within the Media Presentation. The data structure and semantics of the MPD fragment can be according to the MPD defined by MPEG DASH.

One or more of the DASH Representations conveyed in the MPD can be carried over broadcast. The MPD may describe additional Representations delivered over broadband, e.g. in the case of a hybrid service, or to support service continuity in handoff from broadcast to broadcast due to broadcast signal degradation (e.g. driving through a tunnel).

FIG. 7 illustrates a USBD/USD fragment for MMT according to an embodiment of the present invention.

MMT SLS for linear services comprises the USBD fragment and the MMT Package (MP) table. The MP table is as described above. The USBD fragment contains service identification, device capabilities information, references to other SLS information required to access the service and constituent media components, and the metadata to enable the receiver to determine the transport mode (broadcast and/or broadband) of the service components. The MP table for MPU components, referenced by the USBD, provides transport session descriptions for the MMTP sessions in which the media content components of a service are delivered and the descriptions of the Assets carried in those MMTP sessions.

The streaming content signaling component of the SLS for MPU components corresponds to the MP table defined in MMT. The MP table provides a list of MMT assets where each asset corresponds to a single service component and the description of the location information for this component.

USBD fragments may also contain references to the S-TSID and the MPD as described above, for service components delivered by the ROUTE protocol and the broadband, respectively. According to a given embodiment, in delivery through MMT, a service component delivered through the ROUTE protocol is NRT data, etc. Thus, in this case, MPD may be unnecessary. In addition, in delivery through MMT, information about an LCT session for delivering a service component, which is delivered via broadband, is unnecessary, and thus an S-TSID may be unnecessary. Here, an MMT package may be a logical collection of media data delivered using MMT. Here, an MMTP packet may refer to a formatted unit of media data delivered using MMT. An MPU may refer to a generic container of independently decodable timed/non-timed data. Here, data in the MPU is media codec agnostic.

Hereinafter, a description will be given of details of the USBD/USD illustrated in the figure.

The illustrated USBD fragment is an example of the present invention, and basic fields of the USBD fragment may be additionally provided according to an embodiment. As described in the foregoing, the illustrated USBD fragment has an extended form, and may have fields added to a basic structure.

The illustrated USBD according to an embodiment of the present invention is expressed as an XML document. According to a given embodiment, the USBD may be expressed in a binary format or as an XML document.

The illustrated USBD may have a bundleDescription root element. The bundleDescription root element may have a userServiceDescription element. The userServiceDescription element may be an instance for one service.

The userServiceDescription element may include @serviceId, @atsc:serviceId, name, serviceLanguage, atsc:capabilityCode, atsc:Channel, atsc:mpuComponent, atsc:routeComponent, atsc:broadbandComponent and/or atsc:ComponentInfo.

Here, @serviceId, @atsc:serviceId, name, serviceLanguage, and atsc:capabilityCode may be as described above. The lang field below the name field may be as described above. atsc:capabilityCode may be omitted according to a given embodiment.

The userServiceDescription element may further include an atsc:contentAdvisoryRating element according to an embodiment. This element may be an optional element. atsc:contentAdvisoryRating can specify the content advisory rating. This field is not illustrated in the figure.

atsc:Channel may have information about a channel of a service. The atsc:Channel element may include @atsc:majorChannelNo, @atsc:minorChannelNo, @atsc:serviceLang, @atsc:serviceGenre, @atsc:serviceIcon and/or atsc:ServiceDescription. @atsc:majorChannelNo, @atsc:minorChannelNo, and @atsc:serviceLang may be omitted according to a given embodiment.

@atsc:majorChannelNo is an attribute that indicates the major channel number of the service.

@atsc:minorChannelNo is an attribute that indicates the minor channel number of the service.

@atsc:serviceLang is an attribute that indicates the primary language used in the service.

@atsc:serviceGenre is an attribute that indicates primary genre of the service.

@atsc:serviceIcon is an attribute that indicates the Uniform Resource Locator (URL) for the icon used to represent this service.

atsc:ServiceDescription includes service description, possibly in multiple languages. atsc:ServiceDescription includes can include @atsc:serviceDescrText and/or @atsc:serviceDescrLang.

@atsc:serviceDescrText is an attribute that indicates description of the service.

@atsc:serviceDescrLang is an attribute that indicates the language of the serviceDescrText attribute above.

atsc:mpuComponent may have information about a content component of a service delivered in a form of an MPU. atsc:mpuComponent may include @atsc:mmtPackageId and/or @atsc:nextMmtPackageId.

@atsc:mmtPackageId can reference a MMT Package for content components of the service delivered as MPUs.

@atsc:nextMmtPackageId can reference a MMT Package to be used after the one referenced by @atsc:mmtPackageId in time for content components of the service delivered as MPUs.

atsc:routeComponent may have information about a content component of a service delivered through ROUTE. atsc:routeComponent may include @atsc:sTSIDUri, @sTSIDPlpId, @sTSIDDestinationIpAddress, @sTSIDDestinationUdpPort, @sTSIDSourceIpAddress, @sTSIDMajorProtocolVersion and/or @sTSIDMinorProtocolVersion.

@atsc:sTSIDUri can be a reference to the S-TSID fragment which provides access related parameters to the Transport sessions carrying contents of this service. This field may be the same as a URI for referring to an S-TSID in USBD for ROUTE described above. As described in the foregoing, in service delivery by the MMTP, service components, which are delivered through NRT, etc., may be delivered by ROUTE. This field may be used to refer to the S-TSID therefor.

@sTSIDPlpId can be a string representing an integer number indicating the PLP ID of the physical layer pipe carrying the S-TSID for this service. (default: current physical layer pipe).

@sTSIDDestinationIpAddress can be a string containing the dotted-IPv4 destination address of the packets carrying S-TSID for this service. (default: current MMTP session's source IP address)

@sTSIDDestinationUdpPort can be a string containing the port number of the packets carrying S-TSID for this service.

@sTSIDSourceIpAddress can be a string containing the dotted-IPv4 source address of the packets carrying S-TSID for this service.

@sTSIDMajorProtocolVersion can indicate major version number of the protocol used to deliver the S-TSID for this service. Default value is 1.

@sTSIDMinorProtocolVersion can indicate minor version number of the protocol used to deliver the S-TSID for this service. Default value is 0.

atsc:broadbandComponent may have information about a content component of a service delivered via broadband. In other words, atsc:broadbandComponent may be a field on the assumption of hybrid delivery. atsc:broadbandComponent may further include @atsc:fullfMPDUri.

@atsc:fullfMPDUri can be a reference to an MPD fragment which contains descriptions for contents components of the service delivered over broadband.

An atsc:ComponentInfo field may have information about an available component of a service. The atsc:ComponentInfo field may have information about a type, a role, a name, etc. of each component. The number of atsc:ComponentInfo fields may correspond to the number (N) of respective components. The atsc:ComponentInfo field may include @atsc:componentType, @atsc:componentRole, @atsc:componentProtectedFlag, @atsc:componentId and/or @atsc:componentName.

@atsc:componentType is an attribute that indicates the type of this component. Value of 0 indicates an audio component. Value of 1 indicates a video component. Value of 2 indicated a closed caption component. Value of 3 indicates an application component. Values 4 to 7 are reserved. A meaning of a value of this field may be differently set depending on embodiments.

@atsc:componentRole is an attribute that indicates the role or kind of this component.

For audio (when componentType attribute above is equal to 0): values of componentRole attribute are as follows: 0=Complete main, 1=Music and Effects, 2=Dialog, 3=Commentary, 4=Visually Impaired, 5=Hearing Impaired, 6=Voice-Over, 7-254=reserved, 255=unknown.

For video (when componentType attribute above is equal to 1) values of componentRole attribute are as follows: 0=Primary video, 1=Alternative camera view, 2=Other alternative video component, 3=Sign language inset, 4=Follow subject video, 5=3D video left view, 6=3D video right view, 7=3D video depth information, 8=Part of video array <x,y> of <n,m>, 9=Follow-Subject metadata, 10-254=reserved, 255=unknown.

For Closed Caption component (when componentType attribute above is equal to 2) values of componentRole attribute are as follows: 0=Normal, 1=Easy reader, 2-254=reserved, 255=unknown.

When componentType attribute above is between 3 to 7, inclusive, the componentRole can be equal to 255. A meaning of a value of this field may be differently set depending on embodiments.

@atsc:componentProtectedFlag is an attribute that indicates if this component is protected (e.g. encrypted). When this flag is set to a value of 1 this component is protected (e.g. encrypted). When this flag is set to a value of 0 this component is not protected (e.g. encrypted). When not present the value of componentProtectedFlag attribute is inferred to be equal to 0. A meaning of a value of this field may be differently set depending on embodiments.

@atsc:componentId is an attribute that indicates the identifier of this component. The value of this attribute can be the same as the asset_id in the MP table corresponding to this component.

@atsc:componentName is an attribute that indicates the human readable name of this component.

The proposed default values may vary depending on embodiments. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

Hereinafter, a description will be given of MPD for MMT.

The Media Presentation Description is an SLS metadata fragment corresponding to a linear service of a given duration defined by the broadcaster (for example a single TV program, or the set of contiguous linear TV programs over a period of time). The contents of the MPD provide the resource identifiers for segments and the context for the identified resources within the media presentation. The data structure and semantics of the MPD can be according to the MPD defined by MPEG DASH.

In the present embodiment, an MPD delivered by an MMTP session describes Representations delivered over broadband, e.g. in the case of a hybrid service, or to support service continuity in handoff from broadcast to broadband due to broadcast signal degradation (e.g. driving under a mountain or through a tunnel).

Hereinafter, a description will be given of an MMT signaling message for MMT.

When MMTP sessions are used to carry a streaming service, MMT signaling messages defined by MMT are delivered by MMTP packets according to signaling message mode defined by MMT. The value of the packet_id field of MMTP packets carrying service layer signaling is set to '00' except for MMTP packets carrying MMT signaling messages specific to an asset, which can be set to the same packet_id value as the MMTP packets carrying the asset. Identifiers referencing the appropriate package for each service are signaled by the USBD fragment as described above. MMT Package Table (MPT) messages with matching MMT_package_id can be delivered on the MMTP session signaled in the SLT. Each MMTP session carries MMT signaling messages specific to its session or each asset delivered by the MMTP session.

In other words, it is possible to access USBD of the MMTP session by specifying an IP destination address/port number, etc. of a packet having the SLS for a particular service in the SLT. As described in the foregoing, a packet ID of an MMTP packet carrying the SLS may be designated as a particular value such as 00, etc. It is possible to access an MPT message having a matched packet ID using the above-described package IP information of USBD. As described below, the MPT message may be used to access each service component/asset.

The following MMTP messages can be delivered by the MMTP session signaled in the SLT.

MMT Package Table (MPT) message: This message carries an MP (MMT Package) table which contains the list of all Assets and their location information as defined by MMT. If an Asset is delivered by a PLP different from the current PLP delivering the MP table, the identifier of the PLP carrying the asset can be provided in the MP table using physical layer pipe identifier descriptor. The physical layer pipe identifier descriptor will be described below.

MMT ATSC3 (MA3) message mmt_atsc3_message( ): This message carries system metadata specific for services including service layer signaling as described above. mmt_atsc3_message( ) will be described below.

The following MMTP messages can be delivered by the MMTP session signaled in the SLT, if required.

Media Presentation Information (MPI) message: This message carries an MPI table which contains the whole document or a subset of a document of presentation information. An MP table associated with the MPI table also can be delivered by this message.

Clock Relation Information (CRI) message: This message carries a CRI table which contains clock related information for the mapping between the NTP timestamp and the MPEG-2 STC. According to a given embodiment, the CRI message may not be delivered through the MMTP session.

The following MMTP messages can be delivered by each MMTP session carrying streaming content.

Hypothetical Receiver Buffer Model message: This message carries information required by the receiver to manage its buffer.

Hypothetical Receiver Buffer Model Removal message: This message carries information required by the receiver to manage its MMT de-capsulation buffer.

Hereinafter, a description will be given of mmt_atsc3_message( ) corresponding to one of MMT signaling messages. An MMT Signaling message mmt_atsc3_message( ) is defined to deliver information specific to services according to the present invention described above. The signaling message may include message ID, version, and/or length fields corresponding to basic fields of the MMT signaling message. A payload of the signaling message may include service ID information, content type information, content version information, content compression information and/or URI information. The content type information may indicate a type of data included in the payload of the signaling message. The content version information may indicate a version of data included in the payload, and the content compression information may indicate a type of compression applied to the data. The URI information may have URI information related to content delivered by the message.

Hereinafter, a description will be given of the physical layer pipe identifier descriptor.

The physical layer pipe identifier descriptor is a descriptor that can be used as one of descriptors of the MP table described above. The physical layer pipe identifier descriptor provides information about the PLP carrying an asset. If an asset is delivered by a PLP different from the current PLP delivering the MP table, the physical layer pipe identifier descriptor can be used as an asset descriptor in the associated MP table to identify the PLP carrying the asset. The physical layer pipe identifier descriptor may further include BSID information in addition to PLP ID information. The BSID may be an ID of a broadcast stream that delivers an MMTP packet for an asset described by the descriptor.

FIG. 8 illustrates a link layer protocol architecture according to an embodiment of the present invention.

Hereinafter, a link layer will be described.

The link layer is the layer between the physical layer and the network layer, and transports the data from the network layer to the physical layer at the sending side and transports the data from the physical layer to the network layer at the receiving side. The purpose of the link layer includes abstracting all input packet types into a single format for processing by the physical layer, ensuring flexibility and future extensibility for as yet undefined input types. In addition, processing within the link layer ensures that the input data can be transmitted in an efficient manner, for example by providing options to compress redundant information in the headers of input packets. The operations of encapsulation, compression and so on are referred to as the link layer protocol and packets created using this protocol are called link layer packets. The link layer may perform functions such as packet encapsulation, overhead reduction and/or signaling transmission, etc.

Hereinafter, packet encapsulation will be described. Link layer protocol allows encapsulation of any type of packet, including ones such as IP packets and MPEG-2 TS. Using link layer protocol, the physical layer need only process one single packet format, independent of the network layer protocol type (here we consider MPEG-2 TS packet as a kind of network layer packet.) Each network layer packet or input packet is transformed into the payload of a generic link layer packet. Additionally, concatenation and segmentation can be performed in order to use the physical layer resources efficiently when the input packet sizes are particularly small or large.

As described in the foregoing, segmentation may be used in packet encapsulation. When the network layer packet is too large to process easily in the physical layer, the network layer packet is divided into two or more segments. The link layer packet header includes protocol fields to perform segmentation on the sending side and reassembly on the receiving side. When the network layer packet is segmented, each segment can be encapsulated to link layer packet in the same order as original position in the network layer packet. Also each link layer packet which includes a segment of network layer packet can be transported to PHY layer consequently.

As described in the foregoing, concatenation may be used in packet encapsulation. When the network layer packet is small enough for the payload of a link layer packet to include several network layer packets, the link layer packet header includes protocol fields to perform concatenation. The concatenation is combining of multiple small sized network layer packets into one payload. When the network layer packets are concatenated, each network layer packet can be concatenated to payload of link layer packet in the same order as original input order. Also each packet which constructs a payload of link layer packet can be whole packet, not a segment of packet.

Hereinafter, overhead reduction will be described. Use of the link layer protocol can result in significant reduction in overhead for transport of data on the physical layer. The link layer protocol according to the present invention may provide IP overhead reduction and/or MPEG-2 TS overhead reduction. In IP overhead reduction, IP packets have a fixed header format, however some of the information which is needed in a communication environment may be redundant in a broadcast environment. Link layer protocol provides mechanisms to reduce the broadcast overhead by compressing headers of IP packets. In MPEG-2 TS overhead reduction, link layer protocol provides sync byte removal, null packet deletion and/or common header removal (compression). First, sync byte removal provides an overhead reduction of one byte per TS packet, secondly a null packet deletion mechanism removes the 188 byte null TS packets in a manner that they can be re-inserted at the receiver and finally a common header removal mechanism.

For signaling transmission, in the link layer protocol, a particular format for the signaling packet may be provided for link layer signaling, which will be described below.

In the illustrated link layer protocol architecture according to an embodiment of the present invention, link layer protocol takes as input network layer packets such as IPv4, MPEG-2 TS and so on as input packets. Future extension indicates other packet types and protocol which is also possible to be input in link layer. Link layer protocol also specifies the format and signaling for any link layer signaling, including information about mapping to specific channel to the physical layer. Figure also shows how ALP incorporates mechanisms to improve the efficiency of transmission, via various header compression and deletion algorithms. In addition, the link layer protocol may basically encapsulate input packets.

FIG. 9 illustrates a structure of a base header of a link layer packet according to an embodiment of the present invention. Hereinafter, the structure of the header will be described.

A link layer packet can include a header followed by the data payload. The header of a link layer packet can include a base header, and may include an additional header depending on the control fields of the base header. The presence of an optional header is indicated from flag fields of the additional header. According to a given embodiment, a field indicating the presence of an additional header and an optional header may be positioned in the base header.

Hereinafter, the structure of the base header will be described. The base header for link layer packet encapsulation has a hierarchical structure. The base header can be two bytes in length and is the minimum length of the link layer packet header.

The illustrated base header according to the present embodiment may include a Packet_Type field, a PC field and/or a length field. According to a given embodiment, the base header may further include an HM field or an S/C field.

Packet_Type field can be a 3-bit field that indicates the original protocol or packet type of the input data before encapsulation into a link layer packet. An IPv4 packet, a compressed IP packet, a link layer signaling packet, and other types of packets may have the base header structure and may be encapsulated. However, according to a given embodiment, the MPEG-2 TS packet may have a different particular structure, and may be encapsulated. When the value of Packet_Type is "000", "001" "100" or "111", that is the original data type of an ALP packet is one of an IPv4 packet, a compressed IP packet, link layer signaling or extension packet. When the MPEG-2 TS packet is encapsulated, the value of Packet_Type can be "010". Other values of the Packet_Type field may be reserved for future use.

Payload_Configuration (PC) field can be a 1-bit field that indicates the configuration of the payload. A value of 0 can indicate that the link layer packet carries a single, whole input packet and the following field is the Header_Mode field. A value of 1 can indicate that the link layer packet carries more than one input packet (concatenation) or a part of a large input packet (segmentation) and the following field is the Segmentation_Concatenation field.

Header_Mode (HM) field can be a 1-bit field, when set to 0, that can indicate there is no additional header, and that the length of the payload of the link layer packet is less than 2048 bytes. This value may be varied depending on embodiments. A value of 1 can indicate that an additional header for single packet defined below is present following the Length field. In this case, the length of the payload is larger than 2047 bytes and/or optional features can be used (sub stream identification, header extension, etc.). This value may be varied depending on embodiments. This field can be present only when Payload_Configuration field of the link layer packet has a value of 0.

Segmentation_Concatenation (S/C) field can be a 1-bit field, when set to 0, that can indicate that the payload carries a segment of an input packet and an additional header for segmentation defined below is present following the Length field. A value of 1 can indicate that the payload carries more than one complete input packet and an additional header for concatenation defined below is present following the Length field. This field can be present only when the value of Payload_Configuration field of the ALP packet is 1.

Length field can be a 11-bit field that indicates the 11 least significant bits (LSBs) of the length in bytes of payload carried by the link layer packet. When there is a Length_MSB field in the following additional header, the length field is concatenated with the Length_MSB field, and is the LSB to provide the actual total length of the payload. The number of bits of the length field may be changed to another value rather than 11 bits.

Following types of packet configuration are thus possible: a single packet without any additional header, a single packet with an additional header, a segmented packet and a concatenated packet. According to a given embodiment, more packet configurations may be made through a combination of each additional header, an optional header, an additional header for signaling information to be described below, and an additional header for time extension.

FIG. 10 illustrates a structure of an additional header of a link layer packet according to an embodiment of the present invention.

Various types of additional headers may be present. Hereinafter, a description will be given of an additional header for a single packet.

This additional header for single packet can be present when Header_Mode (HM)="1". The Header_Mode (HM) can be set to 1 when the length of the payload of the link layer packet is larger than 2047 bytes or when the optional fields are used. The additional header for single packet is shown in Figure (tsib10010).

Length_MSB field can be a 5-bit field that can indicate the most significant bits (MSBs) of the total payload length in bytes in the current link layer packet, and is concatenated with the Length field containing the 11 least significant bits (LSBs) to obtain the total payload length. The maximum length of the payload that can be signaled is therefore 65535 bytes. The number of bits of the length field may be changed to another value rather than 11 bits. In addition, the number of bits of the Length_MSB field may be changed, and thus a maximum expressible payload length may be changed. According to a given embodiment, each length field may indicate a length of a whole link layer packet rather than a payload.

SIF (Sub stream Identifier Flag) field can be a 1-bit field that can indicate whether the sub stream ID (SID) is present after the HEF field or not. When there is no SID in this link layer packet, SIF field can be set to 0. When there is a SID after HEF field in the link layer packet, SIF can be set to 1. The detail of SID is described below.

HEF (Header Extension Flag) field can be a 1-bit field that can indicate, when set to 1 additional header is present for future extension. A value of 0 can indicate that this extension header is not present.

Hereinafter, a description will be given of an additional header when segmentation is used.

This additional header (tsib10020) can be present when Segmentation_Concatenation (S/C)="0". Segment_Sequence_Number can be a 5-bit unsigned integer that can indicate the order of the corresponding segment carried by the link layer packet. For the link layer packet which carries the first segment of an input packet, the value of this field can be set to 0x0. This field can be incremented by one with each additional segment belonging to the segmented input packet.

Last_Segment_Indicator (LSI) can be a 1-bit field that can indicate, when set to 1, that the segment in this payload is the last one of input packet. A value of 0, can indicate that it is not last segment.

SIF (Sub stream Identifier Flag) can be a 1-bit field that can indicate whether the SID is present after the HEF field or not. When there is no SID in the link layer packet, SIF field can be set to 0. When there is a SID after the HEF field in the link layer packet, SIF can be set to 1.

HEF (Header Extension Flag) can be a This 1-bit field that can indicate, when set to 1, that the optional header extension is present after the additional header for future extensions of the link layer header. A value of 0 can indicate that optional header extension is not present.

According to a given embodiment, a packet ID field may be additionally provided to indicate that each segment is generated from the same input packet. This field may be unnecessary and thus be omitted when segments are transmitted in order.

Hereinafter, a description will be given of an additional header when concatenation is used.

This additional header (tsib10030) can be present when Segmentation_Concatenation (S/C)="1".

Length_MSB can be a 4-bit field that can indicate MSB bits of the payload length in bytes in this link layer packet. The maximum length of the payload is 32767 bytes for concatenation. As described in the foregoing, a specific numeric value may be changed.

Count can be a field that can indicate the number of the packets included in the link layer packet. The number of the packets included in the link layer packet, 2 can be set to this field. So, its maximum value of concatenated packets in a link layer packet is 9. A scheme in which the count field indicates the number may be varied depending on embodiments. That is, the numbers from 1 to 8 may be indicated.

HEF (Header Extension Flag) can be a 1-bit field that can indicate, when set to 1 the optional header extension is present after the additional header for future extensions of the link layer header. A value of 0, can indicate extension header is not present.

Component_Length can be a 12-bit length field that can indicate the length in byte of each packet. Component_Length fields are included in the same order as the packets present in the payload except last component packet. The number of length field can be indicated by (Count+1). According to a given embodiment, length fields, the number of which is the same as a value of the count field, may be present. When a link layer header consists of an odd number of Component_Length, four stuffing bits can follow after the last Component_Length field. These bits can be set to 0. According to a given embodiment, a Component_length field indicating a length of a last concatenated input packet may not be present. In this case, the length of the last concatenated input packet may correspond to a length obtained by subtracting a sum of values indicated by respective Component_length fields from a whole payload length.

Hereinafter, the optional header will be described.

As described in the foregoing, the optional header may be added to a rear of the additional header. The optional header field can contain SID and/or header extension. The SID is used to filter out specific packet stream in the link layer level. One example of SID is the role of service identifier in a link layer stream carrying multiple services. The mapping information between a service and the SID value corresponding to the service can be provided in the SLT, if applicable. The header extension contains extended field for future use. Receivers can ignore any header extensions which they do not understand.

SID (Sub stream Identifier) can be a 8-bit field that can indicate the sub stream identifier for the link layer packet. If there is optional header extension, SID present between additional header and optional header extension.

Header_Extension( ) can include the fields defined below.

Extension_Type can be an 8-bit field that can indicate the type of the Header_Extension( ).

Extension_Length can be a 8-bit field that can indicate the length of the Header Extension( ) in bytes counting from the next byte to the last byte of the Header_Extension( ).

Extension_Byte can be a byte representing the value of the Header_Extension( ).

FIG. 11 illustrates a structure of an additional header of a link layer packet according to another embodiment of the present invention.

Hereinafter, a description will be given of an additional header for signaling information.

How link layer signaling is incorporated into link layer packets are as follows. Signaling packets are identified by when the Packet_Type field of the base header is equal to 100.

Figure (tsib11010) shows the structure of the link layer packets containing additional header for signaling information. In addition to the link layer header, the link layer packet can consist of two additional parts, additional header for signaling information and the actual signaling data itself. The total length of the link layer signaling packet is shown in the link layer packet header.

The additional header for signaling information can include following fields. According to a given embodiment, some fields may be omitted.

Signaling_Type can be an 8-bit field that can indicate the type of signaling.

Signaling_Type_Extension can be a 16-bit filed that can indicate the attribute of the signaling. Detail of this field can be defined in signaling specification.

Signaling_Version can be an 8-bit field that can indicate the version of signaling.

Signaling_Format can be a 2-bit field that can indicate the data format of the signaling data. Here, a signaling format may refer to a data format such as a binary format, an XML format, etc.

Signaling_Encoding can be a 2-bit field that can specify the encoding/compression format. This field may indicate whether compression is not performed and which type of compression is performed.

Hereinafter, a description will be given of an additional header for packet type extension.

In order to provide a mechanism to allow an almost unlimited number of additional protocol and packet types to be carried by link layer in the future, the additional header is defined. Packet type extension can be used when Packet_type is 111 in the base header as described above. Figure (tsib11020) shows the structure of the link layer packets containing additional header for type extension.

The additional header for type extension can include following fields. According to a given embodiment, some fields may be omitted.

extended_type can be a 16-bit field that can indicate the protocol or packet type of the input encapsulated in the link layer packet as payload. This field cannot be used for any protocol or packet type already defined by Packet_Type field.

FIG. 12 illustrates a header structure of a link layer packet for an MPEG-2 TS packet and an encapsulation process thereof according to an embodiment of the present invention.

Hereinafter, a description will be given of a format of the link layer packet when the MPEG-2 TS packet is input as an input packet.

In this case, the Packet_Type field of the base header is equal to 010. Multiple TS packets can be encapsulated within each link layer packet. The number of TS packets is signaled via the NUMTS field. In this case, as described in the foregoing, a particular link layer packet header format may be used.

Link layer provides overhead reduction mechanisms for MPEG-2 TS to enhance the transmission efficiency. The sync byte (0x47) of each TS packet can be deleted. The option to delete NULL packets and similar TS headers is also provided.

In order to avoid unnecessary transmission overhead, TS null packets (PID=0x1FFF) may be removed. Deleted null packets can be recovered in receiver side using DNP field. The DNP field indicates the count of deleted null packets. Null packet deletion mechanism using DNP field is described below.

In order to achieve more transmission efficiency, similar header of MPEG-2 TS packets can be removed. When two or more successive TS packets have sequentially increased continuity counter fields and other header fields are the same, the header is sent once at the first packet and the other headers are deleted. HDM field can indicate whether the header deletion is performed or not. Detailed procedure of common TS header deletion is described below.

When all three overhead reduction mechanisms are performed, overhead reduction can be performed in sequence of sync removal, null packet deletion, and common header deletion. According to a given embodiment, a performance order of respective mechanisms may be changed. In addition, some mechanisms may be omitted according to a given embodiment.

The overall structure of the link layer packet header when using MPEG-2 TS packet encapsulation is depicted in Figure (tsib12010).

Hereinafter, a description will be given of each illustrated field. Packet_Type can be a 3-bit field that can indicate the protocol type of input packet as describe above. For MPEG-2 TS packet encapsulation, this field can always be set to 010.

NUMTS (Number of TS packets) can be a 4-bit field that can indicate the number of TS packets in the payload of this link layer packet. A maximum of 16 TS packets can be supported in one link layer packet. The value of NUMTS=0 can indicate that 16 TS packets are carried by the payload of the link layer packet. For all other values of NUMTS, the same number of TS packets are recognized, e.g. NUMTS=0001 means one TS packet is carried.

AHF (Additional Header Flag) can be a field that can indicate whether the additional header is present of not. A value of 0 indicates that there is no additional header. A value of 1 indicates that an additional header of length 1-byte is present following the base header. If null TS packets are deleted or TS header compression is applied this field can be set to 1. The additional header for TS packet encapsulation consists of the following two fields and is present only when the value of AHF in this link layer packet is set to 1.

HDM (Header Deletion Mode) can be a 1-bit field that indicates whether TS header deletion can be applied to this link layer packet. A value of 1 indicates that TS header deletion can be applied. A value of "0" indicates that the TS header deletion method is not applied to this link layer packet.

DNP (Deleted Null Packets) can be a 7-bit field that indicates the number of deleted null TS packets prior to this link layer packet. A maximum of 128 null TS packets can be deleted. When HDM=0 the value of DNP=0 can indicate that 128 null packets are deleted. When HDM=1 the value of DNP=0 can indicate that no null packets are deleted. For all other values of DNP, the same number of null packets are recognized, e.g. DNP=5 means 5 null packets are deleted.

The number of bits of each field described above may be changed. According to the changed number of bits, a minimum/maximum value of a value indicated by the field may be changed. These numbers may be changed by a designer.

Hereinafter, SYNC byte removal will be described.

When encapsulating TS packets into the payload of a link layer packet, the SYNC byte (0x47) from the start of each TS packet can be deleted. Hence the length of the MPEG2-TS packet encapsulated in the payload of the link layer packet is always of length 187 bytes (instead of 188 bytes originally).

Hereinafter, null packet deletion will be described.

Transport Stream rules require that bit rates at the output of a transmitter's multiplexer and at the input of the receiver's de-multiplexer are constant in time and the end-to-end delay is also constant. For some Transport Stream input signals, null packets may be present in order to accommodate variable bitrate services in a constant bitrate stream. In this case, in order to avoid unnecessary transmission overhead, TS null packets (that is TS packets with PID=0x1FFF) may be removed. The process is carried-out in a way that the removed null packets can be re-inserted in the receiver in the exact place where they were originally, thus guaranteeing constant bitrate and avoiding the need for PCR time stamp updating.

Before generation of a link layer packet, a counter called DNP (Deleted Null-Packets) can first be reset to zero and then incremented for each deleted null packet preceding the first non-null TS packet to be encapsulated into the payload of the current link layer packet. Then a group of consecutive useful TS packets is encapsulated into the payload of the current link layer packet and the value of each field in its header can be determined. After the generated link layer packet is injected to the physical layer, the DNP is reset to zero. When DNP reaches its maximum allowed value, if the next packet is also a null packet, this null packet is kept as a useful packet and encapsulated into the payload of the next link layer packet. Each link layer packet can contain at least one useful TS packet in its payload.

Hereinafter, TS packet header deletion will be described. TS packet header deletion may be referred to as TS packet header compression.

When two or more successive TS packets have sequentially increased continuity counter fields and other header fields are the same, the header is sent once at the first packet and the other headers are deleted. When the duplicated MPEG-2 TS packets are included in two or more successive TS packets, header deletion cannot be applied in transmitter side. HDM field can indicate whether the header deletion is performed or not. When TS header deletion is performed, HDM can be set to 1. In the receiver side, using the first packet header, the deleted packet headers are recovered, and the continuity counter is restored by increasing it in order from that of the first header.

An example tsib12020 illustrated in the figure is an example of a process in which an input stream of a TS packet is encapsulated into a link layer packet. First, a TS stream including TS packets having SYNC byte (0x47) may be input. First, sync bytes may be deleted through a sync byte deletion process. In this example, it is presumed that null packet deletion is not performed.

Here, it is presumed that packet headers of eight TS packets have the same field values except for CC, that is, a continuity counter field value. In this case, TS packet deletion/compression may be performed. Seven remaining TS packet headers are deleted except for a first TS packet header corresponding to CC=1. The processed TS packets may be encapsulated into a payload of the link layer packet.

In a completed link layer packet, a Packet_Type field corresponds to a case in which TS packets are input, and thus may have a value of 010. A NUMTS field may indicate the number of encapsulated TS packets. An AHF field may be set to 1 to indicate the presence of an additional header since packet header deletion is performed. An HDM field may be set to 1 since header deletion is performed. DNP may be set to 0 since null packet deletion is not performed.

FIG. 13 illustrates an example of adaptation modes in IP header compression according to an embodiment of the present invention (transmitting side).

Hereinafter, IP header compression will be described.

In the link layer, IP header compression/decompression scheme can be provided. IP header compression can include two parts: header compressor/decompressor and adaptation module. The header compression scheme can be based on the Robust Header Compression (RoHC). In addition, for broadcasting usage, adaptation function is added.

In the transmitter side, ROHC compressor reduces the size of header for each packet. Then, adaptation module extracts context information and builds signaling information from each packet stream. In the receiver side, adaptation module parses the signaling information associated with the received packet stream and attaches context information to the received packet stream. ROHC decompressor reconstructs the original IP packet by recovering the packet header.

The header compression scheme can be based on the RoHC as described above. In particular, in the present system, an RoHC framework can operate in a unidirectional mode (U mode) of the RoHC. In addition, in the present system, it is possible to use an RoHC UDP header compression profile which is identified by a profile identifier of 0x0002.

Hereinafter, adaptation will be described.

In case of transmission through the unidirectional link, if a receiver has no information of context, decompressor cannot recover the received packet header until receiving full context. This may cause channel change delay and turn on delay. For this reason, context information and configuration parameters between compressor and decompressor can be always sent with packet flow.

The Adaptation function provides out-of-band transmission of the configuration parameters and context information. Out-of-band transmission can be done through the link layer signaling. Therefore, the adaptation function is used to reduce the channel change delay and decompression error due to loss of context information.

Hereinafter, extraction of context information will be described.

Context information may be extracted using various schemes according to adaptation mode. In the present invention, three examples will be described below. The scope of the present invention is not restricted to the examples of the adaptation mode to be described below. Here, the adaptation mode may be referred to as a context extraction mode.

Adaptation Mode 1 (not illustrated) may be a mode in which no additional operation is applied to a basic RoHC packet stream. In other words, the adaptation module may operate as a buffer in this mode. Therefore, in this mode, context information may not be included in link layer signaling In Adaptation Mode 2 (tsib13010), the adaptation module can detect the IR packet from ROHC packet flow and extract the context information (static chain). After extracting the context information, each IR packet can be converted to an IR-DYN packet. The converted IR-DYN packet can be included and transmitted inside the ROHC packet flow in the same order as IR packet, replacing the original packet.

In Adaptation Mode 3 (tsib13020), the adaptation module can detect the IR and IR-DYN packet from ROHC packet flow and extract the context information. The static chain and dynamic chain can be extracted from IR packet and dynamic chain can be extracted from IR-DYN packet. After extracting the context information, each IR and IR-DYN packet can be converted to a compressed packet. The compressed packet format can be the same with the next packet of IR or IR-DYN packet. The converted compressed packet can be included and transmitted inside the ROHC packet flow in the same order as IR or IR-DYN packet, replacing the original packet.

Signaling (context) information can be encapsulated based on transmission structure. For example, context information can be encapsulated to the link layer signaling. In this case, the packet type value can be set to "100".

In the above-described Adaptation Modes 2 and 3, a link layer packet for context information may have a packet type field value of 100. In addition, a link layer packet for compressed IP packets may have a packet type field value of 001. The values indicate that each of the signaling information and the compressed IP packets are included in the link layer packet as described above.

Hereinafter, a description will be given of a method of transmitting the extracted context information.

The extracted context information can be transmitted separately from ROHC packet flow, with signaling data through specific physical data path. The transmission of context depends on the configuration of the physical layer path. The context information can be sent with other link layer signaling through the signaling data pipe.

In other words, the link layer packet having the context information may be transmitted through a signaling PLP together with link layer packets having other link layer signaling information (Packet_Type=100). Compressed IP packets from which context information is extracted may be transmitted through a general PLP (Packet_Type=001). Here, depending on embodiments, the signaling PLP may refer to an L1 signaling path. In addition, depending on embodiments, the signaling PLP may not be separated from the general PLP, and may refer to a particular and general PLP through which the signaling information is transmitted.

At a receiving side, prior to reception of a packet stream, a receiver may need to acquire signaling information. When receiver decodes initial PLP to acquire the signaling information, the context signaling can be also received. After the signaling acquisition is done, the PLP to receive packet stream can be selected. In other words, the receiver may acquire the signaling information including the context information by selecting the initial PLP. Here, the initial PLP may be the above-described signaling PLP. Thereafter, the receiver may select a PLP for acquiring a packet stream. In this way, the context information may be acquired prior to reception of the packet stream.

After the PLP for acquiring the packet stream is selected, the adaptation module can detect IR-DYN packet form received packet flow. Then, the adaptation module parses the static chain from the context information in the signaling data. This is similar to receiving the IR packet. For the same context identifier, IR-DYN packet can be recovered to IR packet. Recovered ROHC packet flow can be sent to ROHC decompressor. Thereafter, decompression may be started.

FIG. 14 illustrates a link mapping table (LMT) and an RoHC-U description table according to an embodiment of the present invention.

Hereinafter, link layer signaling will be described.

Generally, link layer signaling is operates under IP level. At the receiver side, link layer signaling can be obtained earlier than IP level signaling such as Service List Table (SLT) and Service Layer Signaling (SLS). Therefore, link layer signaling can be obtained before session establishment.

For link layer signaling, there can be two kinds of signaling according input path: internal link layer signaling and external link layer signaling. The internal link layer signaling is generated in link layer at transmitter side. And the link layer takes the signaling from external module or protocol. This kind of signaling information is considered as external link layer signaling. If some signaling need to be obtained prior to IP level signaling, external signaling is transmitted in format of link layer packet.

The link layer signaling can be encapsulated into link layer packet as described above. The link layer packets can carry any format of link layer signaling, including binary and XML. The same signaling information may not be transmitted in different formats for the link layer signaling.

Internal link layer signaling may include signaling information for link mapping. The Link Mapping Table (LMT) provides a list of upper layer sessions carried in a PLP. The LMT also provides addition information for processing the link layer packets carrying the upper layer sessions in the link layer.

An example of the LMT (tsib14010) according to the present invention is illustrated.

signaling_type can be an 8-bit unsigned integer field that indicates the type of signaling carried by this table. The value of signaling_type field for Link Mapping Table (LMT) can be set to 0x01.

PLP_ID can be an 8-bit field that indicates the PLP corresponding to this table.

num_session can be an 8-bit unsigned integer field that provides the number of upper layer sessions carried in the PLP identified by the above PLP_ID field. When the value of signaling_type field is 0x01, this field can indicate the number of UDP/IP sessions in the PLP.

src_IP_add can be a 32-bit unsigned integer field that contains the source IP address of an upper layer session carried in the PLP identified by the PLP_ID field.

dst_IP_add can be a 32-bit unsigned integer field that contains the destination IP address of an upper layer session carried in the PLP identified by the PLP_ID field.

src_UDP_port can be a 16-bit unsigned integer field that represents the source UDP port number of an upper layer session carried in the PLP identified by the PLP_ID field.

dst_UDP_port can be a 16-bit unsigned integer field that represents the destination UDP port number of an upper layer session carried in the PLP identified by the PLP_ID field.

SID_flag can be a 1-bit Boolean field that indicates whether the link layer packet carrying the upper layer session identified by above 4 fields, Src_IP_add, Dst_IP_add, Src_UDP_Port and Dst_UDP_Port, has an SID field in its optional header. When the value of this field is set to 0, the link layer packet carrying the upper layer session may not have an SID field in its optional header. When the value of this field is set to 1, the link layer packet carrying the upper layer session can have an SID field in its optional header and the value the SID field can be same as the following SID field in this table.

compressed_flag can be a 1-bit Boolean field that indicates whether the header compression is applied the link layer packets carrying the upper layer session identified by above 4 fields, Src_IP_add, Dst_IP_add, Src_UDP_Port and Dst_UDP_Port. When the value of this field is set to 0, the link layer packet carrying the upper layer session may have a value of 0x00 of Packet_Type field in its base header. When the value of this field is set to 1, the link layer packet carrying the upper layer session may have a value of 0x01 of Packet_Type field in its base header and the Context_ID field can be present.

SID can be an 8-bit unsigned integer field that indicates sub stream identifier for the link layer packets carrying the upper layer session identified by above 4 fields, Src_IP_add, Dst_IP_add, Src_UDP_Port and Dst_UDP_Port. This field can be present when the value of SID_flag is equal to 1.

context_id can be an 8-bit field that provides a reference for the context id (CID) provided in the ROHC-U description table. This field can be present when the value of compressed_flag is equal to 1.

An example of the RoHC-U description table (tsib14020) according to the present invention is illustrated. As described in the foregoing, the RoHC-U adaptation module may generate information related to header compression.

signaling_type can be an 8-bit field that indicates the type of signaling carried by this table. The value of signaling_type field for ROHC-U description table (RDT) can be set to "0x02".

PLP_ID can be an 8-bit field that indicates the PLP corresponding to this table.

context_id can be an 8-bit field that indicates the context id (CID) of the compressed IP stream. In this system, 8-bit CID can be used for large CID.

context_profile can be an 8-bit field that indicates the range of protocols used to compress the stream. This field can be omitted.

adaptation_mode can be a 2-bit field that indicates the mode of adaptation module in this PLP. Adaptation modes have been described above.

context_config can be a 2-bit field that indicates the combination of the context information. If there is no context information in this table, this field may be set to "0x0". If the static_chain( ) or dynamic_chain( ) byte is included in this table, this field may be set to "0x01" or "0x02" respectively. If both of the static_chain( ) and dynamic_chain( ) byte are included in this table, this field may be set to "0x03".

context_length can be an 8-bit field that indicates the length of the static chain byte sequence. This field can be omitted.

static_chain_byte( ) can be a field that conveys the static information used to initialize the ROHC-U decompressor. The size and structure of this field depend on the context profile.

dynamic_chain_byte( ) can be a field that conveys the dynamic information used to initialize the ROHC-U decompressor. The size and structure of this field depend on the context profile.

The static_chain_byte can be defined as sub-header information of IR packet. The dynamic_chain_byte can be defined as sub-header information of IR packet and IR-DYN packet.

FIG. 15 illustrates a structure of a link layer on a transmitter side according to an embodiment of the present invention.

The present embodiment presumes that an IP packet is processed. From a functional point of view, the link layer on the transmitter side may broadly include a link layer signaling part in which signaling information is processed, an overhead reduction part, and/or an encapsulation part. In addition, the link layer on the transmitter side may include a scheduler for controlling and scheduling an overall operation of the link layer and/or input and output parts of the link layer.

First, signaling information of an upper layer and/or a system parameter tsib15010 may be delivered to the link layer. In addition, an IP stream including IP packets may be delivered to the link layer from an IP layer tsib15110.

As described above, the scheduler tsib15020 may determine and control operations of several modules included in the link layer. The delivered signaling information and/or system parameter tsib15010 may be filterer or used by the scheduler tsib15020. Information, which corresponds to a part of the delivered signaling information and/or system parameter tsib15010, necessary for a receiver may be delivered to the link layer signaling part. In addition, information, which corresponds to a part of the signaling information, necessary for an operation of the link layer may be delivered to an overhead reduction controller tsib15120 or an encapsulation controller tsib15180.

The link layer signaling part may collect information to be transmitted as a signal in a physical layer, and convert/configure the information in a form suitable for transmission. The link layer signaling part may include a signaling manager tsib15030, a signaling formatter tsib15040, and/or a buffer for channels tsib15050.

The signaling manager tsib15030 may receive signaling information delivered from the scheduler tsib15020 and/or signaling (and/or context) information delivered from the overhead reduction part. The signaling manager tsib15030 may determine a path for transmission of the signaling information for delivered data. The signaling information may be delivered through the path determined by the signaling manager tsib15030. As described in the foregoing, signaling information to be transmitted through a divided channel such as the FIC, the EAS, etc. may be delivered to the signaling formatter tsib15040, and other signaling information may be delivered to an encapsulation buffer tsib15070.

The signaling formatter tsib15040 may format related signaling information in a form suitable for each divided channel such that signaling information may be transmitted through a separately divided channel. As described in the foregoing, the physical layer may include separate physically/logically divided channels. The divided channels may be used to transmit FIC signaling information or EAS-related information. The FIC or EAS-related information may be sorted by the signaling manager tsib15030, and input to the signaling formatter tsib15040. The signaling formatter tsib15040 may format the information based on each separate channel. When the physical layer is designed to transmit particular signaling information through a separately divided channel other than the FIC and the EAS, a signaling formatter for the particular signaling information may be additionally provided. Through this scheme, the link layer may be compatible with various physical layers.

The buffer for channels tsib15050 may deliver the signaling information received from the signaling formatter tsib15040 to separate dedicated channels tsib15060. The number and content of the separate channels may vary depending on embodiments.

As described in the foregoing, the signaling manager tsib15030 may deliver signaling information, which is not delivered to a particular channel, to the encapsulation buffer tsib15070. The encapsulation buffer tsib15070 may function as a buffer that receives the signaling information which is not delivered to the particular channel.

An encapsulation block for signaling information tsib15080 may encapsulate the signaling information which is not delivered to the particular channel. A transmission buffer tsib15090 may function as a buffer that delivers the encapsulated signaling information to a DP for signaling information tsib15100. Here, the DP for signaling information tsib15100 may refer to the above-described PLS region.

The overhead reduction part may allow efficient transmission by removing overhead of packets delivered to the link layer. It is possible to configure overhead reduction parts corresponding to the number of IP streams input to the link layer.

An overhead reduction buffer tsib15130 may receive an IP packet delivered from an upper layer. The received IP packet may be input to the overhead reduction part through the overhead reduction buffer tsib15130.

An overhead reduction controller tsib15120 may determine whether to perform overhead reduction on a packet stream input to the overhead reduction buffer tsib15130. The overhead reduction controller tsib15120 may determine whether to perform overhead reduction for each packet stream. When overhead reduction is performed on a packet stream, packets may be delivered to a robust header compression (RoHC) compressor tsib15140 to perform overhead reduction. When overhead reduction is not performed on a packet stream, packets may be delivered to the encapsulation part to perform encapsulation without overhead reduction. Whether to perform overhead reduction of packets may be determined based on the signaling information tsib15010 delivered to the link layer. The signaling information may be delivered to the encapsulation controller tsib15180 by the scheduler tsib15020.

The RoHC compressor tsib15140 may perform overhead reduction on a packet stream. The RoHC compressor tsib15140 may perform an operation of compressing a header of a packet. Various schemes may be used for overhead reduction. Overhead reduction may be performed using a scheme proposed by the present invention. The present invention presumes an IP stream, and thus an expression "RoHC compressor" is used. However, the name may be changed depending on embodiments. The operation is not restricted to compression of the IP stream, and overhead reduction of all types of packets may be performed by the RoHC compressor tsib15140.

A packet stream configuration block tsib15150 may separate information to be transmitted to a signaling region and information to be transmitted to a packet stream from IP packets having compressed headers. The information to be transmitted to the packet stream may refer to information to be transmitted to a DP region. The information to be transmitted to the signaling region may be delivered to a signaling and/or context controller tsib15160. The information to be transmitted to the packet stream may be transmitted to the encapsulation part.

The signaling and/or context controller tsib15160 may collect signaling and/or context information and deliver the signaling and/or context information to the signaling manager in order to transmit the signaling and/or context information to the signaling region.

The encapsulation part may perform an operation of encapsulating packets in a form suitable for a delivery to the physical layer. It is possible to configure encapsulation parts corresponding to the number of IP streams.

An encapsulation buffer tsib15170 may receive a packet stream for encapsulation. Packets subjected to overhead reduction may be received when overhead reduction is performed, and an input IP packet may be received without change when overhead reduction is not performed.

An encapsulation controller tsib15180 may determine whether to encapsulate an input packet stream. When encapsulation is performed, the packet stream may be delivered to a segmentation/concatenation block tsib15190. When encapsulation is not performed, the packet stream may be delivered to a transmission buffer tsib15230. Whether to encapsulate packets may be determined based on the signaling information tsib15010 delivered to the link layer. The signaling information may be delivered to the encapsulation controller tsib15180 by the scheduler tsib15020.

In the segmentation/concatenation block tsib15190, the above-described segmentation or concatenation operation may be performed on packets. In other words, when an input IP packet is longer than a link layer packet corresponding to an output of the link layer, one IP packet may be segmented into several segments to configure a plurality of link layer packet payloads. On the other hand, when an input IP packet is shorter than a link layer packet corresponding to an output of the link layer, several IP packets may be concatenated to configure one link layer packet payload.

A packet configuration table tsib15200 may have configuration information of a segmented and/or concatenated link layer packet. A transmitter and a receiver may have the same information in the packet configuration table tsib15200. The transmitter and the receiver may refer to the information of the packet configuration table tsib15200. An index value of the information of the packet configuration table tsib15200 may be included in a header of the link layer packet.

A link layer header information block tsib15210 may collect header information generated in an encapsulation process. In addition, the link layer header information block tsib15210 may collect header information included in the packet configuration table tsib15200. The link layer header information block tsib15210 may configure header information according to a header structure of the link layer packet.

A header attachment block tsib15220 may add a header to a payload of a segmented and/or concatenated link layer packet. The transmission buffer tsib15230 may function as a buffer to deliver the link layer packet to a DP tsib15240 of the physical layer.

The respective blocks, modules, or parts may be configured as one module/protocol or a plurality of modules/protocols in the link layer.

FIG. 16 illustrates a structure of a link layer on a receiver side according to an embodiment of the present invention.

The present embodiment presumes that an IP packet is processed. From a functional point of view, the link layer on the receiver side may broadly include a link layer signaling part in which signaling information is processed, an overhead processing part, and/or a decapsulation part. In addition, the link layer on the receiver side may include a scheduler for controlling and scheduling overall operation of the link layer and/or input and output parts of the link layer.

First, information received through a physical layer may be delivered to the link layer. The link layer may process the information, restore an original state before being processed at a transmitter side, and then deliver the information to an upper layer. In the present embodiment, the upper layer may be an IP layer.

Information, which is separated in the physical layer and delivered through a particular channel tsib16030, may be delivered to a link layer signaling part. The link layer signaling part may determine signaling information received from the physical layer, and deliver the determined signaling information to each part of the link layer.

A buffer for channels tsib16040 may function as a buffer that receives signaling information transmitted through particular channels. As described in the foregoing, when physically/logically divided separate channels are present in the physical layer, it is possible to receive signaling information transmitted through the channels. When the information received from the separate channels is segmented, the segmented information may be stored until complete information is configured.

A signaling decoder/parser tsib16050 may verify a format of the signaling information received through the particular channel, and extract information to be used in the link layer. When the signaling information received through the particular channel is encoded, decoding may be performed. In addition, according to a given embodiment, it is possible to verify integrity, etc. of the signaling information.

A signaling manager tsib16060 may integrate signaling information received through several paths. Signaling information received through a DP for signaling tsib16070 to be described below may be integrated in the signaling manager tsib16060. The signaling manager tsib16060 may deliver signaling information necessary for each part in the link layer. For example, the signaling manager tsib16060 may deliver context information, etc. for recovery of a packet to the overhead processing part. In addition, the signaling manager tsib16060 may deliver signaling information for control to a scheduler tsib16020.

General signaling information, which is not received through a separate particular channel, may be received through the DP for signaling tsib16070. Here, the DP for signaling may refer to PLS, L1, etc. Here, the DP may be referred to as a PLP. A reception buffer tsib16080 may function as a buffer that receives signaling information delivered from the DP for signaling. In a decapsulation block for signaling information tsib16090, the received signaling information may be decapsulated. The decapsulated signaling information may be delivered to the signaling manager tsib16060 through a decapsulation buffer tsib16100. As described in the foregoing, the signaling manager tsib16060 may collate signaling information, and deliver the collated signaling information to a necessary part in the link layer.

The scheduler tsib16020 may determine and control operations of several modules included in the link layer. The scheduler tsib16020 may control each part of the link layer using receiver information tsib16010 and/or information delivered from the signaling manager tsib16060. In addition, the scheduler tsib16020 may determine an operation mode, etc. of each part. Here, the receiver information tsib16010 may refer to information previously stored in the receiver. The scheduler tsib16020 may use information changed by a user such as channel switching, etc. to perform a control operation.

The decapsulation part may filter a packet received from a DP tsib16110 of the physical layer, and separate a packet according to a type of the packet. It is possible to configure decapsulation parts corresponding to the number of DPs that can be simultaneously decoded in the physical layer.

The decapsulation buffer tsib16100 may function as a buffer that receives a packet stream from the physical layer to perform decapsulation. A decapsulation controller tsib16130 may determine whether to decapsulate an input packet stream. When decapsulation is performed, the packet stream may be delivered to a link layer header parser tsib16140. When decapsulation is not performed, the packet stream may be delivered to an output buffer tsib16220. The signaling information received from the scheduler tsib16020 may be used to determine whether to perform decapsulation.

The link layer header parser tsib16140 may identify a header of the delivered link layer packet. It is possible to identify a configuration of an IP packet included in a payload of the link layer packet by identifying the header. For example, the IP packet may be segmented or concatenated.

A packet configuration table tsib16150 may include payload information of segmented and/or concatenated link layer packets. The transmitter and the receiver may have the same information in the packet configuration table tsib16150. The transmitter and the receiver may refer to the information of the packet configuration table tsib16150. It is possible to find a value necessary for reassembly based on index information included in the link layer packet.

A reassembly block tsib16160 may configure payloads of the segmented and/or concatenated link layer packets as packets of an original IP stream. Segments may be collected and reconfigured as one IP packet, or concatenated packets may be separated and reconfigured as a plurality of IP packet streams. Recombined IP packets may be delivered to the overhead processing part.

The overhead processing part may perform an operation of restoring a packet subjected to overhead reduction to an original packet as a reverse operation of overhead reduction performed in the transmitter. This operation may be referred to as overhead processing. It is possible to configure overhead processing parts corresponding to the number of DPs that can be simultaneously decoded in the physical layer.

A packet recovery buffer tsib16170 may function as a buffer that receives a decapsulated RoHC packet or IP packet to perform overhead processing.

An overhead controller tsib16180 may determine whether to recover and/or decompress the decapsulated packet. When recovery and/or decompression are performed, the packet may be delivered to a packet stream recovery block tsib16190. When recovery and/or decompression are not performed, the packet may be delivered to the output buffer tsib16220. Whether to perform recovery and/or decompression may be determined based on the signaling information delivered by the scheduler tsib16020.

The packet stream recovery block tsib16190 may perform an operation of integrating a packet stream separated from the transmitter with context information of the packet stream. This operation may be a process of restoring a packet stream such that an RoHC decompressor tsib16210 can perform processing. In this process, it is possible to receive signaling information and/or context information from a signaling and/or context controller tsib16200. The signaling and/or context controller tsib16200 may determine signaling information delivered from the transmitter, and deliver the signaling information to the packet stream recovery block tsib16190 such that the signaling information may be mapped to a stream corresponding to a context ID.

The RoHC decompressor tsib16210 may restore headers of packets of the packet stream. The packets of the packet stream may be restored to forms of original IP packets through restoration of the headers. In other words, the RoHC decompressor tsib16210 may perform overhead processing.

The output buffer tsib16220 may function as a buffer before an output stream is delivered to an IP layer tsib16230.

The link layers of the transmitter and the receiver proposed in the present invention may include the blocks or modules described above. In this way, the link layer may independently operate irrespective of an upper layer and a lower layer, overhead reduction may be efficiently performed, and a supportable function according to an upper/lower layer may be easily defined/added/deleted.

FIG. 17 illustrates a configuration of signaling transmission through a link layer according to an embodiment of the present invention (transmitting/receiving sides).

In the present invention, a plurality of service providers (broadcasters) may provide services within one frequency band. In addition, a service provider may provide a plurality of services, and one service may include one or more components. It can be considered that the user receives content using a service as a unit.

The present invention presumes that a transmission protocol based on a plurality of sessions is used to support an IP hybrid broadcast. Signaling information delivered through a signaling path may be determined based on a transmission configuration of each protocol. Various names may be applied to respective protocols according to a given embodiment.

In the illustrated data configuration tsib17010 on the transmitting side, service providers (broadcasters) may provide a plurality of services (Service #1, #2, . . . ). In general, a signal for a service may be transmitted through a general transmission session (signaling C). However, the signal may be transmitted through a particular session (dedicated session) according to a given embodiment (signaling B).

Service data and service signaling information may be encapsulated according to a transmission protocol. According to a given embodiment, an IP/UDP layer may be used. According to a given embodiment, a signal in the IP/UDP layer (signaling A) may be additionally provided. This signaling may be omitted.

Data processed using the IP/UDP may be input to the link layer. As described in the foregoing, overhead reduction and/or encapsulation may be performed in the link layer. Here, link layer signaling may be additionally provided. Link layer signaling may include a system parameter, etc. Link layer signaling has been described above.

The service data and the signaling information subjected to the above process may be processed through PLPs in a physical layer. Here, a PLP may be referred to as a DP. The example illustrated in the figure presumes a case in which a base DP/PLP is used. However, depending on embodiments, transmission may be performed using only a general DP/PLP without the base DP/PLP.

In the example illustrated in the figure, a particular channel (dedicated channel) such as an FIC, an EAC, etc. is used. A signal delivered through the FIC may be referred to as a fast information table (FIT), and a signal delivered through the EAC may be referred to as an emergency alert table (EAT). The FIT may be identical to the above-described SLT. The particular channels may not be used depending on embodiments. When the particular channel (dedicated channel) is not configured, the FIT and the EAT may be transmitted using a general link layer signaling transmission scheme, or transmitted using a PLP via the IP/UDP as other service data.

According to a given embodiment, system parameters may include a transmitter-related parameter, a service provider-related parameter, etc. Link layer signaling may include IP header compression-related context information and/or identification information of data to which the context is applied. Signaling of an upper layer may include an IP address, a UDP number, service/component information, emergency alert-related information, an IP/UDP address for service signaling, a session ID, etc. Detailed examples thereof have been described above.

In the illustrated data configuration tsib17020 on the receiving side, the receiver may decode only a PLP for a corresponding service using signaling information without having to decode all PLPs.

First, when the user selects or changes a service desired to be received, the receiver may be tuned to a corresponding frequency and may read receiver information related to a corresponding channel stored in a DB, etc. The information stored in the DB, etc. of the receiver may be configured by reading an SLT at the time of initial channel scan.

After receiving the SLT and the information about the corresponding channel, information previously stored in the DB is updated, and information about a transmission path of the service selected by the user and information about a path, through which component information is acquired or a signal necessary to acquire the information is transmitted, are acquired. When the information is not determined to be changed using version information of the SLT, decoding or parsing may be omitted.

The receiver may verify whether SLT information is included in a PLP by parsing physical signaling of the PLP in a corresponding broadcast stream (not illustrated), which may be indicated through a particular field of physical signaling. It is possible to access a position at which a service layer signal of a particular service is transmitted by accessing the SLT information. The service layer signal may be encapsulated into the IP/UDP and delivered through a transmission session. It is possible to acquire information about a component included in the service using this service layer signaling. A specific SLT-SLS configuration is as described above.

In other words, it is possible to acquire transmission path information, for receiving upper layer signaling information (service signaling information) necessary to receive the service, corresponding to one of several packet streams and PLPs currently transmitted on a channel using the SLT. The transmission path information may include an IP address, a UDP port number, a session ID, a PLP ID, etc. Here, depending on embodiments, a value previously designated by the IANA or a system may be used as an IP/UDP address. The information may be acquired using a scheme of accessing a DB or a shared memory, etc.

When the link layer signal and service data are transmitted through the same PLP, or only one PLP is operated, service data delivered through the PLP may be temporarily stored in a device such as a buffer, etc. while the link layer signal is decoded.

It is possible to acquire information about a path through which the service is actually transmitted using service signaling information of a service to be received. In addition, a received packet stream may be subjected to decapsulation and header recovery using information such as overhead reduction for a PLP to be received, etc.

In the illustrated example (tsib17020), the FIC and the EAC are used, and a concept of the base DP/PLP is presumed. As described in the foregoing, concepts of the FIC, the EAC, and the base DP/PLP may not be used.

While MISO or MIMO uses two antennas in the following for convenience of description, the present invention is applicable to systems using two or more antennas. The present invention proposes a physical profile (or system) optimized to minimize receiver complexity while attaining the performance required for a particular use case. Physical (PHY) profiles (base, handheld and advanced profiles) according to an embodiment of the present invention are subsets of all configurations that a corresponding receiver should implement. The PHY profiles share most of the functional blocks but differ slightly in specific blocks and/or parameters. For the system evolution, future profiles may also be multiplexed with existing profiles in a single radio frequency (RF) channel through a future extension frame (FEF). The base profile and the handheld profile according to the embodiment of the present invention refer to profiles to which MIMO is not applied, and the advanced profile refers to a profile to which MIMO is applied. The base profile may be used as a profile for both the terrestrial broadcast service and the mobile broadcast service. That is, the base profile may be used to define a concept of a profile which includes the mobile profile. In addition, the advanced profile may be divided into an advanced profile for a base profile with MIMO and an advanced profile for a handheld profile with MIMO. Moreover, the profiles may be changed according to intention of the designer.

The following terms and definitions may be applied to the present invention. The following terms and definitions may be changed according to design.

Auxiliary stream: sequence of cells carrying data of as yet undefined modulation and coding, which may be used for future extensions or as required by broadcasters or network operators Base data pipe: data pipe that carries service signaling data Baseband frame (or BBFRAME): set of Kbch bits which form the input to one FEC encoding process (BCH and LDPC encoding)

Cell: modulation value that is carried by one carrier of orthogonal frequency division multiplexing (OFDM) transmission Coded block: LDPC-encoded block of PLS1 data or one of the LDPC-encoded blocks of PLS2 data Data pipe: logical channel in the physical layer that carries service data or related metadata, which may carry one or a plurality of service(s) or service component(s).

Data pipe unit (DPU): a basic unit for allocating data cells to a DP in a frame.

Data symbol: OFDM symbol in a frame which is not a preamble symbol (the data symbol encompasses the frame signaling symbol and frame edge symbol)

DP_ID: this 8-bit field identifies uniquely a DP within the system identified by the SYSTEM_ID Dummy cell: cell carrying a pseudo-random value used to fill the remaining capacity not used for PLS signaling, DPs or auxiliary streams Emergency alert channel (EAC): part of a frame that carries EAS information data Frame: physical layer time slot that starts with a preamble and ends with a frame edge symbol Frame repetition unit: a set of frames belonging to the same or different physical layer profiles including an FEF, which is repeated eight times in a superframe Fast information channel (FIC): a logical channel in a frame that carries mapping information between a service and the corresponding base DP FECBLOCK: set of LDPC-encoded bits of DP data FFT size: nominal FFT size used for a particular mode, equal to the active symbol period Ts expressed in cycles of an elementary period T Frame signaling symbol: OFDM symbol with higher pilot density used at the start of a frame in certain combinations of FFT size, guard interval and scattered pilot pattern, which carries a part of the PLS data Frame edge symbol: OFDM symbol with higher pilot density used at the end of a frame in certain combinations of FFT size, guard interval and scattered pilot pattern Frame group: the set of all frames having the same PHY profile type in a superframe Future extension frame: physical layer time slot within the superframe that may be used for future extension, which starts with a preamble Futurecast UTB system: proposed physical layer broadcast system, the input of which is one or more MPEG2-TS, IP or general stream(s) and the output of which is an RF signal Input stream: a stream of data for an ensemble of services delivered to the end users by the system Normal data symbol: data symbol excluding the frame signaling symbol and the frame edge symbol PHY profile: subset of all configurations that a corresponding receiver should implement PLS: physical layer signaling data including PLS1 and PLS2

PLS1: a first set of PLS data carried in a frame signaling symbol (FSS) having a fixed size, coding and modulation, which carries basic information about a system as well as parameters needed to decode PLS2

NOTE: PLS1 data remains constant for the duration of a frame group

PLS2: a second set of PLS data transmitted in the FSS, which carries more detailed PLS data about the system and the DPs PLS2 dynamic data: PLS2 data that dynamically changes frame-by-frame PLS2 static data: PLS2 data that remains static for the duration of a frame group Preamble signaling data: signaling data carried by the preamble symbol and used to identify the basic mode of the system Preamble symbol: fixed-length pilot symbol that carries basic PLS data and is located at the beginning of a frame The preamble symbol is mainly used for fast initial band scan to detect the system signal, timing thereof, frequency offset, and FFT size.

Reserved for future use: not defined by the present document but may be defined in future Superframe: set of eight frame repetition units Time interleaving block (TI block): set of cells within which time interleaving is carried out, corresponding to one use of a time interleaver memory TI group: unit over which dynamic capacity allocation for a particular DP is carried out, made up of an integer, dynamically varying number of XFECBLOCKs NOTE: The TI group may be mapped directly to one frame or may be mapped to a plurality of frames. The TI group may contain one or more TI blocks.

Type 1 DP: DP of a frame where all DPs are mapped to the frame in time division multiplexing (TDM) scheme Type 2 DP: DP of a frame where all DPs are mapped to the frame in frequency division multiplexing (FDM) scheme XFECBLOCK: set of Ncells cells carrying all the bits of one LDPC FECBLOCK FIG. 18 illustrates a configuration of a broadcast signal transmission apparatus for future broadcast services according to an embodiment of the present invention.

The broadcast signal transmission apparatus for future broadcast services according to the present embodiment may include an input formatting block 1000, a bit interleaved coding & modulation (BICM) block 1010, a frame building block 1020, an OFDM generation block 1030 and a signaling generation block 1040. Description will be given of an operation of each block of the broadcast signal transmission apparatus.

In input data according to an embodiment of the present invention, IP stream/packets and MPEG2-TS may be main input formats, and other stream types are handled as general streams. In addition to these data inputs, management information is input to control scheduling and allocation of the corresponding bandwidth for each input stream. In addition, the present invention allows simultaneous input of one or a plurality of TS streams, IP stream(s) and/or a general stream(s).

The input formatting block 1000 may demultiplex each input stream into one or a plurality of data pipes, to each of which independent coding and modulation are applied. A DP is the basic unit for robustness control, which affects QoS. One or a plurality of services or service components may be carried by one DP. The DP is a logical channel in a physical layer for delivering service data or related metadata capable of carrying one or a plurality of services or service components.

In addition, a DPU is a basic unit for allocating data cells to a DP in one frame.

An input to the physical layer may include one or a plurality of data streams. Each of the data streams is delivered by one DP. The input formatting block 1000 may covert a data stream input through one or more physical paths (or DPs) into a baseband frame (BBF). In this case, the input formatting block 1000 may perform null packet deletion or header compression on input data (a TS or IP input stream) in order to enhance transmission efficiency. A receiver may have a priori information for a particular part of a header, and thus this known information may be deleted from a transmitter. A null packet deletion block 3030 may be used only for a TS input stream.

In the BICM block 1010, parity data is added for error correction and encoded bit streams are mapped to complex-value constellation symbols. The symbols are interleaved across a specific interleaving depth that is used for the corresponding DP. For the advanced profile, MIMO encoding is performed in the BICM block 1010 and an additional data path is added at the output for MIMO transmission.

The frame building block 1020 may map the data cells of the input DPs into the OFDM symbols within a frame, and perform frequency interleaving for frequency-domain diversity, especially to combat frequency-selective fading channels. The frame building block 1020 may include a delay compensation block, a cell mapper and a frequency interleaver.

The delay compensation block may adjust timing between DPs and corresponding PLS data to ensure that the DPs and the corresponding PLS data are co-timed at a transmitter side. The PLS data is delayed by the same amount as the data pipes by addressing the delays of data pipes caused by the input formatting block and BICM block. The delay of the BICM block is mainly due to the time interleaver. In-band signaling data carries information of the next TI group so that the information is carried one frame ahead of the DPs to be signaled. The delay compensation block delays in-band signaling data accordingly.

The cell mapper may map PLS, DPs, auxiliary streams, dummy cells, etc. to active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. A basic function of the cell mapper is to map a data cell generated by time interleaving for each DP and PLS cell to an array of active OFDM cells (if present) corresponding to respective OFDM symbols in one frame. Service signaling data (such as program specific information (PSI)/SI) may be separately gathered and sent by a DP. The cell mapper operates according to dynamic information produced by a scheduler and the configuration of a frame structure. The frequency interleaver may randomly interleave data cells received from the cell mapper to provide frequency diversity. In addition, the frequency interleaver may operate on an OFDM symbol pair including two sequential OFDM symbols using a different interleaving-seed order to obtain maximum interleaving gain in a single frame.

The OFDM generation block 1030 modulates OFDM carriers by cells produced by the frame building block, inserts pilots, and produces a time domain signal for transmission. In addition, this block subsequently inserts guard intervals, and applies peak-to-average power ratio (PAPR) reduction processing to produce a final RF signal.

Specifically, after inserting a preamble at the beginning of each frame, the OFDM generation block 1030 may apply conventional OFDM modulation having a cyclic prefix as a guard interval. For antenna space diversity, a distributed MISO scheme is applied across transmitters. In addition, a PAPR scheme is performed in the time domain. For flexible network planning, the present invention provides a set of various FFT sizes, guard interval lengths and corresponding pilot patterns.

In addition, the present invention may multiplex signals of a plurality of broadcast transmission/reception systems in the time domain such that data of two or more different broadcast transmission/reception systems providing broadcast services may be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc.

The signaling generation block 1040 may create physical layer signaling information used for an operation of each functional block. This signaling information is also transmitted so that services of interest are properly recovered at a receiver side. Signaling information according to an embodiment of the present invention may include PLS data. PLS provides the receiver with a means to access physical layer DPs. The PLS data includes PLS1 data and PLS2 data.

The PLS1 data is a first set of PLS data carried in an FSS symbol in a frame having a fixed size, coding and modulation, which carries basic information about the system in addition to the parameters needed to decode the PLS2 data. The PLS1 data provides basic transmission parameters including parameters required to enable reception and decoding of the PLS2 data. In addition, the PLS1 data remains constant for the duration of a frame group.

The PLS2 data is a second set of PLS data transmitted in an FSS symbol, which carries more detailed PLS data about the system and the DPs. The PLS2 contains parameters that provide sufficient information for the receiver to decode a desired DP. The PLS2 signaling further includes two types of parameters, PLS2 static data (PLS2-STAT data) and PLS2 dynamic data (PLS2-DYN data). The PLS2 static data is PLS2 data that remains static for the duration of a frame group and the PLS2 dynamic data is PLS2 data that dynamically changes frame by frame. Details of the PLS data will be described later.

The above-described blocks may be omitted or replaced by blocks having similar or identical functions.

FIG. 19 illustrates a BICM block according to an embodiment of the present invention.

The BICM block illustrated in FIG. 19 corresponds to an embodiment of the BICM block 1010 described with reference to FIG. 18.

As described above, the broadcast signal transmission apparatus for future broadcast services according to the embodiment of the present invention may provide a terrestrial broadcast service, mobile broadcast service, UHDTV service, etc.

Since QoS depends on characteristics of a service provided by the broadcast signal transmission apparatus for future broadcast services according to the embodiment of the present invention, data corresponding to respective services needs to be processed using different schemes. Accordingly, the BICM block according to the embodiment of the present invention may independently process respective DPs by independently applying SISO, MISO and MIMO schemes to data pipes respectively corresponding to data paths. Consequently, the broadcast signal transmission apparatus for future broadcast services according to the embodiment of the present invention may control QoS for each service or service component transmitted through each DP.

shows a BICM block applied to a profile (or system) to which MIMO is not applied, and (b) shows a BICM block of a profile (or system) to which MIMO is applied.

The BICM block to which MIMO is not applied and the BICM block to which MIMO is applied may include a plurality of processing blocks for processing each DP.

Description will be given of each processing block of the BICM block to which MIMO is not applied and the BICM block to which MIMO is applied.

A processing block 5000 of the BICM block to which MIMO is not applied may include a data FEC encoder 5010, a bit interleaver 5020, a constellation mapper 5030, a signal space diversity (SSD) encoding block 5040 and a time interleaver 5050.

The data FEC encoder 5010 performs FEC encoding on an input BBF to generate FECBLOCK procedure using outer coding (BCH) and inner coding (LDPC). The outer coding (BCH) is optional coding method. A detailed operation of the data FEC encoder 5010 will be described later.

The bit interleaver 5020 may interleave outputs of the data FEC encoder 5010 to achieve optimized performance with a combination of LDPC codes and a modulation scheme while providing an efficiently implementable structure. A detailed operation of the bit interleaver 5020 will be described later.

The constellation mapper 5030 may modulate each cell word from the bit interleaver 5020 in the base and the handheld profiles, or each cell word from the cell-word demultiplexer 5010-1 in the advanced profile using either QPSK, QAM-16, non-uniform QAM (NUQ-64, NUQ-256, or NUQ-1024) or non-uniform constellation (NUC-16, NUC-64, NUC-256, or NUC-1024) mapping to give a power-normalized constellation point, el. This constellation mapping is applied only for DPs. It is observed that QAM-16 and NUQs are square shaped, while NUCs have arbitrary shapes. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in the PLS2 data.

The time interleaver 5050 may operates at a DP level. Parameters of time interleaving (TI) may be set differently for each DP. A detailed operation of the time interleaver 5050 will be described later.

A processing block 5000-1 of the BICM block to which MIMO is applied may include the data FEC encoder, the bit interleaver, the constellation mapper, and the time interleaver.

However, the processing block 5000-1 is distinguished from the processing block 5000 of the BICM block to which MIMO is not applied in that the processing block 5000-1 further includes a cell-word demultiplexer 5010-1 and a MIMO encoding block 5020-1.

In addition, operations of the data FEC encoder, the bit interleaver, the constellation mapper, and the time interleaver in the processing block 5000-1 correspond to those of the data FEC encoder 5010, the bit interleaver 5020, the constellation mapper 5030, and the time interleaver 5050 described above, and thus description thereof is omitted.

The cell-word demultiplexer 5010-1 is used for a DP of the advanced profile to divide a single cell-word stream into dual cell-word streams for MIMO processing.

The MIMO encoding block 5020-1 may process an output of the cell-word demultiplexer 5010-1 using a MIMO encoding scheme. The MIMO encoding scheme is optimized for broadcast signal transmission. MIMO technology is a promising way to obtain a capacity increase but depends on channel characteristics. Especially for broadcasting, a strong LOS component of a channel or a difference in received signal power between two antennas caused by different signal propagation characteristics makes it difficult to obtain capacity gain from MIMO. The proposed MIMO encoding scheme overcomes this problem using rotation-based precoding and phase randomization of one of MIMO output signals.

MIMO encoding is intended for a 2×2 MIMO system requiring at least two antennas at both the transmitter and the receiver. A MIMO encoding mode of the present invention may be defined as full-rate spatial multiplexing (FR-SM). FR-SM encoding may provide capacity increase with relatively small complexity increase at the receiver side. In addition, the MIMO encoding scheme of the present invention has no restriction on an antenna polarity configuration.

MIMO processing is applied at the DP level. NUQ (e1,i and e2,i) corresponding to a pair of constellation mapper outputs is fed to an input of a MIMO encoder. Paired MIMO encoder output (g1,i and g2,i) is transmitted by the same carrier k and OFDM symbol 1 of respective TX antennas thereof.

The above-described blocks may be omitted or replaced by blocks having similar or identical functions.

FIG. 20 illustrates a BICM block according to another embodiment of the present invention.

The BICM block illustrated in FIG. 20 corresponds to another embodiment of the BICM block 1010 described with reference to FIG. 18.

FIG. 20 illustrates a BICM block for protection of physical layer signaling (PLS), an emergency alert channel (EAC) and a fast information channel (FIC). The EAC is a part of a frame that carries EAS information data, and the FIC is a logical channel in a frame that carries mapping information between a service and a corresponding base DP. Details of the EAC and FIC will be described later.

Referring to FIG. 20, the BICM block for protection of the PLS, the EAC and the FIC may include a PLS FEC encoder 6000, a bit interleaver 6010 and a constellation mapper 6020.

In addition, the PLS FEC encoder 6000 may include a scrambler, a BCH encoding/zero insertion block, an LDPC encoding block and an LDPC parity puncturing block. Description will be given of each block of the BICM block.

The PLS FEC encoder 6000 may encode scrambled PLS 1/2 data, EAC and FIC sections.

The scrambler may scramble PLS1 data and PLS2 data before BCH encoding and shortened and punctured LDPC encoding.

The BCH encoding/zero insertion block may perform outer encoding on the scrambled PLS 1/2 data using a shortened BCH code for PLS protection, and insert zero bits after BCH encoding. For PLS1 data only, output bits of zero insertion may be permutted before LDPC encoding.

The LDPC encoding block may encode an output of the BCH encoding/zero insertion block using an LDPC code. To generate a complete coded block, Cldpc and parity bits Pldpc are encoded systematically from each zero-inserted PLS information block Ildpc and appended thereto.

$$C_{ldpc}=[I_{ldpc}P_{ldpc}]=[i_0,i_1,\ldots,i_{K_{ldpc}-1},p_0,p_1,\ldots,p_{N_{ldpc}-K_{ldpc}-1}]$$ [Equation 1]

The LDPC parity puncturing block may perform puncturing on the PLS1 data and the PLS2 data.

When shortening is applied to PLS1 data protection, some LDPC parity bits are punctured after LDPC encoding. In addition, for PLS2 data protection, LDPC parity bits of PLS2 are punctured after LDPC encoding. These punctured bits are not transmitted.

The bit interleaver 6010 may interleave each of shortened and punctured PLS1 data and PLS2 data.

The constellation mapper 6020 may map the bit-interleaved PLS1 data and PLS2 data to constellations.

The above-described blocks may be omitted or replaced by blocks having similar or identical functions.

FIG. 21 illustrates a bit interleaving process of PLS according to an embodiment of the present invention.

Each shortened and punctured PLS1 and PLS2 coded block is interleaved bit-by-bit as described in FIG. 22. Each block of additional parity bits is interleaved with the same block interleaving structure but separately.

In the case of BPSK, there are two branches for bit interleaving to duplicate FEC coded bits in the real and imaginary parts. Each coded block is written to the upper branch first. The bits are mapped to the lower branch by applying modulo NFEC addition with cyclic shifting value floor(NFEC/2), where NFEC is the length of each LDPC coded block after shortening and puncturing.

In other modulation cases, such as QSPK, QAM-16 and NUQ-64, FEC coded bits are written serially into the interleaver column-wise, where the number of columns is the same as the modulation order.

In the read operation, the bits for one constellation symbol are read out sequentially row-wise and fed into the bit demultiplexer block. These operations are continued until the end of the column.

Each bit interleaved group is demultiplexed bit-by-bit in a group before constellation mapping. Depending on modulation order, there are two mapping rules. In the case of BPSK and QPSK, the reliability of bits in a symbol is equal. Therefore, the bit group read out from the bit interleaving block is mapped to a QAM symbol without any operation.

In the cases of QAM-16 and NUQ-64 mapped to a QAM symbol, the rule of operation is described in FIG. 23(a). As shown in FIG. 23(a), i is bit group index corresponding to column index in bit interleaving.

FIG. 21 shows the bit demultiplexing rule for QAM-16. This operation continues until all bit groups are read from the bit interleaving block.

FIG. 22 illustrates a configuration of a broadcast signal reception apparatus for future broadcast services according to an embodiment of the present invention.

The broadcast signal reception apparatus for future broadcast services according to the embodiment of the present invention may correspond to the broadcast signal transmission apparatus for future broadcast services described with reference to FIG. 18.

The broadcast signal reception apparatus for future broadcast services according to the embodiment of the present invention may include a synchronization & demodulation module 9000, a frame parsing module 9010, a demapping & decoding module 9020, an output processor 9030 and a signaling decoding module 9040. A description will be given of operation of each module of the broadcast signal reception apparatus.

The synchronization & demodulation module 9000 may receive input signals through m Rx antennas, perform signal detection and synchronization with respect to a system corresponding to the broadcast signal reception apparatus, and carry out demodulation corresponding to a reverse procedure of a procedure performed by the broadcast signal transmission apparatus.

The frame parsing module 9010 may parse input signal frames and extract data through which a service selected by a user is transmitted. If the broadcast signal transmission apparatus performs interleaving, the frame parsing module 9010 may carry out deinterleaving corresponding to a reverse procedure of interleaving. In this case, positions of a signal and data that need to be extracted may be obtained by decoding data output from the signaling decoding module 9040 to restore scheduling information generated by the broadcast signal transmission apparatus.

The demapping & decoding module 9020 may convert input signals into bit domain data and then deinterleave the same as necessary. The demapping & decoding module 9020 may perform demapping of mapping applied for transmission efficiency and correct an error generated on a transmission channel through decoding. In this case, the demapping & decoding module 9020 may obtain transmission parameters necessary for demapping and decoding by decoding data output from the signaling decoding module 9040.

The output processor 9030 may perform reverse procedures of various compression/signal processing procedures which are applied by the broadcast signal transmission apparatus to improve transmission efficiency. In this case, the output processor 9030 may acquire necessary control information from data output from the signaling decoding module 9040. An output of the output processor 9030 corresponds to a signal input to the broadcast signal transmission apparatus and may be MPEG-TSs, IP streams (v4 or v6) and generic streams.

The signaling decoding module 9040 may obtain PLS information from a signal demodulated by the synchronization & demodulation module 9000. As described above, the frame parsing module 9010, the demapping & decoding module 9020 and the output processor 9030 may execute functions thereof using data output from the signaling decoding module 9040.

A frame according to an embodiment of the present invention is further divided into a number of OFDM symbols and a preamble. As shown in (d), the frame includes a preamble, one or more frame signaling symbols (FSSs), normal data symbols and a frame edge symbol (FES).

The preamble is a special symbol that enables fast future-cast UTB system signal detection and provides a set of basic transmission parameters for efficient transmission and reception of a signal. Details of the preamble will be described later.

A main purpose of the FSS is to carry PLS data. For fast synchronization and channel estimation, and hence fast decoding of PLS data, the FSS has a dense pilot pattern than a normal data symbol. The FES has exactly the same pilots as the FSS, which enables frequency-only interpolation within the FES and temporal interpolation, without extrapolation, for symbols immediately preceding the FES.

FIG. 23 illustrates a signaling hierarchy structure of a frame according to an embodiment of the present invention.

FIG. 23 illustrates the signaling hierarchy structure, which is split into three main parts corresponding to preamble signaling data 11000, PLS1 data 11010 and PLS2 data 11020. A purpose of a preamble, which is carried by a preamble symbol in every frame, is to indicate a transmission type and basic transmission parameters of the frame. PLS1 enables the receiver to access and decode the PLS2 data, which contains the parameters to access a DP of interest. PLS2 is carried in every frame and split into two main parts corresponding to PLS2-STAT data and PLS2-DYN data. Static and dynamic portions of PLS2 data are followed by padding, if necessary.

Preamble signaling data according to an embodiment of the present invention carries 21 bits of information that are needed to enable the receiver to access PLS data and trace DPs within the frame structure. Details of the preamble signaling data are as follows.

FFT_SIZE: This 2-bit field indicates an FFT size of a current frame within a frame group as described in the following Table 1.

TABLE 1

| Value | FFT size |
|---|---|
| 00 | 8K FFT |
| 01 | 16K FFT |

TABLE 1-continued

| Value | FFT size |
|---|---|
| 10 | 32K FFT |
| 11 | Reserved |

GI_FRACTION: This 3-bit field indicates a guard interval fraction value in a current superframe as described in the following Table 2.

TABLE 2

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110 to 111 | Reserved |

EAC_FLAG: This 1-bit field indicates whether the EAC is provided in a current frame. If this field is set to '1', an emergency alert service (EAS) is provided in the current frame. If this field set to '0', the EAS is not carried in the current frame. This field may be switched dynamically within a superframe.

PILOT_MODE: This 1-bit field indicates whether a pilot mode is a mobile mode or a fixed mode for a current frame in a current frame group. If this field is set to '0', the mobile pilot mode is used. If the field is set to '1', the fixed pilot mode is used.

PAPR_FLAG: This 1-bit field indicates whether PAPR reduction is used for a current frame in a current frame group. If this field is set to a value of '1', tone reservation is used for PAPR reduction. If this field is set to a value of '0', PAPR reduction is not used.

RESERVED: This 7-bit field is reserved for future use.

FIG. 24 illustrates PLS1 data according to an embodiment of the present invention.

PLS1 data provides basic transmission parameters including parameters required to enable reception and decoding of PLS2. As mentioned above, the PLS1 data remain unchanged for the entire duration of one frame group. A detailed definition of the signaling fields of the PLS1 data is as follows.

PREAMBLE_DATA: This 20-bit field is a copy of preamble signaling data excluding EAC_FLAG.

NUM_FRAME_FRU: This 2-bit field indicates the number of the frames per FRU.

PAYLOAD_TYPE: This 3-bit field indicates a format of payload data carried in a frame group. PAYLOAD_TYPE is signaled as shown in Table 3.

TABLE 3

| Value | Payload type |
|---|---|
| 1XX | TS is transmitted. |
| X1X | IP stream is transmitted. |
| XX1 | GS is transmitted. |

NUM_FSS: This 2-bit field indicates the number of FSSs in a current frame.

SYSTEM_VERSION: This 8-bit field indicates a version of a transmitted signal format. SYSTEM_VERSION is divided into two 4-bit fields: a major version and a minor version.

Major version: The MSB corresponding to four bits of the SYSTEM_VERSION field indicate major version information. A change in the major version field indicates a non-backward-compatible change. A default value is '0000'. For a version described in this standard, a value is set to '0000'.

Minor version: The LSB corresponding to four bits of SYSTEM_VERSION field indicate minor version information. A change in the minor version field is backwards compatible.

CELL_ID: This is a 16-bit field which uniquely identifies a geographic cell in an ATSC network. An ATSC cell coverage area may include one or more frequencies depending on the number of frequencies used per futurecast UTB system. If a value of CELL_ID is not known or unspecified, this field is set to '0'.

NETWORK_ID: This is a 16-bit field which uniquely identifies a current ATSC network.

SYSTEM_ID: This 16-bit field uniquely identifies the futurecast UTB system within the ATSC network. The futurecast UTB system is a terrestrial broadcast system whose input is one or more input streams (TS, IP, GS) and whose output is an RF signal. The futurecast UTB system carries one or more PHY profiles and FEF, if any. The same futurecast UTB system may carry different input streams and use different RFs in different geographical areas, allowing local service insertion. The frame structure and scheduling are controlled in one place and are identical for all transmissions within the futurecast UTB system. One or more futurecast UTB systems may have the same SYSTEM_ID meaning that they all have the same physical layer structure and configuration.

The following loop includes FRU_PHY_PROFILE, FRU_FRAME_LENGTH, FRU_GI_FRACTION, and RESERVED which are used to indicate an FRU configuration and a length of each frame type. A loop size is fixed so that four PHY profiles (including an FEF) are signaled within the FRU. If NUM_FRAME_FRU is less than 4, unused fields are filled with zeros.

FRU_PHY_PROFILE: This 3-bit field indicates a PHY profile type of an (i+1)th (i is a loop index) frame of an associated FRU. This field uses the same signaling format as shown in Table 8.

FRU_FRAME_LENGTH: This 2-bit field indicates a length of an (i+1)th frame of an associated FRU. Using FRU_FRAME_LENGTH together with FRU_GI_FRACTION, an exact value of a frame duration may be obtained.

FRU_GI_FRACTION: This 3-bit field indicates a guard interval fraction value of an (i+1)th frame of an associated FRU. FRU_GI_FRACTION is signaled according to Table 7.

RESERVED: This 4-bit field is reserved for future use.

The following fields provide parameters for decoding the PLS2 data.

PLS2_FEC_TYPE: This 2-bit field indicates an FEC type used by PLS2 protection. The FEC type is signaled according to Table 4. Details of LDPC codes will be described later.

TABLE 4

| Content | PLS2 FEC type |
| --- | --- |
| 00 | 4K-1/4 and 7K-3/10 LDPC codes |
| 01 to 11 | Reserved |

PLS2_MOD: This 3-bit field indicates a modulation type used by PLS2. The modulation type is signaled according to Table 5.

TABLE 5

| Value | PLS2_MODE |
| --- | --- |
| 000 | BPSK |
| 001 | QPSK |
| 010 | QAM-16 |
| 011 | NUQ-64 |
| 100 to 111 | Reserved |

PLS2_SIZE_CELL: This 15-bit field indicates Ctotal_partial_block, a size (specified as the number of QAM cells) of the collection of full coded blocks for PLS2 that is carried in a current frame group. This value is constant during the entire duration of the current frame group.

PLS2_STAT_SIZE_BIT: This 14-bit field indicates a size, in bits, of PLS2-STAT for a current frame group. This value is constant during the entire duration of the current frame group.

PLS2_DYN_SIZE_BIT: This 14-bit field indicates a size, in bits, of PLS2-DYN for a current frame group. This value is constant during the entire duration of the current frame group.

PLS2_REP_FLAG: This 1-bit flag indicates whether a PLS2 repetition mode is used in a current frame group. When this field is set to a value of '1', the PLS2 repetition mode is activated. When this field is set to a value of '0', the PLS2 repetition mode is deactivated.

PLS2_REP_SIZE_CELL: This 15-bit field indicates Ctotal_partial_block, a size (specified as the number of QAM cells) of the collection of partial coded blocks for PLS2 carried in every frame of a current frame group, when PLS2 repetition is used. If repetition is not used, a value of this field is equal to 0. This value is constant during the entire duration of the current frame group.

PLS2_NEXT_FEC_TYPE: This 2-bit field indicates an FEC type used for PLS2 that is carried in every frame of a next frame group. The FEC type is signaled according to Table 10.

PLS2_NEXT_MOD: This 3-bit field indicates a modulation type used for PLS2 that is carried in every frame of a next frame group. The modulation type is signaled according to Table 11.

PLS2_NEXT_REP_FLAG: This 1-bit flag indicates whether the PLS2 repetition mode is used in a next frame group. When this field is set to a value of '1', the PLS2 repetition mode is activated. When this field is set to a value of '0', the PLS2 repetition mode is deactivated.

PLS2_NEXT_REP_SIZE_CELL: This 15-bit field indicates Ctotal_full_block, a size (specified as the number of QAM cells) of the collection of full coded blocks for PLS2 that is carried in every frame of a next frame group, when PLS2 repetition is used. If repetition is not used in the next frame group, a value of this field is equal to 0. This value is constant during the entire duration of a current frame group.

PLS2_NEXT_REP_STAT_SIZE_BIT: This 14-bit field indicates a size, in bits, of PLS2-STAT for a next frame group. This value is constant in a current frame group.

PLS2_NEXT_REP_DYN_SIZE_BIT: This 14-bit field indicates the size, in bits, of the PLS2-DYN for a next frame group. This value is constant in a current frame group.

PLS2_AP_MODE: This 2-bit field indicates whether additional parity is provided for PLS2 in a current frame group. This value is constant during the entire duration of the current frame group. Table 6 below provides values of this field. When this field is set to a value of '00', additional parity is not used for the PLS2 in the current frame group.

TABLE 6

| Value | PLS2-AP mode |
| --- | --- |
| 00 | AP is not provided |
| 01 | AP1 mode |
| 10 to 11 | Reserved |

PLS2_AP_SIZE_CELL: This 15-bit field indicates a size (specified as the number of QAM cells) of additional parity bits of PLS2. This value is constant during the entire duration of a current frame group.

PLS2_NEXT_AP_MODE: This 2-bit field indicates whether additional parity is provided for PLS2 signaling in every frame of a next frame group. This value is constant during the entire duration of a current frame group. Table 12 defines values of this field.

PLS2_NEXT_AP_SIZE_CELL: This 15-bit field indicates a size (specified as the number of QAM cells) of additional parity bits of PLS2 in every frame of a next frame group. This value is constant during the entire duration of a current frame group.

RESERVED: This 32-bit field is reserved for future use.

CRC_32: A 32-bit error detection code, which is applied to all PLS1 signaling.

FIG. 25 illustrates PLS2 data according to an embodiment of the present invention.

FIG. 25 illustrates PLS2-STAT data of the PLS2 data. The PLS2-STAT data is the same within a frame group, while PLS2-DYN data provides information that is specific for a current frame.

Details of fields of the PLS2-STAT data are described below.

FIC_FLAG: This 1-bit field indicates whether the FIC is used in a current frame group. If this field is set to '1', the FIC is provided in the current frame. If this field set to '0', the FIC is not carried in the current frame. This value is constant during the entire duration of a current frame group.

AUX_FLAG: This 1-bit field indicates whether an auxiliary stream is used in a current frame group. If this field is set to '1', the auxiliary stream is provided in a current frame. If this field set to '0', the auxiliary stream is not carried in the current frame. This value is constant during the entire duration of current frame group.

NUM_DP: This 6-bit field indicates the number of DPs carried within a current frame. A value of this field ranges from 1 to 64, and the number of DPs is NUM_DP+1.

DP_ID: This 6-bit field identifies uniquely a DP within a PHY profile.

DP_TYPE: This 3-bit field indicates a type of a DP. This is signaled according to the following Table 7.

TABLE 7

| Value | DP Type |
| --- | --- |
| 000 | DP Type 1 |
| 001 | DP Type 2 |
| 010 to 111 | Reserved |

DP_GROUP_ID: This 8-bit field identifies a DP group with which a current DP is associated. This may be used by the receiver to access DPs of service components associated with a particular service having the same DP_GROUP_ID.

BASE_DP_ID: This 6-bit field indicates a DP carrying service signaling data (such as PSI/SI) used in a management layer. The DP indicated by BASE_DP_ID may be either a normal DP carrying the service signaling data along with service data or a dedicated DP carrying only the service signaling data.

DP_FEC_TYPE: This 2-bit field indicates an FEC type used by an associated DP. The FEC type is signaled according to the following Table 8.

TABLE 8

| Value | FEC_TYPE |
| --- | --- |
| 00 | 16K LDPC |
| 01 | 64K LDPC |
| 10 to 11 | Reserved |

DP_COD: This 4-bit field indicates a code rate used by an associated DP. The code rate is signaled according to the following Table 9.

TABLE 9

| Value | Code rate |
| --- | --- |
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001 to 1111 | Reserved |

DP_MOD: This 4-bit field indicates modulation used by an associated DP. The modulation is signaled according to the following Table 10.

TABLE 10

| Value | Modulation |
| --- | --- |
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001 to 1111 | Reserved |

DP_SSD_FLAG: This 1-bit field indicates whether an SSD mode is used in an associated DP. If this field is set to a value of '1', SSD is used. If this field is set to a value of '0', SSD is not used.

The following field appears only if PHY_PROFILE is equal to '010', which indicates the advanced profile:

DP_MIMO: This 3-bit field indicates which type of MIMO encoding process is applied to an associated DP. A type of MIMO encoding process is signaled according to the following Table 11.

TABLE 11

| Value | MIMO encoding |
| --- | --- |
| 000 | FR-SM |
| 001 | FRFD-SM |
| 010 to 111 | Reserved |

DP_TI_TYPE: This 1-bit field indicates a type of time interleaving. A value of '0' indicates that one TI group corresponds to one frame and contains one or more TI blocks. A value of '1' indicates that one TI group is carried in more than one frame and contains only one TI block.

DP_TI_LENGTH: The use of this 2-bit field (allowed values are only 1, 2, 4, and 8) is determined by values set within the DP_TI_TYPE field as follows.

If DP_TI_TYPE is set to a value of '1', this field indicates PI, the number of frames to which each TI group is mapped, and one TI block is present per TI group (NTI=1). Allowed values of PI with the 2-bit field are defined in Table 12 below.

If DP_TI_TYPE is set to a value of '0', this field indicates the number of TI blocks NTI per TI group, and one TI group is present per frame (PI=1). Allowed values of PI with the 2-bit field are defined in the following Table 12.

TABLE 12

| 2-bit field | PI | NTI |
|---|---|---|
| 00 | 1 | 1 |
| 01 | 2 | 2 |
| 10 | 4 | 3 |
| 11 | 8 | 4 |

DP_FRAME_INTERVAL: This 2-bit field indicates a frame interval (IJUMP) within a frame group for an associated DP and allowed values are 1, 2, 4, and 8 (the corresponding 2-bit field is '00', '01', '10', or '11', respectively). For DPs that do not appear every frame of the frame group, a value of this field is equal to an interval between successive frames. For example, if a DP appears on frames 1, 5, 9, 13, etc., this field is set to a value of '4'. For DPs that appear in every frame, this field is set to a value of '1'.

DP_TI_BYPASS: This 1-bit field determines availability of the time interleaver 5050. If time interleaving is not used for a DP, a value of this field is set to '1'. If time interleaving is used, the value is set to '0'.

DP_FIRST_FRAME_IDX: This 5-bit field indicates an index of a first frame of a superframe in which a current DP occurs. A value of DP_FIRST_FRAME_IDX ranges from 0 to 31.

DP_NUM_BLOCK_MAX: This 10-bit field indicates a maximum value of DP_NUM_BLOCKS for this DP. A value of this field has the same range as DP_NUM_BLOCKS.

DP_PAYLOAD_TYPE: This 2-bit field indicates a type of payload data carried by a given DP. DP_PAYLOAD_TYPE is signaled according to the following Table 13.

TABLE 13

| Value | Payload type |
|---|---|
| 00 | TS |
| 01 | IP |
| 10 | GS |
| 11 | Reserved |

DP_INBAND_MODE: This 2-bit field indicates whether a current DP carries in-band signaling information. An in-band signaling type is signaled according to the following Table 14.

TABLE 14

| Value | In-band mode |
|---|---|
| 00 | In-band signaling is not carried. |
| 01 | INBAND-PLS is carried |
| 10 | INBAND-ISSY is carried |
| 11 | INBAND-PLS and INBAND-ISSY are carried |

DP_PROTOCOL_TYPE: This 2-bit field indicates a protocol type of a payload carried by a given DP. The protocol type is signaled according to Table 15 below when input payload types are selected.

TABLE 15

| Value | If DP_PAY-LOAD_TYPE is TS | If DP_PAY-LOAD_TYPE is IP | If DP_PAY-LOAD_TYPE is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in an input formatting block. A CRC mode is signaled according to the following Table 16.

TABLE 16

| Value | CRC mode |
|---|---|
| 00 | Not used |
| 01 | CRC-8 |
| 10 | CRC-16 |
| 11 | CRC-32 |

DNP_MODE: This 2-bit field indicates a null-packet deletion mode used by an associated DP when DP_PAYLOAD_TYPE is set to TS ('00'). DNP_MODE is signaled according to Table 17 below. If DP_PAYLOAD_TYPE is not TS ('00'), DNP_MODE is set to a value of '00'.

TABLE 17

| Value | Null-packet deletion mode |
|---|---|
| 00 | Not used |
| 01 | DNP-NORMAL |
| 10 | DNP-OFFSET |
| 11 | Reserved |

ISSY_MODE: This 2-bit field indicates an ISSY mode used by an associated DP when DP_PAYLOAD_TYPE is set to TS ('00'). ISSY_MODE is signaled according to Table 18 below. If DP_PAYLOAD_TYPE is not TS ('00'), ISSY_MODE is set to the value of '00'.

TABLE 18

| Value | ISSY mode |
|---|---|
| 00 | Not used |
| 01 | ISSY-UP |
| 10 | ISSY-BBF |
| 11 | Reserved |

HC_MODE_TS: This 2-bit field indicates a TS header compression mode used by an associated DP when DP_PAYLOAD_TYPE is set to TS ('00'). HC_MODE_TS is signaled according to the following Table 19.

TABLE 19

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates an IP header compression mode when DP_PAYLOAD_TYPE is set to IP ('01'). HC_MODE_IP is signaled according to the following Table 20.

TABLE 20

| Value | Header compression mode |
|---|---|
| 00 | No compression |
| 01 | HC_MODE_IP 1 |
| 10 to 11 | Reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following fields appear only if FIC_FLAG is equal to '1'.

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following fields appear only if AUX_FLAG is equal to '1'.

NUM_AUX: This 4-bit field indicates the number of auxiliary streams. Zero means no auxiliary stream is used.

AUX_CONFIG_RFU: This 8-bit field is reserved for future use.

AUX_STREAM_TYPE: This 4-bit is reserved for future use for indicating a type of a current auxiliary stream.

AUX_PRIVATE_CONFIG: This 28-bit field is reserved for future use for signaling auxiliary streams.

FIG. 26 illustrates PLS2 data according to another embodiment of the present invention.

FIG. 26 illustrates PLS2-DYN data of the PLS2 data. Values of the PLS2-DYN data may change during the duration of one frame group while sizes of fields remain constant.

Details of fields of the PLS2-DYN data are as below.

FRAME_INDEX: This 5-bit field indicates a frame index of a current frame within a superframe. An index of a first frame of the superframe is set to '0'.

PLS_CHANGE_COUNTER: This 4-bit field indicates the number of superframes before a configuration changes. A next superframe with changes in the configuration is indicated by a value signaled within this field. If this field is set to a value of '0000', it means that no scheduled change is foreseen. For example, a value of '1' indicates that there is a change in the next superframe.

FIC_CHANGE_COUNTER: This 4-bit field indicates the number of superframes before a configuration (i.e., content of the FIC) changes. A next superframe with changes in the configuration is indicated by a value signaled within this field. If this field is set to a value of '0000', it means that no scheduled change is foreseen. For example, a value of '0001' indicates that there is a change in the next superframe.

RESERVED: This 16-bit field is reserved for future use.

The following fields appear in a loop over NUM_DP, which describe parameters associated with a DP carried in a current frame.

DP_ID: This 6-bit field uniquely indicates a DP within a PHY profile.

DP_START: This 15-bit (or 13-bit) field indicates a start position of the first of the DPs using a DPU addressing scheme. The DP_START field has differing length according to the PHY profile and FFT size as shown in the following Table 21.

TABLE 21

| | DP_START field size | |
|---|---|---|
| PHY profile | 64K | 16K |
| Base | 13 bits | 15 bits |
| Handheld | — | 13 bits |
| Advanced | 13 bits | its |

DP_NUM_BLOCK: This 10-bit field indicates the number of FEC blocks in a current TI group for a current DP. A value of DP_NUM_BLOCK ranges from 0 to 1023.

RESERVED: This 8-bit field is reserved for future use.

The following fields indicate FIC parameters associated with the EAC.

EAC_FLAG: This 1-bit field indicates the presence of the EAC in a current frame. This bit is the same value as EAC_FLAG in a preamble.

EAS_WAKE_UP_VERSION_NUM: This 8-bit field indicates a version number of a wake-up indication.

If the EAC_FLAG field is equal to '1', the following 12 bits are allocated to EAC_LENGTH_BYTE.

If the EAC_FLAG field is equal to '0', the following 12 bits are allocated to EAC_COUNTER.

EAC_LENGTH_BYTE: This 12-bit field indicates a length, in bytes, of the EAC.

EAC_COUNTER: This 12-bit field indicates the number of frames before a frame where the EAC arrives.

The following fields appear only if the AUX_FLAG field is equal to '1'.

AUX_PRIVATE_DYN: This 48-bit field is reserved for future use for signaling auxiliary streams. A meaning of this field depends on a value of AUX_STREAM_TYPE in a configurable PLS2-STAT.

CRC_32: A 32-bit error detection code, which is applied to the entire PLS2.

FIG. 27 illustrates a logical structure of a frame according to an embodiment of the present invention.

As above mentioned, the PLS, EAC, FIC, DPs, auxiliary streams and dummy cells are mapped to the active carriers of OFDM symbols in a frame. PLS1 and PLS2 are first mapped to one or more FSSs. Thereafter, EAC cells, if any, are mapped to an immediately following PLS field, followed next by FIC cells, if any. The DPs are mapped next after the PLS or after the EAC or the FIC, if any. Type 1 DPs are mapped first and Type 2 DPs are mapped next. Details of types of the DPs will be described later. In some cases, DPs may carry some special data for EAS or service signaling data. The auxiliary streams or streams, if any, follow the DPs, which in turn are followed by dummy cells. When the PLS, EAC, FIC, DPs, auxiliary streams and dummy data cells are mapped all together in the above mentioned order, i.e. the PLS, EAC, FIC, DPs, auxiliary streams and dummy data cells, cell capacity in the frame is exactly filled.

FIG. 28 illustrates PLS mapping according to an embodiment of the present invention.

PLS cells are mapped to active carriers of FSS(s). Depending on the number of cells occupied by PLS, one or more symbols are designated as FSS(s), and the number of FSS(s) NFSS is signaled by NUM_FSS in PLS1. The FSS is a special symbol for carrying PLS cells. Since robustness and latency are critical issues in the PLS, the FSS(s) have higher pilot density, allowing fast synchronization and frequency-only interpolation within the FSS.

PLS cells are mapped to active carriers of the FSS(s) in a top-down manner as shown in the figure. PLS1 cells are mapped first from a first cell of a first FSS in increasing order of cell index. PLS2 cells follow immediately after a last cell of PLS1 and mapping continues downward until a last cell index of the first FSS. If the total number of required PLS cells exceeds the number of active carriers of one FSS, mapping proceeds to a next FSS and continues in exactly the same manner as the first FSS.

After PLS mapping is completed, DPs are carried next. If an EAC, an FIC or both are present in a current frame, the EAC and the FIC are placed between the PLS and "normal" DPs.

Hereinafter, description will be given of encoding an FEC structure according to an embodiment of the present invention. As above mentioned, the data FEC encoder may perform FEC encoding on an input BBF to generate an FECBLOCK procedure using outer coding (BCH), and inner coding (LDPC). The illustrated FEC structure corresponds to the FECBLOCK. In addition, the FECBLOCK and the FEC structure have same value corresponding to a length of an LDPC codeword.

As described above, BCH encoding is applied to each BBF (Kbch bits), and then LDPC encoding is applied to BCH-encoded BBF (Kldpc bits=Nbch bits).

A value of Nldpc is either 64,800 bits (long FECBLOCK) or 16,200 bits (short FECBLOCK).

Table 22 and Table 23 below show FEC encoding parameters for the long FECBLOCK and the short FECBLOCK, respectively.

TABLE 22

| LDPC rate | Nldpc | Kldpc | Kbch | BCH error correction capability | Nbch − Kbch |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 23

| LDPC rate | Nldpc | Kldpc | Kbch | BCH error correction capability | Nbch − Kbch |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |
| 12/15 | | 12960 | 12792 | | |
| 13/15 | | 14040 | 13872 | | |

Detailed operations of BCH encoding and LDPC encoding are as below.

A 12-error correcting BCH code is used for outer encoding of the BBF. A BCH generator polynomial for the short FECBLOCK and the long FECBLOCK are obtained by multiplying all polynomials together.

LDPC code is used to encode an output of outer BCH encoding. To generate a completed Bldpc (FECBLOCK), Pldpc (parity bits) is encoded systematically from each Ildpc (BCH—encoded BBF), and appended to Ildpc. The completed Bldpc (FECBLOCK) is expressed by the following Equation.

$$B_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}] \quad \text{[Equation 2]}$$

Parameters for the long FECBLOCK and the short FECBLOCK are given in the above Tables 22 and 23, respectively.

A detailed procedure to calculate Nldpc−Kldpc parity bits for the long FECBLOCK, is as follows.

Initialize the parity bits $$p_0 = p_1 = p_2 = \ldots = p_{N_{ldpc}-K_{ldpc}-1} = 0 \quad \text{[Equation 3]}$$

2) Accumulate a first information bit—i0, at a parity bit address specified in a first row of addresses of a parity check matrix. Details of the addresses of the parity check matrix will be described later. For example, for the rate of 13/15, $$p_{983} = p_{983} \oplus i_0 \; p_{2815} = p_{2815} \oplus i_0$$

$$p_{4837} = p_{4837} \oplus i_0 \; p_{4989} = p_{4989} \oplus i_0$$

$$p_{6138} = p_{6138} \oplus i_0 \; p_{6458} = p_{6458} \oplus i_0$$

$$p_{6921} = p_{6921} \oplus i_0 \; p_{6974} = p_{6974} \oplus i_0$$

$$p_{7572} = p_{7572} \oplus i_0 \; p_{8260} = p_{8260} \oplus i_0$$

$$p_{8496} = p_{8496} \oplus i_0 \quad \text{[Equation 4]}$$

3) For the next 359 information bits, is, s=1, 2, ..., 359, accumulate is at parity bit addresses using following Equation.

$$\{x + (s \bmod 360) \times Q_{ldpc}\} \bmod(N_{ldpc} - K_{ldpc}) \quad \text{[Equation 5]}$$

Here, x denotes an address of a parity bit accumulator corresponding to a first bit i0, and Qldpc is a code rate dependent constant specified in the addresses of the parity check matrix. Continuing with the example, Qldpc=24 for the rate of 13/15, so for an information bit i1, the following operations are performed.

$$p_{1007} = p_{1007} \oplus i_1 \; p_{2839} = p_{2839} \oplus i_1$$

$$p_{4861} = p_{4861} \oplus i_1 \; p_{5013} = p_{5013} \oplus i_1$$

$$p_{6162} = p_{6162} \oplus i_1 \; p_{6482} = p_{6482} \oplus i_1$$

$p_{6945} = p_{6945} \oplus i_1 \ p_{6998} = p_{6998} \oplus i_1$ $p_{7596} = p_{7596} \oplus i_1 \ p_{8284} = p_{8284} \oplus i_1$ $p_{8520} = p_{8520} \oplus i_1$ [Equation 6]

4) For a 361th information bit i360, an address of the parity bit accumulator is given in a second row of the addresses of the parity check matrix. In a similar manner, addresses of the parity bit accumulator for the following 359 information bits is, s=361, 362, ... , 719 are obtained using Equation 6, where x denotes an address of the parity bit accumulator corresponding to the information bit i360, i.e., an entry in the second row of the addresses of the parity check matrix.

5) In a similar manner, for every group of 360 new information bits, a new row from the addresses of the parity check matrix is used to find the address of the parity bit accumulator.

After all of the information bits are exhausted, a final parity bit is obtained as below.

6) Sequentially perform the following operations starting with i=1.

$p_i = p_i \oplus p_{i-1}, \ i=1,2, \ldots, N_{ldpc} - K_{ldpc} - 1$ [Equation 7]

Here, final content of pi (i=0, 1, ... , Nldpc−Kldpc−1) is equal to a parity bit pi.

TABLE 24

| Code rate | Qldpc |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for the short FEC-BLOCK is in accordance with t LDPC encoding procedure for the long FECBLOCK, except that Table 24 is replaced with Table 25, and the addresses of the parity check matrix for the long FECBLOCK are replaced with the addresses of the parity check matrix for the short FECBLOCK.

TABLE 25

| Code rate | Qldpc |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

FIG. 29 illustrates time interleaving according to an embodiment of the present invention.

to (c) show examples of a TI mode.

A time interleaver operates at the DP level. Parameters of time interleaving (TI) may be set differently for each DP. The following parameters, which appear in part of the PLS2-STAT data, configure the TI.

DP_TI_TYPE (allowed values: 0 or 1): This parameter represents the TI mode. The value of '0' indicates a mode with multiple TI blocks (more than one TI block) per TI group. In this case, one TI group is directly mapped to one frame (no inter-frame interleaving). The value of '1' indicates a mode with only one TI block per TI group. In this case, the TI block may be spread over more than one frame (inter-frame interleaving).

DP_TI_LENGTH: If DP_TI_TYPE='0', this parameter is the number of TI blocks NTI per TI group. For DP_TI_TYPE='1', this parameter is the number of frames PI spread from one TI group.

DP_NUM_BLOCK_MAX (allowed values: 0 to 1023): This parameter represents the maximum number of XFEC-BLOCKs per TI group.

DP_FRAME_INTERVAL (allowed values: 1, 2, 4, and 8): This parameter represents the number of the frames IJUMP between two successive frames carrying the same DP of a given PHY profile.

DP_TI_BYPASS (allowed values: 0 or 1): If time interleaving is not used for a DP, this parameter is set to '1'. This parameter is set to '0' if time interleaving is used.

Additionally, the parameter DP_NUM_BLOCK from the PLS2-DYN data is used to represent the number of XFEC-BLOCKs carried by one TI group of the DP.

When time interleaving is not used for a DP, the following TI group, time interleaving operation, and TI mode are not considered. However, the delay compensation block for the dynamic configuration information from the scheduler may still be required. In each DP, the XFECBLOCKs received from SSD/MIMO encoding are grouped into TI groups. That is, each TI group is a set of an integer number of XFEC-BLOCKs and contains a dynamically variable number of XFECBLOCKs. The number of XFECBLOCKs in the TI group of index n is denoted by NxBLOCK_Group(n) and is signaled as DP_NUM_BLOCK in the PLS2-DYN data. Note that NxBLOCK_Group(n) may vary from a minimum value of 0 to a maximum value of NxBLOCK_Group_MAX (corresponding to DP_NUM_BLOCK_MAX), the largest value of which is 1023.

Each TI group is either mapped directly to one frame or spread over PI frames. Each TI group is also divided into more than one TI block (NTI), where each TI block corresponds to one usage of a time interleaver memory. The TI blocks within the TI group may contain slightly different numbers of XFECBLOCKs. If the TI group is divided into multiple TI blocks, the TI group is directly mapped to only one frame. There are three options for time interleaving (except an extra option of skipping time interleaving) as shown in the following Table 26.

TABLE 26

| Modes | Descriptions |
|---|---|
| Option 1 | Each TI group contains one TI block and is mapped directly to one frame as shown in (a). This option is signaled in PLS2-STAT by DP_TI_TYPE = '0' and DP_TI_LENGTH = '1' (NTI = 1). |
| Option 2 | Each TI group contains one TI block and is mapped to more than one frame. (b) shows an example, where one TI group is mapped to two frames, i.e., DP_TI_LENGTH = '2' (PI = 2) and DP_FRAME_INTERVAL (IJUMP = 2). This provides greater time diversity for low data-rate services. This option is signaled in PLS2-STAT by DP_TI_TYPE = '1'. |
| Option 3 | Each TI group is divided into multiple TI blocks and is mapped directly to one frame as shown in (c). Each TI block may use a full TI memory so as to provide a maximum bit-rate for a DP. This option is signaled in PLS2-STAT by DP_TI_TYPE = '0' and DP_TI_LENGTH = NTI, while PI = 1. |

Typically, the time interleaver may also function as a buffer for DP data prior to a process of frame building. This is achieved by means of two memory banks for each DP. A first TI block is written to a first bank. A second TI block is written to a second bank while the first bank is being read from and so on.

The TI is a twisted row-column block interleaver. For an sth TI block of an nth TI group, the number of rows Nr of a TI memory is equal to the number of cells Ncells, i.e., Nr=Ncells while the number of columns Nc is equal to the number NxBLOCK_TI(n,s).

FIG. 30 illustrates a basic operation of a twisted row-column block interleaver according to an embodiment of the present invention.

FIG. 30($a$) shows a write operation in the time interleaver and FIG. 30($b$) shows a read operation in the time interleaver. A first XFECBLOCK is written column-wise into a first column of a TI memory, and a second XFECBLOCK is written into a next column, and so on as shown in (a). Then, in an interleaving array, cells are read diagonal-wise. During diagonal-wise reading from a first row (rightwards along a row beginning with a left-most column) to a last row, Nr cells are read out as shown in (b). In detail, assuming $z_{n,s,i}(i=0, \ldots, N_rN_c)$ as a TI memory cell position to be read sequentially, a reading process in such an interleaving array is performed by calculating a row index $R_{n,s,i}$, a column index $C_{n,s,i}$, and an associated twisting parameter $T_{n,s,i}$ as in the following Equation.

$$\text{GENERATE}(R_{n,s,i}, C_{n,s,i}) = \quad \text{[Equation 8]}$$
$$\{$$
$$R_{n,s,i} = \mod(i, N_r),$$
$$T_{n,s,i} = \mod(S_{shift} \times R_{n,s,i}, N_c),$$
$$C_{n,s,i} = \mod\left(T_{n,s,i} + \left\lfloor \frac{i}{N_r} \right\rfloor, N_c\right)$$
$$\}$$

Here, $S_{shift}$ is a common shift value for a diagonal-wise reading process regardless of $N_{xBLOCK\_TI}(n,s)$, and the shift value is determined by $N_{xBLOCK\_TI\_MAX}$ given in PLS2-STAT as in the following Equation.

[Equation 9]

for
$$\begin{cases} N'_{xBLOCK\_TI\_MAX} = N_{xBLOCK\_TI\_MAX} + 1, & \text{if } N_{xBLOCK\_TI\_MAX} \mod 2 = 0 \\ N'_{xBLOCK\_TI\_MAX} = N_{xBLOCK\_TI\_MAX}, & \text{if } N_{xBLOCK\_TI\_MAX} \mod 2 = 1 \end{cases},$$

$$S_{shift} = \frac{N'_{xBLOCK\_TI\_MAX} - 1}{2}$$

As a result, cell positions to be read are calculated by coordinates $z_{n,s,i} = N_r C_{n,s,i} + R_{n,s,i}$.

FIG. 31 illustrates an operation of a twisted row-column block interleaver according to another embodiment of the present invention.

More specifically, FIG. 31 illustrates an interleaving array in a TI memory for each TI group, including virtual XFEC-BLOCKs when $N_{xBLOCK\_TI}(0,0)=3$, $N_{xBLOCK\_TI}(1,0)=6$ and $N_{xBLOCK\_TI}(2,0)=5$.

A variable number $N_{xBLOCK\_TI}(n,s)=N_r$ may be less than or equal to $N'_{xBLOCK\_TI\_MAX}$. Thus, in order to achieve single-memory deinterleaving at a receiver side regardless of $N_{xBLOCK\_TI}(n,s)$, the interleaving array for use in the twisted row-column block interleaver is set to a size of $N_r \times N_c = N_{cells} \times N'_{xBLOCK\_TI\_MAX}$ by inserting the virtual XFECBLOCKs into the TI memory and a reading process is accomplished as in the following Equation.

[Equation 10]

p = 0;
for i = 0; i < $N_{cells}N'_{xBLOCK\_TI\_MAX}$; i = i + 1
{GENERATE ($R_{n,s,i}$, $C_{n,s,i}$);
$V_i = N_r C_{n,s,j} + R_{n,s,j}$
  if $V_i < N_{cells}N_{xBLOCK\_TI}(n,s)$
  {
    $Z_{n,s,p} = V_i$; p = p + 1;
  }
}

The number of TI groups is set to 3. An option of the time interleaver is signaled in the PLS2-STAT data by DP_TI_TYPE='0', DP_FRAME_INTERVAL='1', and DP_TI_LENGTH='1', i.e., NTI=1, IJUMP=1, and PI=1. The number of XFECBLOCKs, each of which has Ncells=30 cells, per TI group is signaled in the PLS2-DYN data by NxBLOCK_TI(0,0)=3, NxBLOCK_TI(1,0)=6, and $N_{xBLOCK\_TI}(2,0)=5$, respectively. A maximum number of XFECBLOCKs is signaled in the PLS2-STAT data by NxBLOCK_Group_MAX, which leads to $\lfloor N_{xBLOCK\_Group\_MAX}/N_{TI}\rfloor N_{xBLOCK\_TI\_MAX}=6$.

The purpose of the Frequency Interleaver, which operates on data corresponding to a single OFDM symbol, is to provide frequency diversity by randomly interleaving data cells received from the frame builder. In order to get maximum interleaving gain in a single frame, a different interleaving-sequence is used for every OFDM symbol pair comprised of two sequential OFDM symbols.

Therefore, the frequency interleaver according to the present embodiment may include an interleaving address generator for generating an interleaving address for applying corresponding data to a symbol pair.

FIG. 32 illustrates an interleaving address generator including a main pseudo-random binary sequence (PRBS) generator and a sub-PRBS generator according to each FFT mode according to an embodiment of the present invention.

shows the block diagrams of the interleaving-address generator for 8K FFT mode, (b) shows the block diagrams of the interleaving-address generator for 16K FFT mode and (c) shows the block diagrams of the interleaving-address generator for 32K FFT mode.

The interleaving process for the OFDM symbol pair is described as follows, exploiting a single interleaving-sequence. First, available data cells (the output cells from the Cell Mapper) to be interleaved in one OFDM symbol Om,l is defined as $O_{m,l} = \lfloor x_{m,l,0}, \ldots, x_{m,l,p}, \ldots, x_{m,l,N_{data}-1} \rfloor$ for l=0, . . . , $N_{sym}$−1, where xm,l,p is the pth cell of the lth OFDM symbol in the mth frame and Ndata is the number of data cells: Ndata=CFSS for the frame signaling symbol(s), Ndata=Cdata for the normal data, and Ndata=CFES for the frame edge symbol. In addition, the interleaved data cells are defined as $P_{m,l} = \lfloor v_{m,l,0}, \ldots, v_{m,l,N_{data}-1} \rfloor$ for l=0, . . . , $N_{sym}$−1.

For the OFDM symbol pair, the interleaved OFDM symbol pair is given by $v_{m,l,H_i(p)} = x_{m,l,p}$, p=0, . . . , $N_{data}$−1, for the first OFDM symbol of each pair $v_{m,l,p} = x_{m,l,H_i(p)}$, p=0, . . . , $N_{data}$−1, for the second OFDM symbol of each pair, where $H_l(p)$ is the interleaving address generated by a PRBS generator.

FIG. 33 illustrates a main PRBS used for all FFT modes according to an embodiment of the present invention.

illustrates the main PRBS, and (b) illustrates a parameter Nmax for each FFT mode.

FIG. 34 illustrates a sub-PRBS used for FFT modes and an interleaving address for frequency interleaving according to an embodiment of the present invention.

illustrates a sub-PRBS generator, and (b) illustrates an interleaving address for frequency interleaving. A cyclic shift value according to an embodiment of the present invention may be referred to as a symbol offset.

Figure 35:
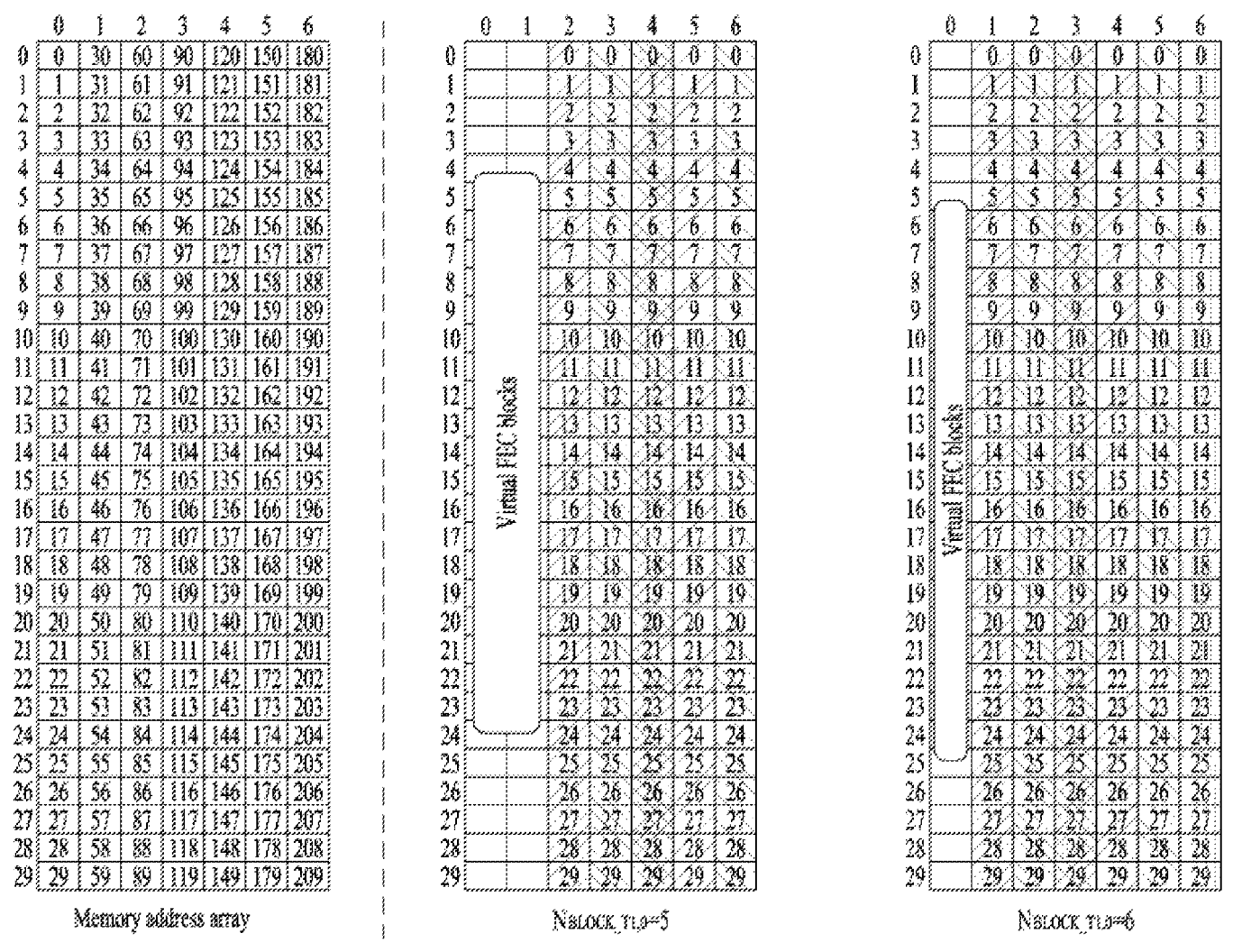

FIG. 35 illustrates a write operation of a time interleaver according to an embodiment of the present invention.

FIG. 35 illustrates a write operation for two TI groups.

A left block in the figure illustrates a TI memory address array, and right blocks in the figure illustrate a write operation when two virtual FEC blocks and one virtual FEC block are inserted into heads of two contiguous TI groups, respectively.

Hereinafter, description will be given of a configuration of a time interleaver and a time interleaving method using both a convolutional interleaver (CI) and a block interleaver (BI) or selectively using either the CI or the BI according to a physical layer pipe (PLP) mode. A PLP according to an embodiment of the present invention is a physical path corresponding to the same concept as that of the above-described DP, and a name of the PLP may be changed by a designer.

A PLP mode according to an embodiment of the present invention may include a single PLP mode or a multi-PLP mode according to the number of PLPs processed by a broadcast signal transmitter or a broadcast signal transmission apparatus. The single PLP mode corresponds to a case in which one PLP is processed by the broadcast signal transmission apparatus. The single PLP mode may be referred to as a single PLP.

The multi-PLP mode corresponds to a case in which one or more PLPs are processed by the broadcast signal transmission apparatus. The multi-PLP mode may be referred to as multiple PLPs.

In the present invention, time interleaving in which different time interleaving schemes are applied according to PLP modes may be referred to as hybrid time interleaving. Hybrid time interleaving according to an embodiment of the present invention is applied for each PLP (or at each PLP level) in the multi-PLP mode.

FIG. 36 illustrates an interleaving type applied according to the number of PLPs in a table.

In a time interleaving according to an embodiment of the present invention, an interleaving type may be determined based on a value of PLP_NUM. PLP_NUM is a signaling field indicating a PLP mode. When PLP_NUM has a value of 1, the PLP mode corresponds to a single PLP. The single PLP according to the present embodiment may be applied only to a CI.

When PLP_NUM has a value greater than 1, the PLP mode corresponds to multiple PLPs. The multiple PLPs according to the present embodiment may be applied to the CI and a BI. In this case, the CI may perform inter-frame interleaving, and the BI may perform intra-frame interleaving.

FIG. 37 is a block diagram including a first example of a structure of a hybrid time interleaver described above.

The hybrid time interleaver according to the first example may include a BI and a CI. The time interleaver of the present invention may be positioned between a BICM chain block and a frame builder.

The BICM chain block illustrated in FIGS. 37 and 38 may include the blocks in the processing block 5000 of the BICM block illustrated in FIG. 19 except for the time interleaver 5050. The frame builder illustrated in FIGS. 37 and 38 may perform the same function as that of the frame building block 1020 of FIG. 18.

As described in the foregoing, it is possible to determine whether to apply the BI according to the first example of the structure of the hybrid time interleaver depending on values of PLP_NUM. That is, when PLP_NUM=1, the BI is not applied (BI is turned OFF) and only the CI is applied. When PLP_NUM>1, both the BI and the CI may be applied (BI is turned ON). A structure and an operation of the CI applied when PLP_NUM>1 may be the same as or similar to a structure and an operation of the CI applied when PLP_NUM=1.

FIG. 38 is a block diagram including a second example of the structure of the hybrid time interleaver described above.

An operation of each block included in the second example of the structure of the hybrid time interleaver is the same as the above description in FIG. 20. It is possible to determine whether to apply a BI according to the second example of the structure of the hybrid time interleaver depending on values of PLP_NUM. Each block of the hybrid time interleaver according to the second example may perform operations according to embodiments of the present invention. In this instance, an applied structure and operation of a CI may be different between a case of PLP_NUM=1 and a case of PLP_NUM>1.

FIG. 39 is a block diagram including a first example of a structure of a hybrid time deinterleaver.

The hybrid time deinterleaver according to the first example may perform an operation corresponding to a reverse operation of the hybrid time interleaver according to the first example described above. Therefore, the hybrid time deinterleaver according to the first example of FIG. 39 may include a convolutional deinterleaver (CDI) and a block deinterleaver (BDI).

A structure and an operation of the CDI applied when PLP_NUM>1 may be the same as or similar to a structure and an operation of the CDI applied when PLP_NUM=1.

It is possible to determine whether to apply the BDI according to the first example of the structure of the hybrid time deinterleaver depending on values of PLP_NUM. That is, when PLP_NUM=1, the BDI is not applied (BDI is turned OFF) and only the CDI is applied.

The CDI of the hybrid time deinterleaver may perform inter-frame deinterleaving, and the BDEI may perform intra-frame deinterleaving. Details of inter-frame deinterleaving and intra-frame deinterleaving are the same as the above description.

A BICM decoding block illustrated in FIGS. 39 and 40 may perform a reverse operation of the BICM chain block of FIGS. 37 and 38.

FIG. 40 is a block diagram including a second example of the structure of the hybrid time deinterleaver.

The hybrid time deinterleaver according to the second example may perform an operation corresponding to a reverse operation of the hybrid time interleaver according to the second example described above. An operation of each block included in the second example of the structure of the hybrid time deinterleaver may be the same as the above description in FIG. 39.

It is possible to determine whether to apply a BDI according to the second example of the structure of the hybrid time deinterleaver depending on values of PLP_NUM. Each block of the hybrid time deinterleaver according to the second example may perform operations according to embodiments of the present invention. In this instance, an applied structure and operation of a CDI may be different between a case of PLP_NUM=1 and a case of PLP_NUM>1.

In what follows, a method for transmitting and receiving content data and a signaling method in a broadcast system are described. In particular, described in more detail will be a signal processing method applied before physical layer signal processing.

In the present invention, FIT (Fast Information Table) may be called LLS (Link Layer Signaling) or LLS (Low Level Signaling). In the present invention, all of the fields/elements of each table may not be included but included selectively depending on the needs.

FIG. 41 is a receiver protocol stack according to an embodiment of the present invention.

A broadcast service may be delivered by using three functional layers. The three functional layers comprise a physical layer, a delivery layer, and a service management layer. The physical layer may provide a mechanism by which signaling, service announcement, and IP streams are transported to the broadcast/broadband physical layer. The delivery layer may transport an object by using the ROUTE (Real-Time Object Delivery over Unidirectional Transport) protocol. The ROUTE protocol based on UDP/IP multicast operation over the broadcast physical layer and the HTTP protocol based on the TCP/IP unicast operation over the broadband physical layer may be used in the delivery layer. The service management layer supports a service of arbitrary type such as a linear TV or HTML4 application service to be delivered in the delivery layer and the physical layer.

Service signaling may provide service discovery and description information and include two functional components-bootstrap signaling (FIT, LLS, and so on) and service layer signaling (SLS). These are the information required to discover and acquire a user service. By using the FIT, a receiver builds a basic service list and provides bootstrapping and discovery of SLS with respect to each broadcast service. As an embodiment, an FIT may be delivered by using layer-2 packets as link layer signaling. The FIT may be delivered from each physical layer frame and acquired immediately. SLS may provide information used or required for a receiver to discover or access a broadcast service and a content component of the broadcast service. In an embodiment, if SLS is delivered over broadcast, it may be delivered by using ROUTE/UDP/IP protocol from one of an LCT transport session including the ROUTE session and may be delivered with an appropriate carousel rate supporting fast channel joining and switching. If SLS is delivered over broadband, it may be delivered by using HTTP/TCP/IP protocol.

FIG. 42 illustrates logical entities of service management, delivery, and physical layer and their relationship according to one embodiment of the present invention.

The ROUTE/LCT session and/or MMTP sessions delivering a content component of a broadcast service may be comprised as follows. A service content component may be delivered by at least one ROUTE/LCT session or at least one MMTP session with respect to a broadcast delivery of a linear service which does not exhibit app-based enhancement. For broadcast delivery of a linear service showing app-based enhancement, a service content component may be delivered by at least one ROUTE/LCT session or zero or more MMTP sessions. For streaming of media components in the same service, MMTP and ROUTE sessions may be prohibited from being used together. In the case of broadcast delivery of an app-based service, service content components may be delivered by at least one ROUTE/LCT session.

Each ROUTE session includes at least one LCT session delivering a content component which comprises a broadcast service. For delivery of a streaming service, an LCT session may deliver an individual component of a user service such as a video or caption stream. A streaming media may be formatted for each MPEG-DASH as DASG segments. Each MMTP session may include at least one MMTP packet flow delivering a content component or MMT signaling. An MMTP packet flow employs MPUs to deliver a component or MMT signaling message formatted per MMT. For delivery of an NRT user service or system metadata, an LCT session may deliver a file-based content item. A content file may include continuous (time-based) or discrete (non-time based) media component of an NRT service or include service signaling or metadata such as an ESG fragment.

A broadcast stream is extracted from an RF channel, which may be defined as a carrier frequency located in the center of specific bandwidth. PLP corresponds to a portion of an RF channel. Each PLP has a specific modulation and coding parameter. A PLP may be identified by a unique PLP identifier (PLPID) within a broadcast stream to which the PLP belongs.

Each service may be identified by two types of forms for a service identifier. One of them is a compact form used in an FIT, which is unique only within a broadcast area, and the other one is a globally unique form, used in the SLS and ESG. A ROUTE session may be identified by a source IP address, destination IP address, and destination port number. An LCT session may be identified by a TSI (Transport Session Identifier) unique within a ROUTE session. Those properties common to LCT sessions and specific properties unique for each LCT session may be provided by a ROUTE signaling structure which is called S-TSID (Service-based Transport Session Instance Description), and S-TSID forms part of service level signaling. Each LCT session may be delivered by one PLP. Different LCT sessions of a ROUTE session may be included in the respective PLPs. Properties described for S-TSID may include a TSI value and PLPID of each LCT session, a descriptor about a delivery object/files, and application layer FEC parameters.

FIG. 43 illustrates a method for using service signaling for bootstrapping and service discovery according to an embodiment of the present invention.

In an embodiment of the present invention, signaling information may be delivered directly in the form of a link layer packet or content of a dedicated channel instead of being processed by IP packet encapsulation, which may be called LLS (Link Layer Signaling) or FIT (Fast Information Table). The time a receiver starts operation upon receiving a broadcast signal may become the LLS. LLS may be used for a receiver to build a list of services received by the receiver, such as a channel name and a channel number. Also, LLS may provide bootstrap information with which a receiver discovers SLS for each service. The bootstrap information may include TSI of an LCT session, which delivers a destination IP address, destination port, and SLS.

SLS for each service may describe the properties of a service for making meaningful presentation of the service such as capability of a receiver required, location at which the service may be obtained, and a list of components. In the ROUTE/DASH system, SLS may include USBD (User Service Bundle Description), S-TSID, and DASH MPD (Media Presentation Description). A detailed description of the USBD will be given later.

Since separate service signaling is used for each service, a receiver is allowed to obtain only the SLS related to a desired service without parsing all of the SLS within a broadcast stream, thereby reducing an unnecessary processing load on the receiver. For optional broadband delivery of service signaling, an FIT may include an HTTP URL at which a service signaling file may be obtained. If SLS signaling is updated, that event may be detected from the version field of the FIT. And updated signaling may be obtained from a broadcast or broadband signal.

As shown in FIG. 43, LLS may be used to obtain SLS, and SLS may be used to obtain a service component delivered to a ROUTE/LCT transport session. A receiver may obtain an FIT delivered to a physical layer frame of a specific frequency identified by a BSID (Broadcast Stream ID). Each service identified by a service ID may provide SLS bootstrapping information. The SLS bootstrapping information may include PLPID, source IP address (sIP1), destination IP address (dIP1), destination port number (dPort1), and TSI (tsi-SLS). The receiver may obtain SLS fragments delivered through an IP/UDP/LCT session and PLP. These fragments may be associated with one service. A USBD/USD fragment may include an URI which describes a service level attribute and refers to an S-TSID fragment and an URI which refers to an MPD fragment. An S-TSID fragment may provide component acquisition information related to one service, DASH representation found in the MPD, and mapping to the TSI corresponding to a service component. The S-TSID may provide component acquisition information of a TSI form, DASH representation identifier, and ID of a PLP delivering a DASH segment related to the DASH representation. By using the PLPID and TSI value, the receiver may collect audio/video components and buffer DASH media segments by applying appropriate decoding processing. The hierarchical signaling architecture of a broadcast system will be described in more detail below.

Service signaling provide bootstrap and discovery information about a service which is currently "on the air". ESG (Electronic Service Guide) provides user service declaration which declares contents accompanied by detailed information including device capability, content rating, and presentation schedule; available broadcast service; and a list of contents. The ESG information may be provided so that a user may select a service or content by using the ESG information. The ESG information may be needed for a receiver to determine whether the user is allowed to watch content or use a service. Linkage between an ESG service and an SLS service may be described by a service identifier.

In general, link layer signaling may operate under the IP level. At the receiver-side, link layer signaling may be obtained faster than IP level signaling. The link layer signaling may be obtained before session establishment. Link layer signaling may be used for performing fast channel scan and fast service acquisition in an efficient manner. Link layer signaling may include binding information between service signaling and PLP.

SLS may include USBD and S-TSID metadata fragments. USBD may include service identification and device performance information. Also, USBD may include other SLS fragments needed to access a service and a media component; and metadata needed for a receiver to determine a transport mode (broadcast and/or broadband). An S-TSID fragment may provide a transport session description about an MMTP session or ROUTE/LCT session to which a media content component is delivered and provide a description about delivery objects delivered from the LCT session.

The streaming content signaling component of the SLS may correspond to MPD (Media Presentation Description). The MPD, a streaming content, may be associated with linear services for delivery of DASH segments. The MPD may be used for supporting app-based services and being associated with a DASH-formatted content component, may be used for controlling play-out of the content. The MPD may provide a resource identifier for an individual media component of a linear/streaming service in the form of a segment URL and provide context of identified resources within the media presentation. App-based enhancement signaling may be applied to delivery of an app-based enhancement component such as an application logical file, NRT media file, on-demand content component, or notification stream.

FIG. 44 illustrates an FIT according to an embodiment of the present invention

An FIT supports channel scan and service acquisition. An FIT enables presentation of a service list meaningful for the user and includes information supporting service selection through channel up/down zapping. Also, an FIT includes information for locating the location of broadcast/broadband-based service layer signaling depending on availability of signaling. The bitstream syntax of the FIT is shown in FIG. 44. In the following, description of each field is provided.

FIT_protocol_version: 8-bit unsigned integer indicating the version of the structure of FIT broadcast_stream_id: 16-bit unsigned integer for identifying the overall broadcast stream FIT_section_number: this 4-bit field indicates a section number. An FIT may include a plurality of FIT sections.

Total_FIT_section_number: this 4-bit field indicates a total number of FIT sections.

FIT_section_version: this 4-bit field indicates the version number of the FIT section and may be increased by one if information of the FIT section changes.

FIT_section_length: this 12-bit field may represent the number of bytes of the FIT section.

num_services: an 8-bit unsigned integer value, which may indicate the number of services described by an instance of the FIT. A service for at least one component within each broadcast stream may be included.

service_id: a 16-bit unsigned integer value, which identifies the corresponding service within the scope of the broadcast area.

SLS_data_version: an 8-bit unsigned integer number which is increased when a change occurs in a service entry within the FIT or in a signaling table for a service delivered through SLS. By monitoring the FIT only, a receiver may recognize the change of signaling with respect to a service.

service_category: this 5-bit field indicates the service category. Examples of the service category are as shown below.

0x00: service category not indicated by the service_category

0x01: A/V service

0x02: audio service

0x03: app-based service

0x04-0x07: reserved for future use

0x08: ESG (Electronic Service Guide)

0x09-0x1F: reserved for future use provider_id: an 8-bit field for identifying a provider which broadcasts a service short_service_name_length: a 3-bit field, which indicates the number of byte pairs of the short_service_name field. If no short name is given to a service, this field may be set to 0.

short_service_name: indicates a short name of a service service_status: indicates the status of a service (active/inactive, hidden/shown). The MSB may indicate the active/inactive status, and the LSB may indicate the hidden/shown status.

sp_indicator: needed for meaningful presentation, which indicates whether at least one component has been protected.

num_service_level_descriptors: indicates the number of service level descriptors for the corresponding service.

service_level_descriptor( ): may include zero or more descriptors which provide additional information of a service num_FIT_level_descriptors: indicates the number of FIT-level descriptors for the corresponding FIT.

FIT_level_descriptor( ): may include zero or more descriptors which provide additional information of the corresponding FIT.

FIG. 45 an FIT descriptor according to an embodiment of the present invention.

Zero or more descriptors providing additional information for a service or FIT may be included in the FIT. FIG. 45 shows locations of individual descriptors or descriptor tags for descriptors being referenced. Descriptors do not necessarily be included in the table but may be included optionally or selectively. If a descriptor is used, the descriptor may be located at a specified location (denoted by "M") or located at other location (denoted by "O"). FIGS. 46 to 48 illustrate embodiments of individual descriptors shown in FIG. 45.

FIG. 46 illustrates an embodiment of broadcast_signaling_location_descriptor( ).

descriptor_tag: identifies the corresponding descriptor.

descriptor_length: identifies the length of the corresponding descriptor.

IP_version_flag: 1-bit indicator which indicates whether SLS_source_IP_address and SLS_source_IP_address use IPv4 address or IPv6 address.

SLS_source_IP_address_flag: indicates whether a service signaling channel source IP address for the corresponding service exists.

SLS_source IP_address: includes a source IP address of a service layer signaling LCT channel of the corresponding service. It may use IPv4 or IPv6 address depending on the IP_version_flag field.

SLS_destination_IP_address: includes a destination IP address of the service layer signaling LCT channel of the corresponding service. It may use IPv4 or IPv6 address depending on the IP_version flag field.

SLS_destination_UDP_port: indicates a destination UDP port number of the service layer signaling LCT channel of the corresponding service.

SLS_TSI: indicates TSI of the service layer signaling LCT channel of the corresponding service.

SLS_PLP_ID: may indicate the identifier of PLP which includes the service layer signaling LCT channel of the corresponding service. This PLP may be more robust than the PLP of the service.

FIG. 47 illustrates an embodiment of inet_signaling_location_descriptor( ).

Inet_signaling_location_descriptor( ) include URL information with which a receiver may obtain arbitrary type of data requested by an external server(s) through broadband. FIG. 47 illustrates the structure of this descriptor. If a single URL is used together with a query term which obtains a signaling description via broadband, the descriptor may be included at the service level or FIT level.

descriptor_tag: a descriptor tag for identifying a descriptor descriptor_length: indicates the length of a descriptor provider_id: identifies a provider which broadcasts a service URL_type: indicates the type of URL the identification types of which according to the codes are given below.

URL_type—0x00: URL for a signaling server

URL_type—0x01: URL for an ESG server

URL_type—0x02-0xFF: reserved for future use

URL_bytes( ): represents a URL each character of which may be UTF-8 encoded and used by a query term.

If resources are available in a broadband network environment, inet_signaling_location_descriptor( ) may provide the URL of the resources.

Suppose the resource type is SLS. If inet_signaling_location_descriptor( ) information is located at the FIT level, a receiver may retrieve the SLS for all of the services described in the FIT by using the URL of the descriptor through broadband. If the resource is ESG, inet_signaling_location_descriptor( ) information may provide a single URL at which the receiver may retrieve the ESG for all of the providers described in the FIT through broadband.

If the resource type is SLS and inet_signaling_location_descriptor( ) information is located at the service level descriptor, the receiver may retrieve the SLS for the corresponding service by using the URL of the descriptor through broadband. If the resource is ESG, inet_signaling_location_descriptor( ) information may provide a single URL at which the receiver may retrieve the ESG for the corresponding service through broadband.

FIG. 48 illustrates an embodiment of a query term when inet_signaling_location_descriptor( ) is located at FIT level, and FIG. 49 illustrates an embodiment of a query term when inet_signaling_location_descriptor( ) is located at service level.

capabilities_descriptor( ) provides a list of capabilities required for processing of a service (for example, download protocol, FEC algorithm, wrapper/archive format, compression algorithm, and media type). A receiver may avoid proposing a service with an unsupported performance to the user by parsing and processing a performance descriptor.

FIG. 50 illustrates an XML format of the FIT shown and described in FIGS. 44 to 49. Descriptions about the elements given in the XML format do not overlap with the descriptions of the aforementioned fields. However, in the XML format, inclusion of the aforementioned descriptor may be indicated by the use field, and those elements specified as 0-n in the use field may not be included.

The embodiment of the structure of the field names and positional relationship thereof shown in FIG. 50 may be different from the embodiments of FIGS. 44 to 49, and the description of an actual field may be applied to the same field.

FIG. 51 illustrates a service layer signaling data model according to an embodiment of the present invention.

SLS may provide detailed technical information with which a broadcast receiver may discover and access a broadcast service and a content component of the broadcast service. SLS may include a set of XML-encoded metadata fragments delivered to a dedicated LCT session. The LCT session delivering SLS may be obtained from the bootstrap information included in the FIT. SLS is defined at the service level and describes service properties and access information. SLS may include a list of content components, information about how the list may be obtained, information about receiver performance required for generating meaningful presentation of a service, and so on. In the ROUTE/DASH system for linear service delivery, SLS may include USBD, S-TSID, and DASH MPD. SLS fragments may be delivered through an LCT transport session with a known TSI value.

FIG. 52 illustrates USBD according to one embodiment of the present invention.

USBD of FIG. 52 is another embodiment of the USBD of FIG. 5, and descriptions common to both of the embodiments will not be repeated. USBD is the top-level or entry-point SLS fragment.

Descriptions of elements (attributes) included in the USBD of FIG. 52 are as follows.

bundleDescription: root element of USBD userServiceDescription: single instance of ATSC 3.0 service @serviceId: globally unique identifier of ATSC 3.0 service @atsc:serviceId: reference for the corresponding service entry within LLT (FIT). The value of a service identifier assigned to the entry is the same as the value of this attribute.

@atsc:fullMPDUri: reference to an MPU fragment including description for a content component of the ATSC 3.0 service delivered over broadcast or optionally broadband.

@atsc:sTSIDUri: reference to an S-TSID fragment providing access to the parameters related to a transport session carrying the content of the ATSC 3.0 service.

name: name of the ATSC 3.0 service assigned by the lang attribute lang: language of the ATSC 3.0 service name. The language may be specified according to the XML datatype (XML Schema Part 2 [7]).

serviceLanguage: available language of the ATSC 3.0 service. The language may be specified according to the XML datatype (XML Schema Part 2 [7]).

atsc:capabilityCode: represents performance and a performance group defined in the ATSC 3.0 service announcement and personalization standard and represents performance of a receiver capable of generating meaningful expression of the corresponding ATSC service content. The format of this element may be the same as the atsc:capabilities element described based on the ATSC 3.0 service announcement and content fragmentation of a personalized document.

deliveryMethod: container of transport related information pertaining to the contents of the service over broadcast and (optionally) broadband modes of access atsc:broadcastAppService: DASH representation delivered over broadcast, in multiplexed or non-multiplexed form, containing the corresponding media component(s) belonging to the ATSC 3.0 Service, across all Periods of the affiliated Media Presentation.

basePattern: A character pattern for use by the ATSC receiver to match against any portion of the Segment URL used by the DASH client to request Media Segments of a parent Representation under its containing Period. A match implies that the corresponding requested Media Segment is carried over broadcast transport.

atsc:unicastAppService: DASH Representation delivered over broadband, in multiplexed or non-multiplexed form, containing the constituent media content component(s) belonging to the ATSC 3.0 Service, across all Periods of the affiliated Media Presentation.

basePattern: A character pattern for use by the ATSC receiver to match against any portion of the Segment URL used by the DASH client to request Media Segments of a parent Representation under its containing Period. A match implies that the corresponding requested Media Segment is carried over broadcast transport.

FIG. 53 illustrates S-TSID according to one embodiment of the present invention.

S-TSID of FIG. 53 is another embodiment of the S-TSID of FIG. 6, and descriptions common to both of the embodiments will not be repeated. The S-TSID includes the overall transport session description about the ROUTE session, LCT session, or MMTP session to which media content components delivering a service are delivered. The S-TSID may include a delivery object delivered in the LCT session or metadata about object flow. The S-TSID may include additional information about a content component and payload format delivered through the LCT session. The S-TSID is signaling data in service units.

Description of the element (attribute) included in the S-TSID of FIG. 53 is given below.

@serviceId: reference to the corresponding service element within the LLS (FIT). The value of this attribute refers to the service within the FIT like the corresponding value of the service ID. This attribute may be used when the ROUTE session and the MMTP session without the USD are used for broadcast delivery of the linear service.

RS: ROUTE session

@bsid: identifier of a broadcast stream within a content component delivering broadAppService. If this attribute is not used, the default broadcast stream includes PLP which carries an SLS fragment for the ATSC 3.0 service. The ID value may be the same as the value of the broadcast stream ID within the FIT.

@sIpAddr: source IP address (default: source address of a current ROUTE session; M for the non-primary session)

@dIpAddr: destination IP address (default: destination address of a current ROUTE session; it is M for the non-primary session)

@dport: destination port (default: destination port of a current ROUTE session; it is M for the non-primary session)

@PLPID: PIP ID for the ROUTE session (default: current PLP)

LS: LCT session

@tsi: TSI value

@PLPID: PLP ID (overrides default ROUTE session value)

@bw: maximum bandwidth

@startTime: start time

@endTime: end time

SrcFlow: source flow defined by the ATSC 3.0 delivery & synchronization spec [3]

RprFlow: repair flow defined by the ATSC 3.0 delivery & synchronization spec [3]

MS: MMTP session

@versionNumber: the version number of the MMTP protocol used in this MMTP session @bsid: identifier of a broadcast stream delivering a content component. If this attribute is not used, the default broadcast stream includes PLP which carries an SLS fragment for the ATSC 3.0 service. The ID value may be the same as the value of the broadcast stream ID within the FIT.

@sIpAddr: source IP address

@dIpAddr: destination IP address

@dport: destination port

@packetId: ID (default: 0x00) of the MMTP packet carrying an MMT signaling message of the MMTP session @PLPID: PLP ID for the MMTP session (default: current PLP)

@bw: Maximum bandwidth

@startTime: start time of the MMTP session

@endTime: end time of the MMTP session

Each instance of the S-TSID may be referred to by the USBD fragment.

MPD is an SLS metadata fragment which corresponds to a linear service of the duration defined by a broadcaster and which includes a formalized description of the DASH media presentation. Contents of the MPD provide context for identified resources within the media presentation and resource identifiers for the segments. In the context of a broadcast service, at least one representation conveyed by the MPD may be transmitted over broadcast.

If the MMTP session delivers a broadcast streaming service, the MMT signaling message may be delivered by the MMTP. Each MMTP session may include the MMT signaling message, its component, and a packet delivering the MMT signaling message.

In an embodiment, the service signaling fragment is encapsulated by the metadata envelop defined in the 3GPP MBMS, allowing identification, versioning, and update of included fragments.

In what follows, signaling embodiments of the present invention will be described.

FIG. 54 illustrates hierarchical signaling architecture according to an embodiment of the present invention.

In the embodiment of FIG. 54, two S-TSID instances may be delivered over the ROUTE. The first S-TSID may provide access information about the LCT sessions belonging to the ROUTE session #1DP delivering content components of the service X. The second S-TSID may provide access information about the LCT sessions belonging to the ROUTE session #N delivering content components of the service Y.

As shown in FIG. 54, the S-TSID includes signaling information about the LCT sessions in service units.

FIG. 55 illustrates a fast service scan signaling flow according to one embodiment of the present invention.

A receiver may comprise a tuner, baseband processor, and internal storage. The receiver may perform fast service scan by using the FIT.

The tuner of the receiver may tune to a specific frequency by using a predefined frequency list. And for each frequency, the tuner may wait for signal acquisition.

If a signal is detected from the frequency list, the baseband processor may extract the FIT and deliver the extracted FIT to the middleware module. The middleware module may deliver the FIT to the FIT parser.

The FIT parser may extract FIT information and parse data. Even if the FIG information is the same as the last scanned version number, it may be preferable to parse the FIT information. And the receiver may store the parsed information in the channel map.

FIG. 56 illustrates a full channel scan signaling flow according to an embodiment of the present invention.

If the receiver performs full-scan by using service signaling (USBD or USD) with respect to an individual service, the receiver may store more abundant information. For example, a longer service name may be obtained from the USD, and a channel map may be stored by matching service ID values of the USD and FIT. The singling flow is described below.

The receiver may be tuned to a frequency by using a predefined frequency list and wait for signal acquisition with respect to individual frequency. If a signal is detected from the frequency list, the baseband processor may extract the FIT and deliver the extracted FIT to the middleware module.

The receiver may check the FIT version information and parse the FIT information according to the checking result. In an embodiment, if the version is new, the middleware module may gather the FIT and deliver the gathered FIT to the FIT parser. The FIT parser may parse the data (FIT) and extract information. The extracted information may be stored in a channel map.

The receiver may obtain SLS boot strapping information from the FIT. The receiver may deliver the SLS bootstrapping information to the ROUTE client. The receiver may extract the USD from the SLS and store the extracted USD by using a signaling filtering scheme. The USD may be parsed by the signaling parser. And the receiver may update the channel map by mapping the service ID.

FIG. 57 illustrates a service acquisition method in the pure broadcast according to an embodiment of the present invention.

A video and audio segment may be delivered over pure broadcast by using one ROUTE session; in this case, the service signaling structure will be described below with reference to FIG. 57.

The USD, S-TSID, and MPD may be obtained and parsed. All of the tables are needed for service acquisition.

A representation to be provided may be selected. In this case, the S-TSID may be checked to determine which representation to deliver over broadcast.

The receiver may transmit the information obtained from signaling (UDS, S-TSID, and MPD) to the segment acquisition module. Therefore, the receiver may provide a user preference. For example, the user preference may indicate that the user prefers Spanish audio language to English audio language.

The segment acquisition module may determine by using the information described in the USD whether a component of a broadcast stream may be extracted. If the DASH client requests a segment from an internal proxy server, the internal proxy server has to know whether to request the segment from a remote broadband server or whether to wait to appear in the broadcast stream. The USD may describe the unicast "base pattern" and multicast "base pattern" in a deliveryMethod element. The proxy server may check whether the unicast base pattern or multicast base pattern is a sub-string of the URL presented by the DASH player and operate according to the checking result.

In the case of pure broadcast, the receiver may not know the location at which a component may be obtained if the deliveryMethod element of the USD is unavailable.

FIG. 58 illustrates a service acquisition method in the pure broadcast according to an embodiment of the present invention.

One service may be included in a plurality of ROUTE sessions. In this case, the S-TSID may allow access to all of the representations including additional ROUTE session information. However, the additional information may be optional for rendering a service.

FIG. 59 illustrates an ESG information acquisition method according to an embodiment of the present invention.

The ESG bootstrapping information via broadband may be signaled in the FIT. In an embodiment, all of ESG data may be delivered via broadband. Therefore, the ESG broadcast bootstrapping information may be replaced with the ESG bootstrapping information. The URL type field of the aforementioned inet_signaling_location_descriptor( ) may indicate the type of ESG or other information.

FIG. 60 illustrates a method for receiving a hybrid (multi-audio language) service according to an embodiment of the present invention.

Two or more audio components corresponding to different languages may be delivered via separate delivery paths (one is broadcast and the other is broadband). In this case, the S-TSID may describe all of the broadcast components so that the ROUTE client obtain a desired component. Also, the USD may include URL patterns for broadband and URL patterns for broadcast. Therefore, if the DASH client issues a request for a segment, the receiver middleware may describe which segment is delivered via which path. Therefore, the middleware may know which segment is to be requested from a remote broadband server and which segment is to be searched for from broadcast.

FIG. 61 illustrates a method for receiving a broadcast signal employing handoff according to an embodiment of the present invention.

The receiver may perform handoff reception from broadcast to broadband or from broadband to broadcast by using the signaling described in the USD. The USD describes which component is delivered via broadcast or broadband. The receiver middleware may receive a component via broadcast or broadband if broadcast reception fails.

FIG. 62 illustrates a method for receiving a broadcast signal employing scalable coding according to an embodiment of the present invention.

The USD include performance information essential for rendering a service. In an embodiment, as the performance information essential for decoding video, video resolution information may be included in the USD. And the USD may have a value such as the 'HD or UHD'. This indicates that the corresponding service may be provided as an HD or UHD service.

The receiver may identify the components required for rendering an UHD service or HD service by using the MPD.

**Method for Filtering Signaling Fragments

The LCT TOI (Transmission Object Identifier) field is split into three parts so that the receiver may quickly filter target signaling fragments.

The first part is a fragment type part allocated for identifying the type of a signaling fragment. The fragment type field may be allocated to identify an individual type of the SLS fragment carried by an object. The type value of each fragment may represent 'bundled' for 0x00, USBD/USD for 0x01, S-TSID for 0x02, MPD for 0x03 and 'reserved' for those value larger than 0x04, for example.

The second part is a fragment type extension part allocated for identifying the sub-type of a fragment. One embodiment of allocating a sub-type represents types of fragments included in an object in a bitmap format so that individual fragments may be filtered out when multiple fragments are carried. Another embodiment indicates an instance identifier when multiple instances of a signaling fragment of the same fragment type are delivered.

The fragment type extension field may be a bitmap indicating which fragments are included when an object includes multiple fragments. When an object includes one fragment, a value for identifying each sub-type of a service signaling fragment based on a filtering request may be allocated. Values of fragment type extension fields according to an embodiment are shown in Table 27.

TABLE 27

| Fragment Type Value | Fragment Type Extension Value | | Description |
|---|---|---|---|
| 0x00 | Value generated by OR operation applied on the following values | 0b0000000000000001 | USBD/USD is contained in this bundle |
| | | 0b0000000000000010 | S-TSID is contained in this bundle |
| | | 0b0000000000000100 | MPD is contained in this bundle |
| 0x01-0x03 | 16-bits hashed value derived from the url of Service Layer Signaling fragment | | To enable the client to filter the fragment that has instance url in question before assembling LCT packets |
| ≥0x04 . . . | | | Reserved |

The third part is a version part. The version part identifies the version of an object identified by the fragment type and fragment type extension part. When an object contains one fragment, the version field contains the version number of the fragment. When an object is a set of fragments, this field may contain the version number of the object and identify which fragment of the object has been changed.

**Template-Based Compression

The XML signaling fragment may be compressed by not only a compression tool such as Gzip but also an alternative means such as diff and patch tool. In the diff and patch process, the XML signaling template may be shared in advance between a transmitter and a receiver. A transmitter may compare two XML files—XML signaling template and XML signaling instance—and generate and output the differences as Diff Diff is a generic XML signaling instance and may be encapsulated by the element MetadataEnvelope. If Diff is generated at the transmitter-side, Diff may be encapsulated by the MetadataEnvelope element after being encapsulated by the content of the update element. And the MetadataEnvelope may be transmitted to multiple receivers through a signaling channel. If a received metadatafragment element contains a diffupdate element, the receiver may recognize that the information has been processed through the corresponding compression mode.

The receiver searches the cache which stores pre-shared signaling templates for the signaling template with the metadata URI attribute; if the signaling template is not found, the receiver may attempt to obtain the signaling template by using the URL of the SignalingTemplateID.

The receiver may recover the signaling instance by applying the delivered Diff to a retrieved signaling template. The instance of the signaling fragment may have the pair of attribute metadataURI (SignalingInstanceID) and attribute version (SignalingInstanceVersion). Then only the difference from the part updated with respect to the template has to be transmitted, and the complete file doesn't have to be transmitted. Therefore, in particular, if the difference from the original complete fragment is small, the diff and patch operation may be operated very efficiently compared with the conventional compression scheme. In an embodiment, even when there is no update in the server-side, a Diff message of "no Diff" may be delivered.

FIG. 63 is an XML instance notation illustrating a method for encapsulating Diff in a metadataEnvelope element.

FIG. 64 illustrates a method for template pre-sharing and diff-patching according to an embodiment of the present invention.

Signaling of a template fragment may be identified by the URL included in the content of the templateID element. The template itself may be pre-shared as it is patched through HTTP over broadband. When a receiver obtains a Diff message for the first time, the template may be cached for the use in a future. In an embodiment, the template may be received at particular time as a fragment instance, and a subsequent Diff message may be applied to instance generation.

As shown in FIG. 64, a signaling template may be pre-shared and identified by signaling template ID information and/or signaling template version information. A transmitter includes a Diff generator which compares the template with a signaling instance and generates the difference between them as Diff. A receiver includes a Diff applier which may apply the received Diff to the template and recover the signaling instance. The transmitter-side may correspond to the consumer while the receiver-side may correspond to the signaling producer. The signaling instance may be identified by the signaling instance ID information and/or signaling instance version information.

FIG. 65 illustrates an FIT delivery method according to an embodiment of the present invention.

In the description above, described was an embodiment in which the FIT is signaled in the link layer. However, as shown in FIG. 68, the FIT may be delivered in a different method.

In the example of (1), the FIT may be delivered by being included in the PLP such as a service component. Alternatively, as shown in the example of (2), the FIT may be delivered through a dedicated logical channel of the physical layer. Or as shown in the example of (3), the FIT may be delivered through a specific PLP, called a basic PLP, which delivers signaling information.

SLS may be transmitted in the IP/UDP layer according to the MMTP or ROUTE protocol.

In an embodiment, the FIT of FIG. 44 may further comprise the SLS_simpleservice field. The SLS_simpleservice flag indicates that service layer signaling is simple for the corresponding service when the flag is set to 1, while it indicates that the signaling is complex when the flag is set to 0. The flag value may be set differently from the above.

In the embodiment of FIG. 47, the value of 0x02 may indicate the URL for the signaling template server.

In an embodiment, URL_type_mask field may be included instead of URL_type field. URL_type_mask field may indicate the type of URL as a coded bit mask. Such a descriptor may be useful when it is used at the FIT level or the same URL is used for a different type of server. The coded mask bits have the following meaning. The URL_type_mask field may be expressed by 8 bits (b7, b6, b5, b4, b3, b2, b1, b0).

b7: URL for a signaling server
b6: URL for an ESG server
b0-b5: reserved for future use In what follows, another embodiment of the signaling structure including the aforementioned FIT, namely SLT (Service List Table) will be described.

LLS (Low Level Signaling) may provide information common to all of the services and information pointing to the information defining the services. SLS (Service Layer Signaling) may provide information required for discovering and obtaining a broadcast service and a content component of the broadcast service. SLS may be carried on the IP. SLT provides signaling information for building a basic service list and bootstrapping discovery of SLS.

SLT may support fast channel scan and fast service acquisition by including information about individual services included in a broadcast stream. SLT may support initial service selection through channel number up/down selection by including information required to provide presentation of a meaningful service list to the user. SLT may include information required for locating the service layer signaling information about each listed service.

FIG. 66 illustrates SLT according to an embodiment of the present invention.

In what follows, descriptions about the fields/information included in the SLT are provided.

table_id: may be set to 8-bit unsigned integer indicating that the table is service_list_table_section( ).

SLT_section_version: a 4-bit field which may indicate the version number of an SLT section. SLT_section_version may be increased by one if a change occurs in the information carried by service_list_table_section( ); if this field reaches the maximum value of 1111b, the next increased value may return to 0.

SLT_section_length: a 12-bit field which indicates the length (the number of bytes) of the SLT section starting right after the SLT_section_length field SLT_protocol_version: an 8-bit unsigned integer which indicates the version of the SLT structure. The upper 4 bits may indicate the major version while the lower 4 bits may indicate the minor version. At the initial release, the value of SLT_protocol_version field may be set to 0x10 (or 00010000b) to indicate the version 1.0.

broadcast_stream_id: a 16-bit unsigned integer which is used for identifying the overall broadcast stream. The uniqueness of the value shall be scoped to a geographic region (e.g. North America).

SLT_section_number: a four-bit unsigned integer which indicates the number of SLT sections starting from 0. The SLT may include a plurality of SLT sections.

last_SLT_section_number: a 4-bit unsigned integer which indicates the value of the highest SLT section number included in the SLT to which the corresponding section belongs. For example, if the value of the last_SLT_section_number field is '0010b', three SLT sections the values of SLT_section_number of which are labeled with '0000b', '0001b', and '0010b' may be included in the SLT.

num_services: an 8-bit unsigned integer which indicates the number of services described in the corresponding SLT section service_id: a 16-bit unsigned integer which identifies the corresponding service uniquely within the broadcast area.

protected: a 1-bit flag which indicates that at least one component required for content presentation is protected. In an embodiment, if this field is set to 0, it indicates that a component required for service presentation is not protected.

rep_service_flag: a 1-bit flag. If this flag is set to 1, it indicates that the corresponding service is a representative service of one broadcaster which consumes RF frequencies for service delivery.

major_channel_number: a 10-bit unsigned integer which may have a vale ranging from 1 to 999 and represent a "major" channel number associated with the service defined within the iteration of the "for" loop. Each service may be associated with a major channel number and minor channel number. Together with the minor channel number, the major channel number may be a reference number for a virtual channel of the user. The major channel number may have a value ranging from 1 to 999. The value of the major channel number has to be set so that a pair of a major channel number and a minor channel number does not overlap with other pairs within the SLT.

minor_channel_number: a 10-bit unsigned integer ranging from 1 to 999 and represents a "minor" or "sub" channel number. Together with a major channel number, this field forms a channel number of two parts, where the minor channel number represents a second number or a number of the right-handed part.

service_category: a 3-bit unsigned integer which may indicate the category of the corresponding service. The category type may be coded as shown in Table 28 below.

TABLE 28

| Service category | Meaning |
| --- | --- |
| 0x00 | Not specified |
| 0x01 | A/V service |
| 0x02 | Audio service |
| 0x03 | App-based service |
| 0x04~0x0F | Reserved for future use | short_service_name_length: a 4-bit unsigned integer which may indicate the length of the short_service_name( ) field in bytes. If no short name is provided to the corresponding service, this field may be set to 0.

short_service_name( ): if exists, this field may represent the short name of the corresponding service. Each character of the name may be encoded per UTF-8.

broadcast_components_present: a 1-bit flag which indicates presence of individual fields starting from SLS_PLP_ID field up to SLS_protocol_type field.

SLS_source_IP_address_present: a 1-bit flag which represents presence of SLS source IP information.

SLS_protocol_type: a 4-bit unsigned integer which indicates the protocol type of a service layer signaling channel. The SLS protocol type information may be coded as shown in Table 29 below. A receiver may refer to this information and discard received service list table section information the SLS_protocol_type information of which is unknown or unsupported.

TABLE 29

| SLS_protocol_type | Meaning |
| --- | --- |
| 0x00 | Reserved for future use |
| 0x01 | ATSC1.0 MPEG2TS |
| 0x02 | ATSC3.0 ROUTE |
| 0x03 | ATSC3.0 MMTP |
| 0x04~0x0F | Reserved for future use |

SLS_PLP_ID: an 8-bit unsigned integer which indicates the identifier of the PLP including SLS data of the corresponding service. The corresponding PLP may be more robust than other PLPs carrying service data.

SLS_destination_IP_address: a 32-bit address which may indicate the IPv4 destination IP address of the SLS channel for the corresponding service.

SLS_destination_UDP_port: a 16-bit unsigned integer which may indicate the destination UDP port number of the SLS channel for the corresponding service.

SLS_source_IP_address: if this field exists, it may indicate the source IPv4 address associated with the SLS for the corresponding service.

SLS_TSI: a 16-bit unsigned integer which may indicate TSI (Transport Session Identifier) of the LCS channel for a ROUTE-delivery service.

ROUTE_version: indicates the version of the ROUTE protocol which provides the SLS for the corresponding service. The MSB 4-bits indicate the major version number of the ROUTE protocol, and the LSB 4-bits indicate the minor version number of the ROUTE protocol. In an embodiment, the major version number of the ROUTE protocol may be 0x1, and the minor version number may be 0x0. A receiver may not provide a ROUTE service having a major protocol version higher than that supported by the receiver to the user. And the receiver does not use the minor protocol version as base information for determining whether to provide the corresponding service to the user. By using the minor protocol version, the receiver may determine whether a data element defined in the previous version is included in transmission.

MMTP_version: a 2-bit unsigned integer field which indicates the version of the MMTP protocol used for providing the SLS for the corresponding service. In an embodiment according to the present invention, a value of '00b' may be defined.

num_service_level_descriptors: represents that zero or more descriptors providing additional information for the corresponding service may be included. A 4-bit unsigned integer may present the number of service level information for the corresponding service. 0 indicates that the descriptor is not included.

service_level_descriptor( ): The format of each descriptor shall be an 8-bit type field, followed by an 8-bit length field, followed by a number of bytes indicated in the length field.

num_SLT_level_descriptors: indicates that zero or more descriptors providing additional information about the SLT may be included. It is a 4-bit field representing the number of SLT level descriptors included in the corresponding SLT section, and if it is set to 0, it indicates that the SLT level descriptor is not included.

SLT_level_descriptor( ): The format of each descriptor shall be an 8-bit type field, followed by an 8-bit length field, followed by a number of bytes indicated in the length field.

In what follows, descriptors included in the SLT information will be described.

Zero or at least one descriptor providing additional information about a service or a set of services delivered within an instance of the SLT section may be included in the SLT. Table 30 is one embodiment showing defined descriptors, descriptor tags, and descriptor locations. Table 30 does not describe whether a specific descriptor is included in a specific situation. The notation of "o" shown in Table 30 implies that a descriptor may be included optionally at the corresponding level. Table 30 shows, for the ATSC 3.0 broadcast service, whether the corresponding descriptor may be included at the SLT level, may be included at the level (loop) about a specific service included in the SLT, or may be included at both of the SLT level and service level.

TABLE 30

| Descriptor name | Descriptor tag | Service level | SLT level |
| --- | --- | --- | --- |
| inet_signaling_location_descriptor( ) | (to be defined) | o | o |
| service_language_descriptor( ) | (to be defined) | o | o |

TABLE 30-continued

| Descriptor name | Descriptor tag | Service level | SLT level |
|---|---|---|---|
| representative_service_descriptor( ) | (to be defined) | | ○ |
| service_group_descriptor( ) | (to be defined) | | ○ |
| service_provider_descriptor( ) | (to be defined) | ○ | |

FIG. 67 illustrates an inet signaling location descriptor according to an embodiment of the present invention.

The inet signaling location descriptor includes an URL at which a receiver may obtain the data of requested type from an external server via broadband. FIG. 67 shows the structure of the inet signaling location descriptor. Descriptions of the fields/information included in the descriptors are as follows.

descriptor_tag: an 8-bit unsigned integer by which the corresponding descriptor may be identified as inet_signaling_location_descriptor( ). The value of the field may be defined later (TBD).

descriptor_length: an 8-bit unsigned integer which may represent the length extending from the location right after this field up to the end of this descriptor in units of bytes.

URL_type: an 8-bit unsigned integer which may indicate a type of URL. the URL types indicated by the URL type information are shown in Table 31. The URL type may indicate whether the corresponding URL is the URL of an ESG server capable of retrieving ESG or whether the corresponding URL is the URL of a signaling server capable of retrieving a signaling file.

TABLE 31

| URL Type | Meaning |
|---|---|
| 0x00 | URL to Signaling Server |
| 0x01 | URL to ESG server |
| 0x02~0xFF | Reserved for future use |

URL_bytes( ): each character of URL may be encoded per UTF-8. For the URL of a signaling server, a base URL may be extended by a query term to indicate a required resource. For the URL of an ESG server, the URL may be specified in the ESG broadband delivery specification. When resources are available in a broadband network environment, the inet signaling location information may provide the URL of the resources. Since the inet signaling location information mostly indicates the URL, the inet signaling location descriptor may be called URL signaling information or inet URL information in this document.

When URL signaling information is located at the SLT level, URL may be used in a query term by which a resource may be requested according to the corresponding resource type. In an embodiment, when the resource is SLS, the URL signaling information may provide a single URL at which the SLS for all of the services described in the SLT may be retrieved over broadband. In this case, an optional parameter ("[&svc=<service_id>") for identifying the service of interest may be very useful, and the receiver may request SLS for a specific service when an SVC query string is attached to the last of query terms. A response body for these query terms may have multi-part encapsulating retrieved SLS fragments. When the resource type is ESG, the receiver may retrieve the ESG of all of the providers described in the corresponding SLT over broadband. In this case, an optional string (pry) is useful, and the receiver may request the ESG for a specific provider when the pry string is attached to the last of the query terms. An embodiment of a query term using the URL byte information of the inet_signaling_location descriptor located at the SLT level is shown in FIG. 48.

When the URL signaling information is present within the service level descriptor loop, the information may represent the URL at which the SLS belonging to the corresponding service may be retrieved over broadband. When the service category information indicates an A/V service, the URL may be transmitted together with a query term for indicating a desired signaling description. Different SLS URLs may be provided for each service. In this case, an optional string (svc) may not be used at the last of the query string. The response body for these query terms may has multi-part encapsulating retrieved SLS fragments. An embodiment of a query term using the URL byte information of the inet_signaling_location descriptor located at the service level is shown in FIG. 49.

FIG. 68 illustrates a service language descriptor according to an embodiment of the present invention.

The service_language_descriptor( ) may include 3 bytes of ISO-639/B language code which associates a service or a group of services with a primary language. Individual fields included in the descriptor of FIG. 68 are described as follows.

descriptor_tag: an 8-bit unsigned integer which is used for identifying that the corresponding descriptor is a service language descriptor. The value of the field may be defined later (TBD).

descriptor_length: an 8-bit unsigned integer which may represent the length extending from the location right after this field up to the end of this descriptor in units of bytes.

language: the service language, per ISO 639.2/B, may be encoded by 3-character language code. Each character is coded by 8-bits per ISO-8859-1 and may be inserted into the 24-bit field in order.

FIG. 69 illustrates a representative service descriptor according to an embodiment of the present invention.

The representative service descriptor includes a representative service identifier of each broadcaster sharing one RF frequency. The fields included in the representative service descriptor are described below.

descriptor_tag: an 8-bit unsigned integer which is used for identifying that the corresponding descriptor is a representative service descriptor. The value of the field may be defined later (TBD).

descriptor_length: an 8-bit unsigned integer which may represent the length extending from the location right after this field up to the end of this descriptor in units of bytes.

rep_service_id: a 16-bit unsigned integer which may have the same value as the service ID within a service loop which is a representative service in the SLT. This service may become an ESG service, only one of which may be included for each broadcaster.

FIG. 70 illustrates a service group descriptor according to a first embodiment of the present invention.

The service group descriptor includes a list of services belonging to a specific broadcaster. This descriptor includes only one instance per broadcaster. This descriptor may be included in the SLT when a plurality of broadcasters share one RF frequency (bandwidth). The fields included in the descriptor are described below.

descriptor_tag: an 8-bit unsigned integer which is used for identifying that the corresponding descriptor is a service group descriptor. The value of the field may be defined later (TBD).

descriptor_length: an 8-bit unsigned integer which may represent the length extending from the location right after this field up to the end of this descriptor in units of bytes.

num_service: an 8-bit unsigned integer which may indicate the number of services described in the corresponding service group descriptor.

service_id: a 16-bit unsigned integer which has the same value as the service ID within the service loop of the SLT.

FIG. 71 illustrates a service group descriptor according to a second embodiment of the present invention.

The service group descriptor may include a service group list containing the number of a plurality of broadcasters sharing one RF frequency. The fields include in the descriptor are described below.

descriptor_tag: an 8-bit unsigned integer which is used for identifying that the corresponding descriptor is a service group descriptor. The value of the field may be defined later (TBD).

descriptor_length: an 8-bit unsigned integer which may represent the length extending from the location right after this field up to the end of this descriptor in units of bytes.

num_broadcaster: an 8-bit unsigned integer which may indicates the number of broadcasters described in the service group descriptor.

num_service: an 8-bit unsigned integer which may indicate the number of services belonging to the broadcaster described in the broadcaster loop.

service_id: a 16-bit unsigned integer which may have the same value as the service ID within the service loop of the SLT.

FIG. 72 illustrates a service group descriptor according to a third embodiment of the present invention.

The fields include in the descriptor are described below.

descriptor_tag: an 8-bit unsigned integer which is used for identifying that the corresponding descriptor is a service group descriptor. The value of the field may be defined later (TBD).

descriptor_length: an 8-bit unsigned integer which may represent the length extending from the location right after this field up to the end of this descriptor in units of bytes.

num_service: an 8-bit unsigned integer which may indicate the number of services described in the corresponding service group descriptor.

provider_id: an 8-bit unsigned integer which may indicate the identifier of an individual broadcaster.

service_id: a 16-bit unsigned integer which may have the same value as the service ID within the service loop of the SLT.

FIG. 73 illustrates a service provider descriptor according to an embodiment of the present invention.

The fields included in the service provider descriptor are described below.

descriptor_tag: an 8-bit unsigned integer which is used for identifying that the corresponding descriptor is a service group descriptor. The value of the field may be defined later (TBD).

descriptor_length: an 8-bit unsigned integer which may represent the length extending from the location right after this field up to the end of this descriptor in units of bytes.

provider_id: an 8-bit unsigned integer which may indicate the identifier of an individual broadcaster.

In the present document, a broadcaster and a provider may represent a broadcast service provider which provides a broadcast service.

FIG. 74 illustrates SLT by using the XML format according to an embodiment of the present invention. The same descriptions related to the SLT of FIG. 74 will be substituted for by the descriptions given with reference to FIG. 66. The fields shown in FIG. 74 are described below.

slt: root element of SLT

@bsid: identifier of the overall broadcast stream

@sltSectionVersion: version number of the SLT section. sltSectionVersion may be increased by one if a change occurs in the information carried within the SL; if this field reaches the maximum value, its value may return to 0.

@sltSectionNumber: the section number of the SLT, which may be counted from 1. If this field does not exist, a default value of 1 may be assigned.

@totalSltSectionNumbers: The total number of sections (that is, the section with the highest sltSectionNumber) of the SLT of which this section is part. sltSectionNumber and totalSltSectionNumbers together can be considered to indicate "Part M of N" of one portion of the SLT when it is sent in fragments.

@language: three-character language code (3-byte) per ISO-639/B indicating the primary language of a service included in this SLT instance @providerId: when the SLT is shared by one provider, the provider ID indicates which provider (broadcaster) describes a listed service within the corresponding SLT. This value is optional.

InetSigLocation: provides the URL at which a receiver may obtain data of requested type from an external server via broadband. The format of InetSigLocation is shown in FIG. 75.

RepresentativeService: this field may have the same value as the service ID within a service loop which is a representative service in the SLT. This service may become an ESG service, only one of which may be included for each broadcaster. The format of RepresentativeService is shown in FIG. 76.

ServiceGroup: provides a list of services provided by one broadcaster. The format of ServiceGroupu is shown in FIG. 76.

Service: ATSC3.0 service entry

@serviceId: an integer used for identifying the corresponding service uniquely within the broadcast area.

@protected: if this field is set to true, it indicates that at least one component required for content presentation is protected. In an embodiment, if this field is set to false, it indicates that a component required for service presentation is not protected. The default value is false.

@representative: the default value is false; if this field is set to true, it indicates that the corresponding service is the representative service of one broadcaster which consumes an RF frequency for service delivery.

@majorChannelNo: an integer ranging from 1 to 1000, which represents the "major" channel number associated with a defined service.

@minorChannelNo: an integer ranging from 1 to 1000, which represents a "minor" or "sub" channel number.

@serviceCategory: may indicate the category of the corresponding service. The category type may be coded as shown in Table 28.

@shortServiceName: short string name of the service.

@SLSProtocolType: indicates the protocol type of a service layer signaling channel. The SLS protocol type information may be coded as shown in Table 29.

An attribute indicating the type of protocol of Service Layer Signaling used by this service, coded according to Table 3.3.

@slsPlpId: a string expressing an integer, which indicates the identifier of PLP including SLS data of the corresponding service.

@slsDestinationIpAddress: string indicating an IPv4 destination IP address of the SLS channel of the corresponding service.

@slsDestinationUdpPort: string indicating a destination UDP port number of the SLS channel of the corresponding service.

@slsSourceIpAddress: string including IPv4 source addresses of the packets carrying SLS data for the corresponding service.

@mmtpVersion: version number of the MMTP protocol used for an MMTP session including the SLS MMTP channel for the corresponding service. This field is used only for the MMT/MPU protocol. The default value may be 0.

@routeVersion: version number of the ROUTE protocol used for a ROUTE session including the SLS channel for the corresponding service. This field is used only for the ROUTE protocol. The default value may be 0.

@service_language: three-character language code (3-byte) per ISO-639/B indicating the primary language of a service.

InetSigLocation: provides the URL at which a receiver may obtain data of requested type from an external server via broadband. The format of InetSigLocation is shown in FIG. 75.

ServiceProvider: provides the identifier of a provider broadcasting the corresponding service.

FIG. 75 illustrates an inet signaling location descriptor in the XML format according to an embodiment of the present invention. Descriptions about the inet signaling location descriptor of FIG. 75 are substituted for by the descriptions given with reference to FIG. 67.

FIG. 76 illustrates a representative service descriptor in the XML format according to an embodiment of the present invention. Descriptions about the representative service descriptor of FIG. 76 are substituted for by the descriptions given with reference to FIG. 69.

FIG. 77 illustrates a service group descriptor in the XML format according to an embodiment of the present invention. Descriptions about the service group descriptor of FIG. 77 are substituted for by the descriptions given with reference to FIGS. 70 to 72.

FIG. 78 illustrates a service provider descriptor in the XML format according to an embodiment of the present invention. Descriptions about the service provider descriptor of FIG. 78 are substituted for by the descriptions given with reference to FIG. 73.

FIG. 79 illustrates a method for transmitting signaling information and content data of a broadcasting system according to an embodiment of the present invention.

FIG. 79 illustrates a method for transmitting signaling information according to the SLS protocol type information described above. The SLS protocol type information may represent the delivery protocol of the SLS according to the value of the SLS protocol type information as shown in Table 29.

In FIG. 79, if the value of the SLS protocol type information is 0x01, SLS may correspond to the signaling information of the conventional broadcast system (ATSC1.0). If the value of the SLS protocol type information is 0x02, SLS may correspond to the signaling information (USD, S-TSID, and MPD) of the ROUTE protocol. If the value of the SLS protocol type information is 0x03, SLS may correspond to the signaling information (USD and MPT message) of the MMT protocol.

By using the SLS protocol type information, the receiver may obtain the desired signaling information by parsing the SLS of the delivery protocol that may be processed by the receiver. By using the SLS protocol type information, the receiver may not access the data of a particular protocol that the receiver is unable to process.

FIG. 80 illustrates a method for transmitting signaling information and content data of a broadcasting system according to an embodiment of the present invention.

One broadcast stream of the physical layer may be shared by a plurality of broadcasters. In this case, by using the service_group_descriptor, the SLT may represent which service is provided by which broadcaster.

In the embodiment of FIG. 80, by using the SLT, the receiver may know that the services the service IDs of which are 0x01 and 0x02 are provided by the broadcaster the provider ID of which is 0. Also, by using the SLT, the receiver may know that the services the service IDs of which are 0x03 and 0x04 are provided by the broadcaster the provider ID of which is 1.

In this document, LLS (Low Level Signaling) information may be called SLT (Service List Table). In this document, the definition of a "service" may be given as a set of media components present to the user in aggregate, and the components may be of multiple media types. A service may be continuous or intermittent. A service may be provided in real-time or in non-realtime. A real-time service may include a sequence of TV programs. The SLT may be implemented by XML or binary format.

The primary purpose of the SLT is to support channel scan and point to the SLS. The location of a service component is signaled by the SLS but is not signaled in the SLT. A service contains zero or at least one component, and at least one component may be delivered over broadband. Also, a service contains at least one component, and one or more components may be delivered over broadband. The location of such components may be signaled by the SLS. The SLT may include static information used for service scan. The SLT may be a unique entry point describing SLS bootstrap information. Bootstrap information may refer to the information used as a starting point for accessing specific information.

SLT may be structured so that it does not change often. For example, it is preferable for the SLT not to be changed with respect to every new program or interstitial program. Broadcast streamlining components of a specific service may be delivered according to only one delivery protocol. For example, a streaming component included in one service may not be delivered simultaneously according to both of the ROUTE protocol and MMT protocol. In other words, for broadcast delivery of a linear service, a content component of a service is transmitted by using only one of the protocols, the ROUTE protocol or MMTP protocol, and the two protocols are not used together. However, when an app-based content component is included additionally in a linear service, the two protocols may be used together.

The delivery protocol for a service may be changed from the ROUTE protocol to the MMT protocol or vice versa. However, it is preferable that such a protocol change does not occur with respect to every new program or interstitial program. The protocol change may not be implemented with seamless transition for all kinds of receivers; therefore, it is preferable to perform the protocol change while a receiver is not in use (for example, during an overnight maintenance period).

When a receiver is set up for the first time, the SLT may be used for "quick channel scan". Likewise, when a receiver moves from one DMA (Designated Market Area) to another DMA, SLT may be used for fast channel scan. For example, a receiver may move according to a pattern of commuting two to three DMAs everyday, or a fixed receiver may move on a roadtrip from one home to another without a pattern.

A receiver may detect the change of content of the SLT by using the SLT section version information. A version change of SLT may occur when a service is added or deleted such as i) when a new service is provided online within an RF band or ii) when a service is stopped in an RF band. Also, a version change of SLT may occur when the signaling protocol format of a streaming broadcast component of a specific service is changed. Also, when the SLT syntax version is changed (for example, when the SLT structure is changed), a receiver may detect the version change of the SLT.

Two or more broadcasters may possess a service in one RF band. In this case, a plurality of broadcasters may generate and use one SLT instance. Also, a plurality of broadcasters may generate individual SLT instances.

A service may include components located at more than one RF band. A receiver may receive multiple SLTs from one broadcaster using a plurality of RF frequencies. In this case, an identical service ID may be used for the multiple SLTs obtained by the receiver. A service ID is used for identifying a service uniquely within the scope of the corresponding broadcast area.

A receiver may obtain broadband SLS when RF reception is lost or signal strength is weak, which may be called broadband handoff.

FIG. 81 illustrates a method for transmitting a broadcast signal according to an embodiment of the present invention.

A broadcast transmitter transmits a broadcast signal including a content component of a broadcast service, and a method for transmitting a broadcast signal according to an embodiment of the present invention is described below.

A broadcast transmitter may encode a content component of a broadcast service according to a delivery protocol S81010. For the delivery protocol, at least one of the ROUTE or MMPT protocol may be used.

A broadcast transmitter may generate service layer signaling (SLS) information S81020. The service layer signaling information includes information for discovering and acquiring a broadcast service and a content component of the broadcast service. Detailed descriptions of the SLS information are replaced with the descriptions given above.

A broadcast transmitter may generate service list information S81030. The service list information includes information for building a basic service list and discovering SLS information. Various names such as FIT, FIC, LLS (Link Layer Signaling), LLS (Low Level Signaling), and LCT have been used to refer to the service list information, detailed descriptions of which are replaced with the descriptions given above. SLS information may be transmitted by using at least one protocol from the ROUTE or MMT protocol.

A broadcast transmitter may perform physical layer processing on the service list information, SLS information, and content component S81040. A broadcast transmitter may perform physical layer processing on the service list information, service layer signaling information, and content component; generate a signal frame; and transmit the generated signal frame. A broadcast signal may include at least one signal frame. Physical layer processing of the broadcast transmitter is described with reference to FIGS. 18 to 40.

Service list information includes SLS protocol type information, and the SLS protocol type indicates a delivery protocol according to which SLS information is transmitted. The SLS protocol type information may indicate at least one of the ROUTE protocol or MMT protocol. The SLS protocol information may be defined for each individual service. A receiver may prevent extraction of unnecessary information or decoding failure by bypassing or discarding the SLS received according to an unsupported protocol. The SLS information may be transmitted by using a delivery protocol such as the one according to which a service component is delivered. Therefore, a receiver may decode the SLS immediately without changing the delivery protocol; and may obtain and process a content component by using the obtained information.

When a content component is a streaming content, the content component may be transmitted by using only one of the ROUTE or MMT protocol. In other words, in the case of a linear A/V service or linear audio service streamed in real-time, the content component of a service is delivered by one of the ROUTE or MMT protocol. This is so because in the case of a linear service, time loss due to protocol change may incur delay/loss in real-time streaming.

When SLS information is transmitted according to the ROUTE protocol, the SLS information may include USBD (User Service Bundle Description) information, S-TSID (Service-based Transport Session Instance Description) information, and MPD (Media Presentation Description) information. USBD information may correspond to an entry point of an SLS fragment, S-TSID information may include ROUTE session information by which the content component of the broadcast service is delivered, and MPD information may provide context for an identified resource within the MP (Media Presentation) and a resource identifier about a segment.

The service list information may include service ID information of 16-bit integer format for identifying a broadcast service, and the USBD information may include the service ID information of 16-bit integer format and global service ID information of URI format. The global service ID information may be included in the ESG transmitted over broadband. The ESG may include only the global service ID information. Therefore, through the USBD, a receiver may map the service ID of a broadcast signal and ESG to the global service ID.

The service list information may include signaling information at the service list information level and signaling information at the service level. The signaling information at the service list information level may include signaling information about all of the services described by the service list information. The signaling information at the service level may include signaling information about a specific service included in the service list information.

The service list information may include category information about a broadcast service, and the service category information may indicate whether a broadcast service is an audio/video service, audio service, app-based service or service guide service. In an embodiment, when a frequency band in which a broadcast signal including service list information, the SLS information, and the content component is transmitted is shared by a plurality of broadcasters, the service list information may further include service group information about a group of services provided by the individual broadcasters.

FIG. 82 illustrates a broadcast signal transmitter and a broadcast signal receiver according to an embodiment of the present invention.

The broadcast signal transmitter 82100 comprises a broadcast content encoder 82110, signaling processor 82120, and physical layer processor 82130. The description of the transmission method described in detail above is applied to the description of the operation of the broadcast signal transmitter The broadcast content encoder 82110 may process broadcast data according to a delivery protocol. The broadcast data may be encoded/formatted according to the ROUTE or MMT protocol. The broadcast data may include a broadcast data content component.

The signaling processor 82120 may generate signaling information. The signaling information may include service list information and SLS information. The description about the present invention given in detail above may be applied to the description of the service list information and service layer signaling information.

The physical layer processor 82130 may perform physical layer processing on the broadcast data processed by the broadcast content processor 82110 and signaling information generated by the signaling processor 82120. The physical layer processor 82130 may transmit a physical layer processed signal frame, where the operation of the physical layer processor 82130 may be described by the descriptions given with reference to FIGS. 18 to 40. A broadcast signal may include at least one signal frame.

The broadcast signal receiver 82200 may comprise a broadcast content decoder 82110, signaling parser 82120, and physical layer parser 82130. The broadcast signal receiver may perform the inverse processing of the broadcast signal transmission method of the broadcast signal transmitter.

The physical layer parser 82130 may perform physical layer processing on a receiver broadcast signal frame and extract broadcast data and signaling information.

The signaling parser 82120 may parse signaling information and obtain service list information and SLS information. The broadcast content decoder 82110 may process a content component corresponding to a service according to a delivery protocol. The broadcast data may be decoded according to the ROUTE or MMT protocol.

The broadcast receiver 82200 may control the physical layer parser 82130 according to the signaling information obtained by the signaling parser 82120 and extract data corresponding to a specific service from a signal frame. And the broadcast receiver 82200 may process the extracted data by using the broadcast content decoder 82110 and output/provide a service/service content.

A module or unit may comprise processors executing sequential operation steps stored in the memory (or storage unit). The individual steps described in the embodiments above may be performed by hardware/processors. Each individual module/block/unit described in the embodiment above may be operated as hardware/processor. Also, the methods proposed by the present invention may be executed as program codes. These codes may be written to a processor-readable storage medium and therefore may be read by a processor provided by an apparatus.

Although the present invention has been described with reference to individual drawings for the convenience of description, it is still possible to design so that embodiments described with reference to each drawing may be combined to implement a new embodiment. Also, depending on the needs of those skilled in the art, designing a computer-readable recording medium in which programs for executing the embodiments described above are stored also belongs to the technical scope of the present invention.

The apparatus and method according to the present invention are not limited to the embodiments described above, but the entire or part of the embodiments may be combined selectively so that various modifications may be made to the embodiments.

Meanwhile, the method according to the present invention may be implemented in the form of processor-readable program codes in a recording medium that may be read by a processor installed in a network device. The processor-readable recording medium includes all kinds of recording devices storing data that may be read by the processor. Examples of processor-readable recording media include ROM, RAM, CD-ROM, magnetic tape, floppy disk, optical data storage device, and implementation in the form of carrier waves such as transmission through the Internet. Also, the processor-readable recording medium may be distributed over computer systems connected to each other through a network so that processor-readable codes may be stored and executed in a distributed manner.

Throughout the document, preferred embodiments of the present invention have been described with reference to appended drawings; however, the present invention is not limited to the embodiments above. Rather, it should be noted that various modifications of the present invention may be made by those skilled in the art to which the present invention belongs without leaving the technical scope of the present invention defined by the appended claims, and these modifications should not be understood individually from the technical principles or aspects of the present invention.

The present document describes both of the product invention and the process invention, and depending on the needs, descriptions of the respective inventions may be applied in a supplementary manner.

It should be understood by those skilled in the art that various modifications and variations of the present invention may be made without departing from the technical principles and scope. Therefore, it should be understood that the present invention includes modifications and variations thereof provided by the appended claims of the present invention and within their equivalent scope.

The present document describes both of an apparatus and a method according to the present invention, and descriptions of both of the apparatus and method according to the present invention may be applied in a complementary manner.

MODE FOR INVENTION

Various embodiments have been described in their best mode to embody the present invention.

INDUSTRIAL APPLICABILITY

The present invention is used in a series of broadcast signal providing fields.

It should be understood by those skilled in the art that various modifications and variations of the present invention may be made without departing from the technical principles and scope. Therefore, it should be understood that the present invention includes modifications and variations thereof provided by the appended claims of the present invention and within their equivalent scope.

What is claimed is:

1. A method for transmitting a broadcast signal, the method comprising:

encoding a content component of a broadcast service according to a delivery protocol, wherein the delivery protocol includes at least one of ROUTE (Real-Time Object Delivery over Unidirectional Transport) protocol or MMT (MPEG Media Transport) protocol;

generating SLS (Service Layer Signaling) information for discovering and obtaining the broadcast service and the content component of the broadcast service;

generating service list information including information for service list building and discovery of the SLS information, wherein the service list information includes SLS protocol type information, and the SLS protocol type information indicates the delivery protocol of the SLS information used by corresponding broadcast service, the delivery protocol corresponding to the ROUTE protocol or the MMT protocol;

generating a link layer packet based on input data by performing an overhead reduction function depending on a type of the input data, wherein, when the type of the input data relates to an MPEG-2 transport stream (TS) packet, performing the overhead reduction consists of removing a sync byte, deleting 188-byte null TS packets and removing a common header, and wherein, when the type of the input data relates to an Internet protocol (IP) packet, performing the overhead reduction includes compressing a header of the IP packet; and transmitting the broadcast signal carrying the link layer packet.

2. The method of claim 1, wherein, if the content component of a service is a streaming component, the content component is transmitted by using one delivery protocol of the ROUTE protocol or the MMT protocol.

3. The method of claim 1, wherein, if the SLS information is transmitted according to the ROUTE protocol, the SLS information includes USBD (User Service Bundle Description) information, S-TSID (Service-based Transport Session Instance Description) information, and MPD (Media Presentation Description) information; and wherein the USBD information corresponds to an entry point of an SLS fragment; the S-TSID information includes ROUTE session information in which the content component of the broadcast service is delivered; and the MPD information provides context of an identified resource within MP (Media Presentation) and a resource identifier of a segment.

4. The method of claim 1, wherein the service layer signaling information is stored as a signaling template, and when a signaling instance which changes the service layer signaling information is generated, Diff information is generated and transmitted, the Diff information being a difference between the template and the signaling instance.

5. The method of claim 1, wherein the service list information further includes service category information about the broadcast service, and the service category information indicates whether the broadcast service is an audio/video service, audio service, app-based service, or service-guide service.

6. The method of claim 1, wherein, if a frequency band in which a broadcast signal including the service list information, SLS information, and content component is transmitted is shared with a plurality of broadcasters, the service list information further comprises service group information about a group of services provided by the respective broadcasters.

7. An apparatus for transmitting a broadcast signal, the apparatus comprising:

a broadcast content encoder configured to encode a content component of a broadcast service according to a delivery protocol, wherein the delivery protocol includes at least one of ROUTE (Real-Time Object Delivery over Unidirectional Transport) protocol or MMT (MPEG Media Transport) protocol;

a signaling hardware processor configured to generate signaling information about a broadcast service, wherein the signaling information includes SLS (Service Layer Signaling) information for discovering and obtaining the broadcast service and the content component of the broadcast service and service list information for service list building and discovery of the SLS information, wherein the service list information includes SLS protocol type information, and the SLS protocol type information indicates the delivery protocol of the SLS information used by corresponding broadcast service, the delivery protocol corresponding to the ROUTE protocol or the MMT protocol, wherein the signaling hardware processor is further configured to generate a link layer packet based on input perform data by performing an overhead reduction function depending on a type of the input data, wherein, when the type of the input data relates to an MPEG-2 transport stream (TS) packet, the signaling hardware processor is further configured to perform the overhead reduction by removing a sync byte, deleting 188-byte null TS packets and removing a common header, wherein, when the type of the input data relates to an Internet protocol (IP) packet, the signaling hardware processor is further configured to perform the overhead reduction by compressing a header of the IP packet; and a physical layer hardware processor configured to transmit the broadcast signal carrying the link layer packet.

8. The apparatus of claim 7, wherein, if the content component of a service is a streaming component, the content component is transmitted by using one delivery protocol of the ROUTE protocol or the MMT protocol.

9. The apparatus of claim 7, wherein, if the SLS information is transmitted according to the ROUTE protocol, the SLS information includes USBD (User Service Bundle Description) information, S-TSID (Service-based Transport Session Instance Description) information, and MPD (Media Presentation Description) information; and wherein the USBD information corresponds to an entry point of an SLS fragment; the S-TSID information includes ROUTE session information in which the content component of the broadcast service is delivered; and the MPD information provides context of an identified resource within MP (Media Presentation) and a resource identifier of a segment.

10. The apparatus of claim 7, wherein the service layer signaling information is stored as a signaling template, and when a signaling instance which changes the service layer signaling information is generated, Diff information is generated and transmitted, the Diff information being a difference between the template and the signaling instance.

11. The apparatus of claim 7, wherein the service list information further includes service category information about the broadcast service, and the service category information indicates whether the broadcast service is an audio/video service, audio service, app-based service, or service-guide service.

12. The apparatus of claim 7, wherein, if a frequency band in which a broadcast signal including the service list information, SLS information, and content component is transmitted is shared with a plurality of broadcasters, the service list information further comprises service group information about a group of services provided by the respective broadcasters.

13. An apparatus for receiving a broadcast signal, the apparatus comprising:

a hardware tuner configured to receive the broadcast signal carrying a link layer packet, wherein the link layer packet includes a content component of a broadcast service, and signaling information about the broadcast service, wherein the signaling information includes SLS (Service Layer Signaling) information for discovering and obtaining the broadcast service and the content component of the broadcast service and service list information for service list building and discovery of the SLS information, wherein the service list information includes SLS protocol type information, and the SLS protocol type information indicates a delivery protocol of the SLS information used by corresponding broadcast service, the delivery protocol corresponding to ROUTE (Real-Time Object Delivery over Unidirectional Transport) protocol or MMT (MPEG Media Transport) protocol, and wherein the link layer packet is generated based on input data by performing an overhead reduction function depending on a type of the input data;

a hardware processor configured to perform the overhead reduction by inserting a sync byte, and recovering deleted 188-byte null TS packets and deleted common headers when the type of the input data relates to an MPEG-2 transport stream (TS) packet, wherein the hardware processor is further configured to perform the overhead reduction by decompressing a header of an Internet protocol (IP) packet when the type of the input data relates to an Internet protocol (IP) packet; and a decoder configured to decode the content component of the broadcast service.

14. A method for receiving a broadcast signal, the method comprising:

receiving the broadcast signal carrying a link layer packet, wherein the link layer packet includes a content component of a broadcast service, and signaling information about the broadcast service, wherein the signaling information includes SLS (Service Layer Signaling) information for discovering and obtaining the broadcast service and the content component of the broadcast service and service list information for service list building and discovery of the SLS information, wherein the service list information includes SLS protocol type information, and the SLS protocol type information indicates a delivery protocol of the SLS information used by corresponding broadcast service, the delivery protocol corresponding to ROUTE (Real-Time Object Delivery over Unidirectional Transport) protocol or MMT (MPEG Media Transport) protocol, wherein the link layer packet is generated based on input data by performing an overhead reduction function depending on a type of the input data, wherein, when the type of the input data relates to an MPEG-2 transport stream (TS) packet, performing the overhead reduction consists of inserting a sync byte, and recovering deleted 188-byte null TS packets and deleted common headers, wherein, when the type of the input data relates to an Internet protocol (IP) packet, performing the overhead reduction includes decompressing a header of an Internet protocol (IP) packet; and decoding the content component of the broadcast service according to the delivery protocol corresponding to the ROUTE protocol or the MMT protocol.

* * * * *